United States Patent
Izumi

(10) Patent No.: US 11,134,235 B2
(45) Date of Patent: Sep. 28, 2021

(54) IMAGE PROCESSING APPARATUS AND IMAGE PROCESSING METHOD

(71) Applicant: SONY CORPORATION, Tokyo (JP)

(72) Inventor: Nobuaki Izumi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 67 days.

(21) Appl. No.: 16/306,738

(22) PCT Filed: Jul. 14, 2017

(86) PCT No.: PCT/JP2017/025726
§ 371 (c)(1),
(2) Date: Dec. 3, 2018

(87) PCT Pub. No.: WO2018/021070
PCT Pub. Date: Feb. 1, 2018

(65) Prior Publication Data
US 2019/0132575 A1    May 2, 2019

(30) Foreign Application Priority Data
Jul. 29, 2016 (JP) .............................. JP2016-149885

(51) Int. Cl.
*H04N 13/111* (2018.01)
*H04N 13/275* (2018.01)
(Continued)

(52) U.S. Cl.
CPC ............ *H04N 13/111* (2018.05); *G06T 11/00* (2013.01); *H04N 5/23238* (2013.01);
(Continued)

(58) Field of Classification Search
CPC .. H04N 13/111; H04N 13/156; H04N 13/161; H04N 13/275; H04N 5/23238; H04N 13/194; G06T 11/00
See application file for complete search history.

(56) References Cited

U.S. PATENT DOCUMENTS

2003/0001838 A1* 1/2003 Han ..................... G06T 15/205
                                                              345/419
2013/0162634 A1* 6/2013 Baik .................... H04N 13/122
                                                              345/419
(Continued)

FOREIGN PATENT DOCUMENTS

JP     2000-030080 A    1/2000
JP     2006-014174 A    1/2006
(Continued)

OTHER PUBLICATIONS

Dec. 18, 2019, European Search Report issued for related EP Application No. 17834078.2.

(Continued)

*Primary Examiner* — Jamie J Atala
*Assistant Examiner* — Hesham K Abouzahra
(74) *Attorney, Agent, or Firm* — Paratus Law Group, PLLC

(57) ABSTRACT

The present disclosure relates to an image processing apparatus and an image processing method that make it possible to generate a texture image of high picture quality at a predetermined viewpoint using an omnidirectional image. A drawing section generates a display image of a given viewpoint using a first layer image including a texture image and a depth image of an omnidirectional image at a first viewpoint and a second layer image including a texture image and a depth image at a second viewpoint different from the first viewpoint in an occlusion region at a viewpoint of the first layer image. The present disclosure can be applied, for example, to a home server that generates a display image of a predetermined viewpoint from an omnidirectional image or the like.

16 Claims, 33 Drawing Sheets

(51) Int. Cl.
*G06T 11/00* (2006.01)
*H04N 13/156* (2018.01)
*H04N 13/161* (2018.01)
*H04N 5/232* (2006.01)
*H04N 13/194* (2018.01)

(52) U.S. Cl.
CPC ......... *H04N 13/156* (2018.05); *H04N 13/161* (2018.05); *H04N 13/275* (2018.05); *H04N 13/194* (2018.05)

(56) References Cited

U.S. PATENT DOCUMENTS

| | | | | |
|---|---|---|---|---|
| 2015/0332464 | A1* | 11/2015 | O'Keefe | G06T 7/337 |
| | | | | 348/47 |
| 2017/0142442 | A1* | 5/2017 | Tsukuba | H04N 19/70 |
| 2017/0280133 | A1* | 9/2017 | Niemela | H04N 13/257 |
| 2018/0359489 | A1* | 12/2018 | Lakshman | G06T 19/006 |
| 2018/0367782 | A1* | 12/2018 | Ikai | H04N 13/161 |

FOREIGN PATENT DOCUMENTS

| WO | WO 2015/178217 A1 | 11/2015 |
|---|---|---|
| WO | WO 2016/038240 A1 | 3/2016 |

OTHER PUBLICATIONS

Luis E. Gurrieri et al., Acquisition of omnidirectional stereoscopic images and videos of dynamic scenes: a review, Journal of Electronic Imaging, Jul. 8, 2013, pp. 1-21, vol. 22, No. 3, SPIE.

* cited by examiner

FIG. 9

| FILE NAME | AZIMUTH ANGLE | ELEVATION ANGLE | ROTATION ANGLE | SIGHT LINE VECTOR (X, Y, Z) | | | VIEWPOINT POSITION INFORMATION (X, Y, Z) | | | TRANSVERSE ANGLE OF VIEW | VERTICAL ANGLE OF VIEW | TRANSVERSE PIXEL NUMBER | VERTICAL PIXEL NUMBER |
|---|---|---|---|---|---|---|---|---|---|---|---|---|---|
| posZ | 0° | 0° | 0° | 0 | 0 | +1 | 0 | 0 | 0 | 100° | 100° | 1024 | 1024 |
| negZ | −180° | 0° | 0° | 0 | 0 | −1 | 0 | 0 | 0 | 100° | 100° | 1024 | 1024 |
| posX | +90° | 0° | 0° | +1 | 0 | 0 | 0 | 0 | 0 | 100° | 100° | 1024 | 1024 |
| negX | −90° | 0° | 0° | −1 | 0 | 0 | 0 | 0 | 0 | 100° | 100° | 1024 | 1024 |
| posY | 0° | +90° | 0° | 0 | +1 | 0 | 0 | 0 | 0 | 100° | 100° | 1024 | 1024 |
| negY | 0° | −90° | 0° | 0 | −1 | 0 | 0 | 0 | 0 | 100° | 100° | 1024 | 1024 |

FIG. 15

| FILE NAME | AZIMUTH ANGLE | ELEVATION ANGLE | ROTATION ANGLE | SIGHT LINE VECTOR (X, Y, Z) | | | VIEWPOINT POSITION INFORMATION (X, Y, Z) | | | TRANSVERSE ANGLE OF VIEW | VERTICAL ANGLE OF VIEW | TRANSVERSE PIXEL NUMBER | VERTICAL PIXEL NUMBER |
|---|---|---|---|---|---|---|---|---|---|---|---|---|---|
| posZ2 | 0° | 0° | 0° | 0 | 0 | +1 | 0 | 0 | 0 | 100° | 100° | 1024 | 1024 |
| negZ2 | −180° | 0° | 0° | 0 | 0 | −1 | 0 | 0 | 0 | 100° | 100° | 1024 | 1024 |
| posX2 | +90° | 0° | 0° | +1 | 0 | 0 | 0 | +a | 0 | 100° | 100° | 1024 | 1024 |
| negX2 | −90° | 0° | 0° | −1 | 0 | 0 | 0 | −a | 0 | 100° | 100° | 1024 | 1024 |
| posY2 | 0° | +90° | 0° | 0 | +1 | 0 | 0 | 0 | +a | 100° | 100° | 1024 | 1024 |
| negY2 | 0° | −90° | 0° | 0 | −1 | 0 | 0 | 0 | −a | 100° | 100° | 1024 | 1024 |

FIG. 17

| FILE NAME | AZIMUTH ANGLE | ELEVATION ANGLE | ROTATION ANGLE | SIGHT LINE VECTOR (X, Y, Z) | | | VIEWPOINT POSITION INFORMATION (X, Y, Z) | | | TRANSVERSE ANGLE OF VIEW | VERTICAL ANGLE OF VIEW | TRANSVERSE PIXEL NUMBER | VERTICAL PIXEL NUMBER |
|---|---|---|---|---|---|---|---|---|---|---|---|---|---|
| posZ2 | 0° | 0° | 0° | 0 | 0 | +1 | +a | −a | 0 | 100° | 100° | 1024 | 1024 |
| negZ2 | −180° | 0° | 0° | 0 | 0 | −1 | −a | +a | 0 | 100° | 100° | 1024 | 1024 |
| posX2 | +90° | 0° | 0° | +1 | 0 | 0 | 0 | +a | −a | 100° | 100° | 1024 | 1024 |
| negX2 | −90° | 0° | 0° | −1 | 0 | 0 | 0 | −a | +a | 100° | 100° | 1024 | 1024 |
| posY2 | 0° | +90° | 0° | 0 | +1 | 0 | −a | 0 | +a | 100° | 100° | 1024 | 1024 |
| negY2 | 0° | −90° | 0° | 0 | −1 | 0 | +a | 0 | −a | 100° | 100° | 1024 | 1024 |

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2017/025726 (filed on Jul. 14, 2017) under 35 U.S.C. § 371, which claims priority to Japanese Patent Application No. 2016-149885 (filed on Jul. 29, 2016), which are all hereby incorporated by reference in their entirety.

TECHNICAL FIELD

The present disclosure relates to an image processing apparatus and an image processing method, and particularly to an image processing apparatus and an image processing method that make it possible to generate a texture image of high picture quality at a predetermined viewpoint using an omnidirectional image.

BACKGROUND ART

A storage apparatus is available which generates an omnidirectional image in which picked up images over 360 degrees around in a horizontal direction and over 180 degrees around in a vertical direction imaged with a multi camera are mapped to a 2D image (plane image) and encodes and stores the generated omnidirectional image (for example, refer to PTL 1).

Further, a reproduction apparatus is available which decodes an encoded stream of an omnidirectional image stored by a storage apparatus and displays a texture image within a viewing range of a viewer using the omnidirectional image obtained as a result of the decoding. Such a reproduction apparatus as just described displays a texture image within a viewing range of the viewer when the surface of a 3D model such as a sphere, a cube or the like to which the omnidirectional image is pasted is viewed in a sight line direction of the viewer from a viewpoint that is one point in the inside of the 3D model. Consequently, a picked up image within the viewing range of the viewer from a predetermined viewpoint is reproduced.

CITATION LIST

Patent Literature

[PTL 1]
Japanese Patent Laid-Open No. 2006-14174

SUMMARY

Technical Problem

However, in the case where a viewpoint upon generation and a viewpoint upon reproduction of an omnidirectional image are different from each other, a generated texture image in a viewing range of a viewer at the viewpoint upon reproduction includes an occlusion region of the viewpoint upon generation of the omnidirectional image. Accordingly, the picture quality of the texture image in the viewing range of the viewer at the viewpoint upon reproduction degrades. The occlusion region is a region of an imaging object in the rear hidden by an imaging object on the front.

The present disclosure has been made in view of such a situation as described above and makes it possible to generate a texture image of high picture quality at a predetermined viewpoint using an omnidirectional image.

Solution to Problem

The image processing apparatus of a first aspect of the present disclosure is an image processing apparatus including an image generation section configured to generate a texture image of a given viewpoint using a first layer image including a texture image and a depth image of an omnidirectional image at a first viewpoint and a second layer image including a texture image and a depth image at a second viewpoint different from the first viewpoint in an occlusion region at a viewpoint of the first layer image.

The image processing method of the first aspect of the present disclosure corresponds to the image processing apparatus of the first aspect of the present disclosure.

In the first aspect of the present disclosure, a texture image of a given viewpoint is generated using a first layer image including a texture image and a depth image of an omnidirectional image at a first viewpoint and a second layer image including a texture image and a depth image at a second viewpoint different from the first viewpoint in an occlusion region at a viewpoint of the first layer image.

The image processing apparatus of a second aspect of the present disclosure is an image processing apparatus including an image generation section configured to generate a first layer image including a texture image and a depth image of an omnidirectional image at a first viewpoint and a second layer image including a texture image and a depth image at a second viewpoint different from the first viewpoint in an occlusion region at a viewpoint of the first layer image.

The image processing method of the second aspect of the present disclosure corresponds to the image processing apparatus of the second aspect of the present disclosure.

In the second aspect of the present disclosure, a first layer image including a texture image and a depth image of an omnidirectional image at a first viewpoint and a second layer image including a texture image and a depth image at a second viewpoint different from the first viewpoint in an occlusion region at a viewpoint of the first layer image are generated.

It is to be noted that the image processing apparatus of the first and second aspects of the present disclosure can be implemented by causing a computer to execute a program.

Further, in order to implement the image processing apparatus of the first and second aspects of the present disclosure, the program for being executed by a computer may be provided by transmission through a transmission medium or by recording the program on a recording medium.

Advantageous Effect of Invention

According to the first aspect of the present disclosure, an image can be generated. Further, according to the first aspect of the present disclosure, a texture image of high picture quality of a given viewpoint can be generated using an omnidirectional image.

Meanwhile, according to the second aspect of the present disclosure, an image can be generated. Further, according to the second aspect of the present disclosure, an image can be generated such that a texture image of high picture quality of a given viewpoint can be generated using an omnidirectional image.

It is to be noted that the effects described here are not necessarily restrictive and may be some effects described in the present disclosure.

BRIEF DESCRIPTION OF DRAWINGS

FIG. 9 is a view depicting a configuration example of a table for viewpoint position information and face information of the first layer.

FIG. 15 is a view depicting a first configuration example of a table of viewpoint position information and face information of the second layer.

FIG. 17 is a view depicting a second configuration example of a table of viewpoint position information and face information of the second layer.

DESCRIPTION OF EMBODIMENTS

In the following, a mode for carrying out the present disclosure (hereinafter referred to as embodiment) is described. It is to be noted that the description is given in the following order.

Figure 32:
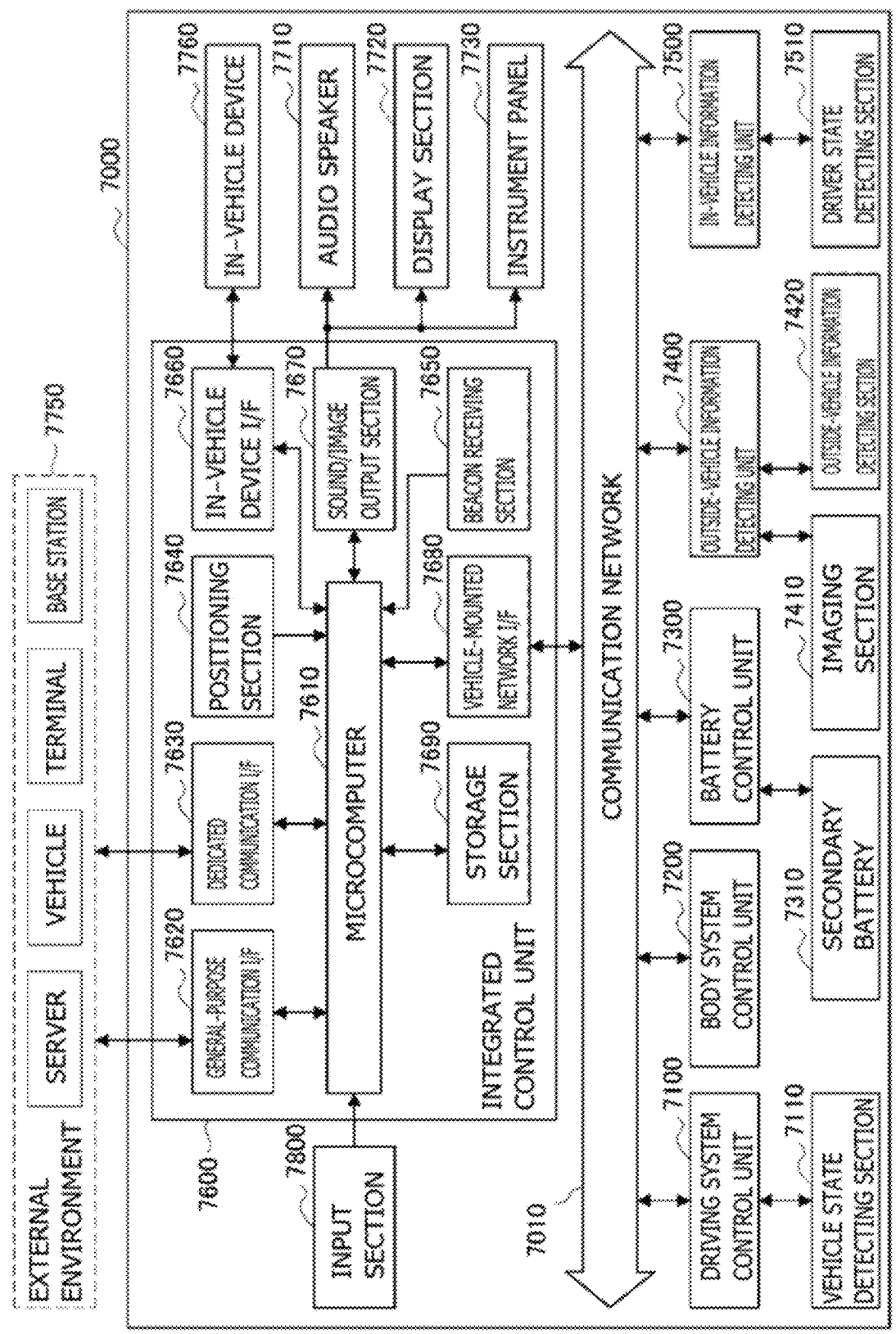
FIG. 32 is a block diagram depicting an example of schematic configuration of a vehicle control system.
Figure 33:
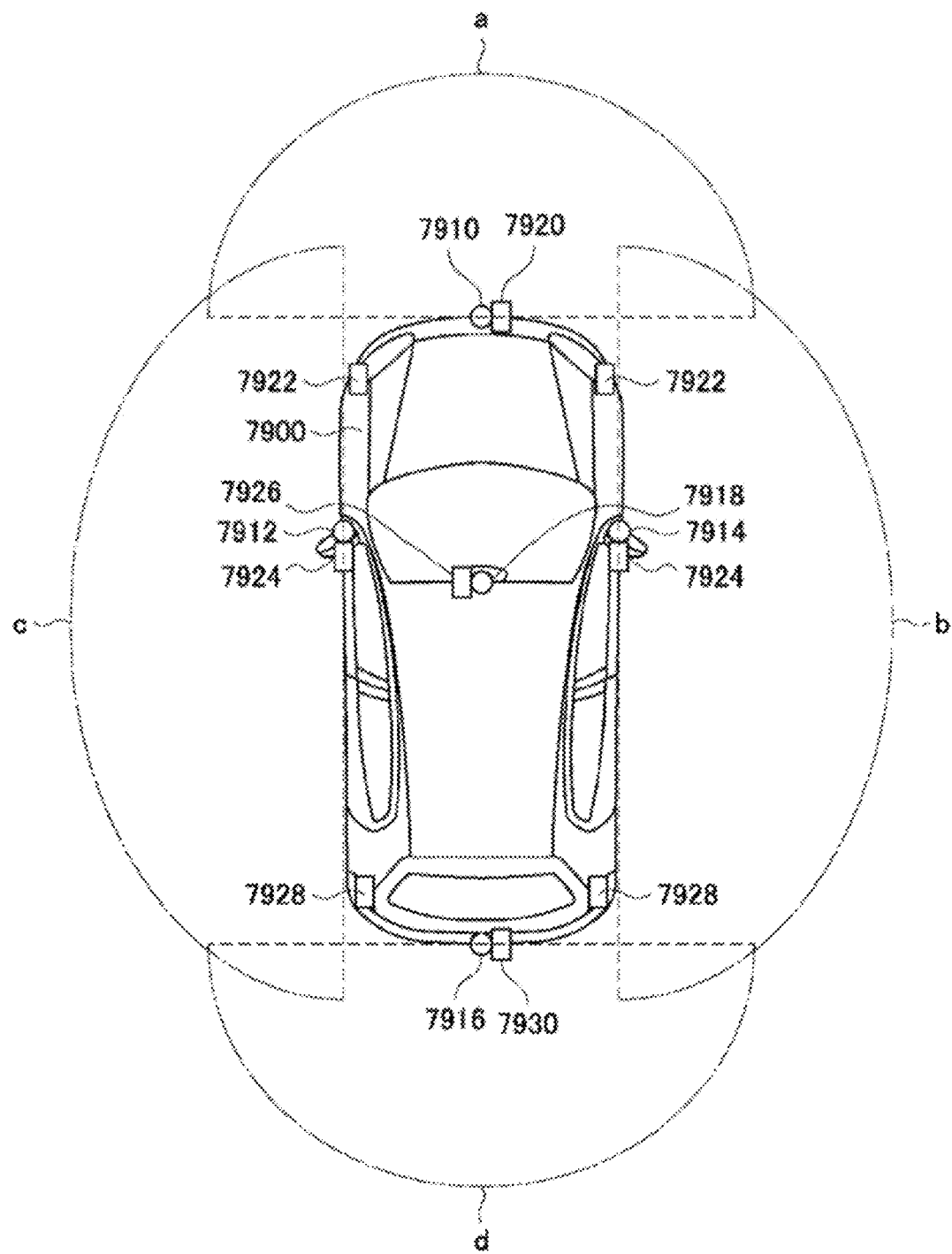
FIG. 33 is a diagram of assistance in explaining an example of installation positions of an outside-vehicle information detecting section and an imaging section.

1. First Embodiment: Image Displaying System (FIGS. 1 to 28)
2. Second Embodiment: Image Displaying System (FIG. 29)
3. Different Example of Texture Image (FIG. 30)
4. Third Embodiment: Computer (FIG. 31)
5. Application Example (FIGS. 32 and 33)

First Embodiment (Configuration Example of First Embodiment of Image Displaying System)

Figure 1:
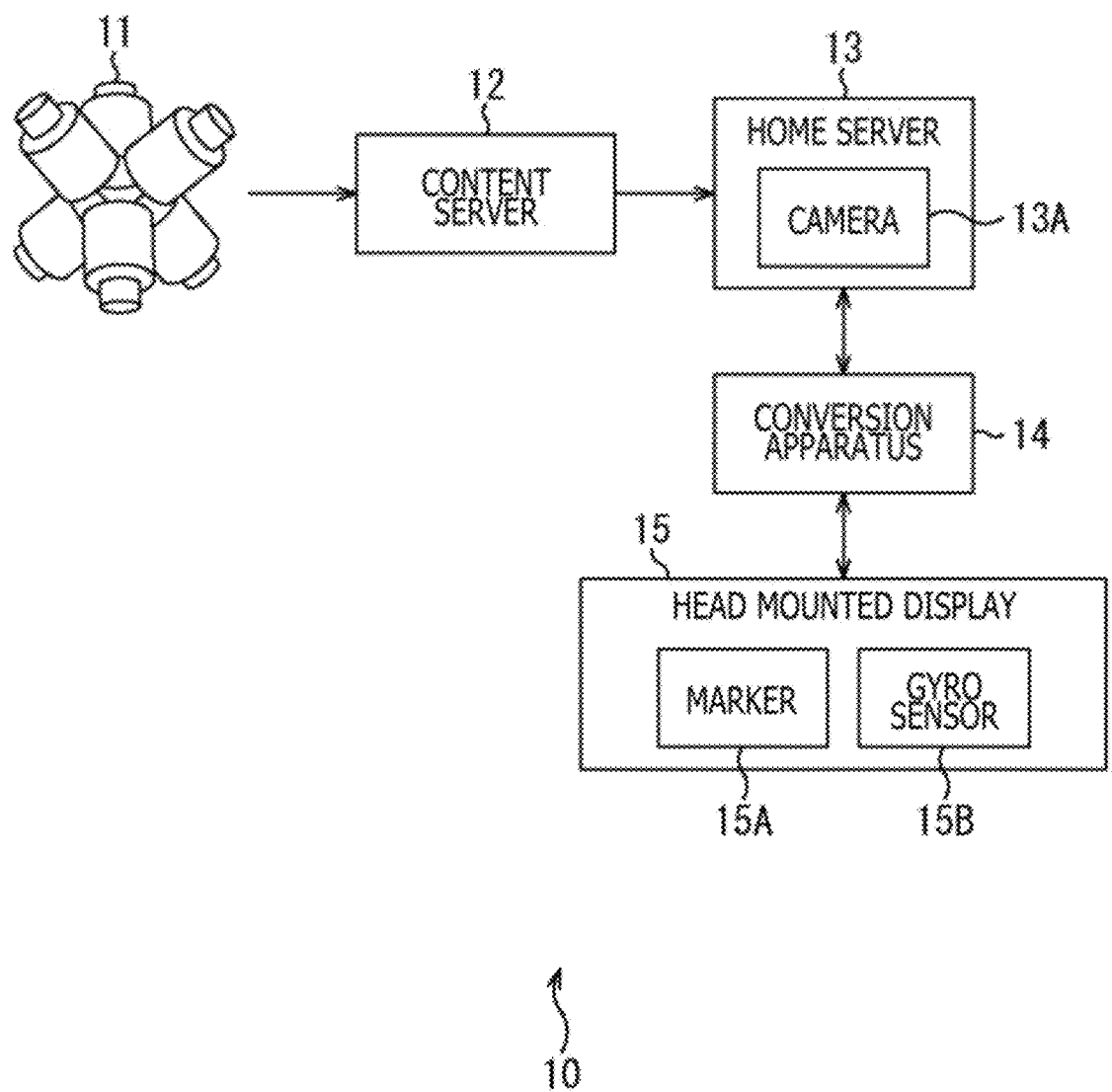
FIG. 1 is a block diagram depicting a configuration example of a first embodiment of an image displaying system to which the present disclosure is applied.

FIG. 1 is a block diagram depicting a configuration example of a first embodiment of an image displaying system to which the present disclosure is applied.

The image displaying system 10 of FIG. 1 includes a multi camera 11, a content server 12, a home server 13, a conversion apparatus 14, and a head mounted display 15. The image displaying system 10 generates an omnidirectional image from picked up images that are YCbCr images (YUV images) picked up by the multi camera 11 and displays an image of a viewing range of a viewer from within the omnidirectional image.

In particular, the multi camera 11 of the image displaying system 10 includes a plurality of (in the example of FIG. 1, six) cameras disposed outward such that an imaging range thereof is 360 degrees around in a horizontal direction and 180 degrees around in a vertical direction. Each camera performs imaging to generate a picked up image in a unit of a frame. The multi camera 11 supplies the picked up images of the cameras to the content server 12.

The content server 12 (image processing apparatus) generates a texture image and a depth image of an omnidirectional image of a predetermined viewpoint from picked up images of the cameras supplied from the multi camera 11. In the first embodiment, a depth image is an image, in which a pixel value is given by a reciprocal 1/r of a distance r of a straight line from the predetermined viewpoint to an imaging object on each pixel, the distance r being a value of 8 bits.

The content server 12 reduces the resolution of a texture image and a depth image of an omnidirectional image to generate a low resolution texture image and a low resolution depth image. The content server 12 compression encodes the low resolution texture image and the low resolution depth image by an encoding method such as AVC (Advanced Video Coding), HEVC (High Efficiency Video Coding)/H.265 or the like. The content server 12 stores an encoded stream of the low resolution texture image (hereinafter referred to as low resolution texture stream) and an encoded stream of the low resolution depth image (hereinafter referred to as low resolution depth stream) obtained as a result of the compression encoding.

Further, the content server 12 uses picked up images of the cameras to generate texture images and depth images corresponding to six faces configuring a cube centered at the viewpoint of the omnidirectional image in a hierarchized relationship. In particular, the content server 12 generates texture images and depth images of a first layer and a second layer of the six faces. It is to be noted that the viewpoint of the omnidirectional image and the center of the cube may be different from each other.

The content server 12 compression encodes a first layer image including a texture image and a depth image of the first layer of each face and a second layer image including a texture image and a depth image of the second layer of each face in accordance with an encoding method such as AVC, HEVC or the like for each face, each type of image and each layer. The content server 12 stores an encoded stream of a texture image of the first layer (hereinafter referred to as first layer texture stream), an encoded stream of a depth images of the first layer (hereinafter referred to as first layer depth stream), an encoded stream of a texture image of the second layer (hereinafter referred to as second layer texture stream) and an encoded stream of a depth image of the second layer (hereinafter referred to as second layer depth stream) of each face obtained as a result of the compression encoding. It is to be noted that the encoding method for the first layer images and the second layer images may be the MVC (Multiview Video Coding) method, 3D-HEVC method or the like.

Further, the content server 12 generates and stores information and so forth relating to the faces of the first layer and the second layer as metadata. The content server 12 transmits the low resolution texture stream and the low resolution depth stream, the first layer texture streams, first layer depth streams, second layer texture streams and second layer depth streams of the six faces and the metadata stored therein to the home server 13 through a network not depicted.

It is to be noted that also it is possible for the content server 12 to reconstruct (details are hereinafter described) a first layer texture stream, a first layer depth stream, a second layer texture stream and a second layer depth stream of the six faces. In this case, also it is possible for the content server 12 to transmit the first layer texture streams, first layer depth streams, second layer texture streams and second layer depth streams after the reconstruction and metadata corresponding to them to the home server 13. However, it is assumed that, in the following description, even in the case where reconstruction is performed, the first layer texture streams, first layer depth streams, second layer texture streams and second layer depth streams of the six faces before the reconstruction are transmitted to the content server 12.

The home server 13 (image processing apparatus) receives a low resolution texture stream and a low resolution depth stream, first layer texture streams, first layer depth streams, second layer texture streams and second layer depth streams of the six faces and metadata transmitted thereto from the content server 12.

Further, the home server 13 has a camera 13A built therein and images a marker 15A applied to the head mounted display 15 mounted on the head of a viewer. Then, the home server 13 detects a viewing position on the basis of the picked up image of the marker 15A. Furthermore, the home server 13 receives a detection result of a gyro sensor 15B of the head mounted display 15 from the head mounted display 15 through the conversion apparatus 14. The home server 13 determines a sight line direction of the viewer on the basis of the detection result of the gyro sensor 15B and determines a viewing range of the viewer on the basis of the viewing position and the sight line direction.

The home server 13 has three faces corresponding to the sight line direction of the viewer from the six faces of the first layer. Then, the home server 13 decodes the first layer texture streams, first layer depth streams, second layer texture streams and second layer depth streams corresponding to the selected three faces. Consequently, the home server 13 generates texture images and depth images of the first layer and the second layer corresponding to the selected three faces.

Further, the home server 13 decodes the low resolution texture stream and the low resolution depth stream to generate a low resolution texture image and a low resolution depth image. The home server 13 generates an image of the viewing range of the viewer as a display image using the texture images and the depth images of the first layer and the second layer corresponding to the selected three faces as well as the low resolution texture image and the low resolution depth image. The home server 13 transmits the display image to the conversion apparatus 14 through an HDMI (registered trademark) (High-Definition Multimedia Interface) cable not depicted.

The conversion apparatus 14 converts coordinates on the display image transmitted thereto from the home server 13 into coordinates in the head mounted display 15. The conversion apparatus 14 supplies the display image after the coordinate conversion to the head mounted display 15.

The head mounted display 15 has the marker 15A and the gyro sensor 15B and is mounted on the head of a viewer. The head mounted display 15 displays a display image supplied from the conversion apparatus 14. Further, the gyro sensor 15B built in the head mounted display 15 detects an inclination of the head mounted display 15 and transmits a result of the detection to the home server 13 through the conversion apparatus 14.

(Configuration Example of Content Server)

Figure 2:
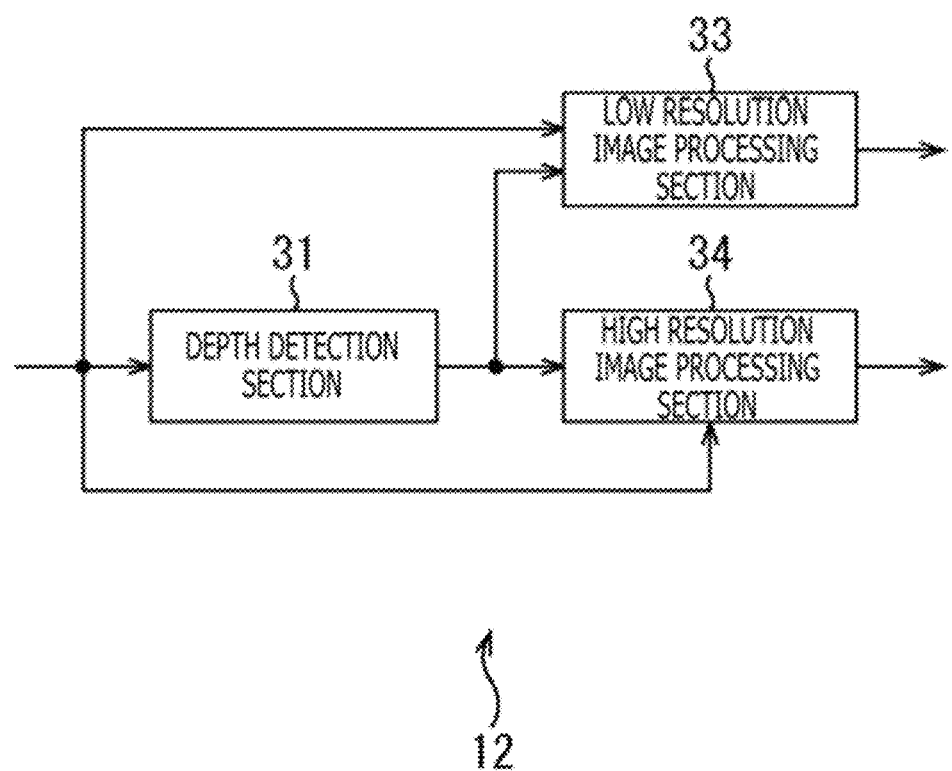
FIG. 2 is a block diagram depicting a configuration example of a content server.

FIG. 2 is a block diagram depicting a configuration example of the content server 12 of FIG. 1.

The content server 12 of FIG. 2 includes a depth detection section 31, a low resolution image processing section 33 and a high resolution image processing section 34.

The depth detection section 31 of the content server 12 detects, for each of pixels of picked up images of the cameras supplied from the multi camera 11 of FIG. 1, a reciprocal $1/z$ of a distance z in the depth direction between a depth plane perpendicular to the depth direction including an imaging object at the pixel and the camera. The depth detection section 31 supplies z images having as pixel values the reciprocals $1/z$ of the pixels of the picked up images of the cameras obtained as a result of the detection to the low resolution image processing section 33 and the high resolution image processing section 34.

The low resolution image processing section 33 sets a predetermined three-dimensional position in a three-dimensional coordinate system of the multi camera 11 (hereinafter referred to as camera coordinate system) as a viewpoint and performs mapping (perspective projection) of picked up images of the cameras supplied thereto from the multi camera 11 to a regular octahedron centered at the viewpoint to generate a texture image of the omnidirectional image. Further, the low resolution image processing section 33 generates z images of the omnidirectional image by mapping z images of the cameras supplied from the depth detection section 31 to a regular octahedron similarly to the picked up images.

The low resolution image processing section 33 converts a reciprocal 1/z of each pixel of the z images of the omnidirectional image into a reciprocal 1/r. Then, the low resolution image processing section 33 performs 8-bit quantization for the reciprocal 1/r in accordance with the following expression (1).

[Math. 1]

$$I_d(r) = \text{round}\left[255\left(\frac{1}{r} - \frac{1}{r_{max}}\right) / \left(\frac{1}{r_{min}} - \frac{1}{r_{max}}\right)\right] \quad (1)$$

It is to be noted that $I_d(r)$ is a value after the 8-bit quantization of the reciprocal 1/r of the distance r. $r_{max}$ and $r_{min}$ are a maximum value and a minimum value of the distance r in the omnidirectional image, respectively.

The low resolution image processing section 33 sets values of the reciprocals 1/r of the pixels of the omnidirectional image after the 8-bit quantization as pixel values to generate depth images of the omnidirectional image.

The low resolution image processing section 33 reduces the resolution of the texture images and the depth images of the omnidirectional image to generate low resolution texture images and low resolution depth images. The low resolution image processing section 33 compression encodes the low resolution texture images and the low resolution depth images and stores low resolution texture streams and low resolution depth streams obtained as a result of the compression encoding. The low resolution image processing section 33 transmits the low resolution texture streams and the low resolution depth streams stored therein to the home server 13 of FIG. 1.

The high resolution image processing section 34 uses the picked up images of the cameras supplied from the multi camera 11 to generate texture images of the first layer and the second layer corresponding to the six faces configuring a cube having the center same as that of the regular octahedron in the low resolution image processing section 33. The high resolution image processing section 34 uses the z images of the cameras supplied from the depth detection section 31 to generate depth images of the first layer and the second layer corresponding to the six faces similarly to the picked up images.

The high resolution image processing section 34 compression encodes the texture images and the depth images of the first layer and the second layer for each face, each kind of image and each layer. The content server 12 stores first layer texture streams, first layer depth streams, second layer texture streams and second layer depth streams obtained as a result of the compression encoding.

Further, the high resolution image processing section 34 generates and stores metadata. The content server 12 transmits the first layer texture streams, first layer depth streams, second layer texture streams and second layer depth streams of the six faces and the metadata stored therein to the home server 13 through a network not depicted.

(Configuration Example of High Resolution Image Processing Section)

Figure 3:
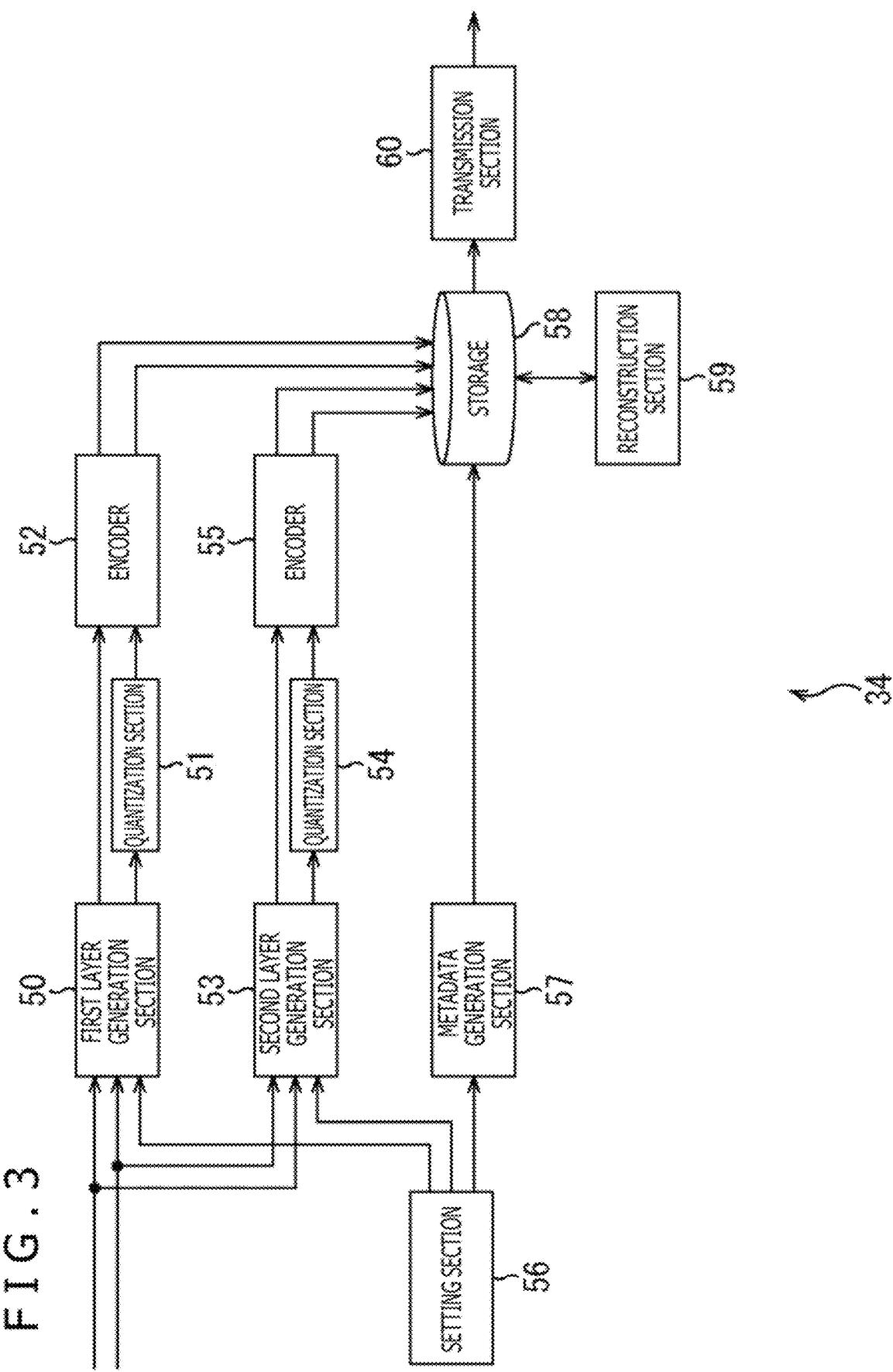
FIG. 3 is a block diagram depicting a configuration example of a high resolution image processing section.

FIG. 3 is a block diagram depicting a configuration example of the high resolution image processing section 34 of FIG. 2.

The high resolution image processing section 34 of FIG. 3 includes a first layer generation section 50, a quantization section 51, an encoder 52, a second layer generation section 53, another quantization section 54, another encoder 55, a setting section 56, a metadata generation section 57, a storage 58, a reconstruction section 59 and a transmission section 60.

To the first layer generation section 50, viewpoint position information indicative of the origin as a three-dimensional position of the viewpoint of the first layer in a three-dimensional coordinate system whose origin is given by the viewpoint of the omnidirectional image in the camera coordinate system (hereinafter referred to as 3D model coordinate system) is supplied from the setting section 56. Further, to the first layer generation section 50, face information indicative of three-dimensional positions and sizes in the 3D model coordinate system of six faces individually including the six faces configuring a cube centered at the origin of the 3D model coordinate system is supplied.

The first layer generation section 50 sets the origin indicated by the viewpoint position information to the viewpoint of the first layer (first viewpoint). The first layer generation section 50 (image generation section) performs, setting the viewpoint of the omnidirectional image in the camera coordinate system as the origin, mapping of the picked up images supplied from the multi camera 11 of FIG. 1 individually to the faces of the three-dimensional positions and the sizes indicated by the face information of the six faces from the viewpoint of the first layer. Consequently, the first layer generation section 50 generates texture images of the six faces of the first layer.

Further, the first layer generation section 50 (image generation section) performs, setting the viewpoint of the omnidirectional image in the camera coordinate system as the origin, mapping of the z images supplied from the depth detection section 31 of FIG. 2 individually to the faces of the three-dimensional positions and the sizes indicated by the face information of the six faces from the viewpoint of the first layer. Consequently, the first layer generation section 50 generates z images of the six faces of the first layer.

Since the viewpoints corresponding to the six faces of the first layer are same as each other, it can be regarded that the texture images of the six faces of the first layer are images obtained by mapping the omnidirectional image mapped to the 3D model centered at the viewpoint of the first layer to the six faces. Similarly, it can be regarded that the z images of the six faces of the first layer are images obtained by mapping the z images of the omnidirectional image mapped to the 3D model centered at the viewpoint of the first layer to the six faces. The first layer generation section 50 supplies the texture images of the six faces of the first layer to the encoder 52, and supplies the z images of the six faces of the first layer to the quantization section 51.

The quantization section 51 converts the reciprocal 1/z of each pixel of the z image of each of the six faces of the first layer supplied from the first layer generation section 50 into a reciprocal 1/r. Then, the quantization section 51 performs 8-bit quantization for the reciprocal 1/r in accordance with the expression (1) given hereinabove. It is to be noted that $r_{max}$ and $r_{min}$ in the expression (1) are a maximum value and a minimum value of the distance r of all of the six faces, respectively. By setting $r_{max}$ and $r_{min}$ as a maximum value and a minimum value of the distance r of all of the six faces, it can be prevented that the quantization step changes for each face in comparison with an alternative case in which a maximum value and a minimum value of the distance r of each face are applied. The quantization section 51 generates depth images of the six faces of the first layer by setting the values after the 8-bit quantization for the reciprocal 1/r of the pixels of the z images of the six faces of the first layer as pixel values and supplies the depth images to the encoder 52.

The encoder 52 compression encodes the texture images and the depth images of the six faces of the first layer for each face and for each kind of image to generate first layer texture streams and first layer depth streams. The encoder 52 supplies the first layer texture streams and the first layer depth streams to the storage 58.

To the second layer generation section 53, viewpoint position information of a viewpoint (second viewpoint), different from the viewpoint of the first layer, of each face of the second layer corresponding to each face of the first layer and face information of each face of the second layer corresponding to each face of the first layer are supplied from the setting section 56. The second layer generation section 53 sets, for each face of the second layer, a three-dimensional position indicated by the viewpoint position information corresponding to the face to a viewpoint of the second layer.

The second layer generation section 53 (image generation section) performs, for each face of the second layer, mapping of an occlusion region at the viewpoint of the first layer from within picked up images supplied from the multi camera 11 from the viewpoint of the second layer corresponding to the face of the second layer, onto the face of the second layer. Consequently, the second layer generation section 53 generates texture images of the six faces of the second layer.

Further, the second layer generation section 53 (image generation section) performs, for each face of the second layer, mapping of an occlusion region at the viewpoint of the first layer from within z images supplied from the depth detection section 31 from the viewpoint of the second layer corresponding to the face of the second layer, onto the face of the second layer. Consequently, the second layer generation section 53 generates z images of the six faces of the second layer.

In particular, since the positions of the cameras of the multi camera 11 are different from each other, when one three-dimensional position in the camera coordinate system is set as a viewpoint, the picked up image includes an occlusion region at the viewpoint. However, since a texture image of the first layer is generated by mapping the omnidirectional image at one viewpoint, a texture image of the first layer does not include a picked up image of the occlusion region at the viewpoint. Therefore, the second layer generation section 53 includes a picked up image in the occlusion region as a texture image of the second layer. This similarly applies also to a z image. The second layer generation section 53 supplies the texture images of the six faces of the second layer to the encoder 55 and supplies the z images of the six faces of the second layer to the quantization section 54.

The quantization section 54 converts the reciprocals 1/z of the pixels of the z images of the six faces of the second layer supplied from the second layer generation section 53 into reciprocals 1/r. Then, the quantization section 54 performs 8-bit quantization for the reciprocals 1/r in accordance with the expression (1) given hereinabove similarly to the quantization section 51. The quantization section 54 generates depth images of the six faces of the second layer by setting values after the 8-bit quantization of the reciprocals 1/r of the pixels of the z images of the six faces of the second layer as pixel values and supplies the depth images to the encoder 55.

The encoder 55 compression encodes the texture images and the depth images of the six faces of the second layer for each face and for each kind of image to generate second layer texture streams and second layer depth streams. The encoder 55 supplies the second layer texture streams and the second layer depth streams to the storage 58.

The setting section 56 sets the origin of the 3D model coordinate system as the viewpoint of the first layer. The setting section 56 sets the six faces individually including the six rectangular faces configuring the cube centered at the viewpoint of the first layer as faces of the first layer. Further, the setting section 56 sets, for each face of the first layer, a viewpoint and a rectangular face of the second layer.

The setting section 56 supplies the viewpoint position information of one viewpoint and the face information of the six faces of the first layer to the first layer generation section 50 and the metadata generation section 57. Further, the setting section 56 supplies the viewpoint position information of the six viewpoints and the face information of the six faces of the second layer corresponding to the six faces of the first layer to the second layer generation section 53 and the metadata generation section 57.

The metadata generation section 57 generates a table including the viewpoint position information and the face information of the first layer and the viewpoint position information and the face information of the second layer supplied thereto from the setting section 56 as metadata and supplies the metadata to the storage 58.

The storage 58 stores the first layer texture streams and the first layer depth streams supplied from the encoder 52 and the second layer texture streams and the second layer depth streams supplied from the encoder 55. Further, the storage 58 stores the metadata supplied from the metadata generation section 57.

Further, the storage 58 stores the first layer texture streams, first layer depth streams, second layer texture streams and second layer depth streams and the metadata after reconstruction supplied from the reconstruction section 59.

The reconstruction section 59 reads out and reconstructs the first layer texture streams, first layer depth streams, second layer texture streams and second layer depth streams stored in the storage 58 as occasion demands.

In particular, the reconstruction section 59 uses the first layer texture streams before the reconstruction to change the number or the angle of view of the faces corresponding to the first layer texture streams and uses the first layer depth streams before the reconstruction to change the number or the angle of view of the faces corresponding to the first layer depth streams. For example, the reconstruction section 59 changes the faces of the first layer from six faces individually including six faces configuring a cube into 18 faces including, in addition to the six faces, 12 faces in which normals individually passing the centers of the six faces are lines that pass the midpoints of the 12 sides of the cube and the viewpoint.

As an alternative, the reconstruction section 59 uses the first layer texture streams before the reconstruction to change the distance between (density of) the faces corresponding to the first layer texture streams and uses the first layer depth streams before the reconstruction to change the distance between the faces corresponding to the first layer depth streams. For example, the reconstruction section 59 changes the faces of the first layer from six faces individually including six faces configuring a cube in which the distance between normals passing the center is 90 degrees into 18 faces the centers of which normal lines thereto having a distance of 45 degrees pass.

As the distance between the faces of the first layer decreases, the total data capacity increases because the number of faces increases, and the home server 13 can generate a display image using texture images and depth images corresponding to a plane of the first layer that is closer to the viewing range of the viewer. As a result, high resolution regions generated using texture images and depth images of the first layer or the second layer in the display image increase and the picture quality of the display image is improved.

It is to be noted that the reconstruction section 59 may use first layer texture streams before the reconstruction to change the position of faces corresponding to the first layer texture streams and use first layer depth streams before the reconstruction to change the position of faces corresponding to the first layer depth streams to perform reconstruction. In this case, the reconstruction section 59 performs reconstruction by rotating the cube corresponding to the six faces of the first layer such that, for example, when a main imaging object exists on the boundary of a face of the first layer, the main imaging object exists at a position other than the boundary of the first layer (for example, at the center).

Further, the reconstruction section 59 may use the first layer texture streams before reconstruction to change the inclination of the faces corresponding to the first layer texture streams and may use the first layer depth streams before reconstruction to change the inclination of the faces corresponding to the first layer depth streams to perform reconstruction. In this case, the reconstruction section 59 performs reconstruction, for example, by rotating, when a main imaging object in a texture image of the first layer is inclined, the cube corresponding to the six faces of the first layer such that the inclination disappears.

The reconstruction section 59 sets the viewpoints and the faces of the second layer after reproduction with respect to the faces of the first layer changed in such a manner as described above. Then, the reconstruction section 59 uses the second layer texture streams before reconstruction to change the viewpoints and the faces of the second layer texture streams to viewpoints and faces of the second layer after set reconstruction. Further, the reconstruction section 59 changes the second layer depth streams before reconstruction to change the viewpoints and the faces corresponding to the second layer depth streams to viewpoints and faces of the second layer after set reconstruction.

The reconstruction section 59 supplies the first layer texture streams, first layer depth streams, second layer texture streams and second layer depth streams after the reconstruction to the storage 58. Further, the reconstruction section 59 generates a table that includes the viewpoint position information and the face information of the first layer and the viewpoint position information and the face information of the second layer after the reconstruction as metadata and supplies the metadata to the storage 58.

The transmission section 60 reads out the first layer texture streams, first layer depth streams, second layer texture streams and second layer depth streams of the six faces and the metadata from the storage 58 and transmits them to the home server 13 of FIG. 1.

In this manner, the high resolution image processing section 34 of FIG. 3 generates a first layer image and a second layer image by perspective projection. Accordingly, the home server 13 can perform ordinary image processing for the first layer image and the second layer image. Further, the high resolution image processing section 34 can transmit the first layer texture streams, first layer depth streams, second layer texture streams and second layer depth streams by an ordinary transmission method for an encoded stream of an image.

(Description of Distance z and Distance r)

Figure 4:
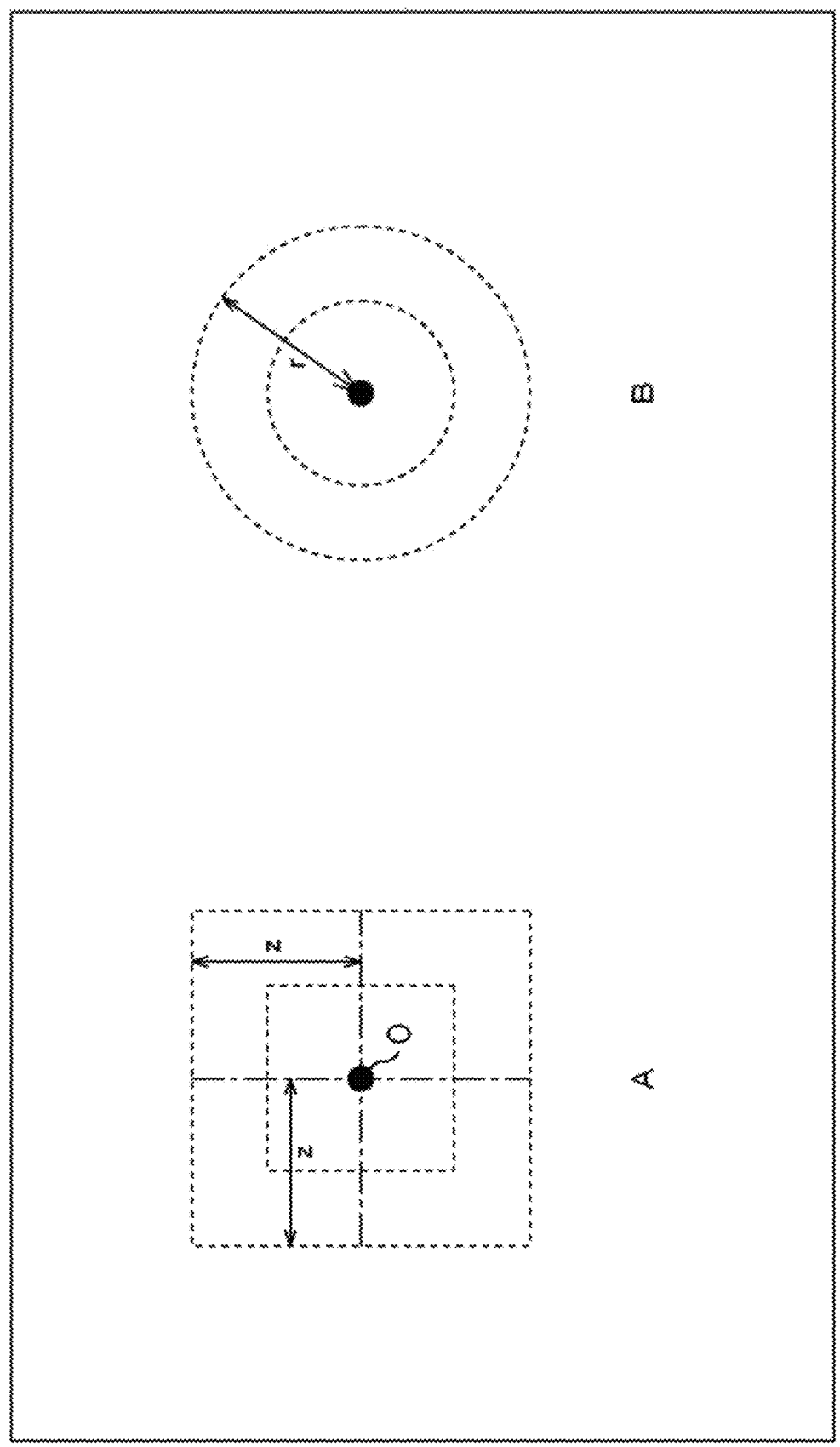
FIG. 4 is a view illustrating a distance z and a distance r.

FIG. 4 is a view illustrating a distance z and a distance r.

It is to be noted that FIG. 4 is a view when a predetermined face of a cube corresponding to the first layer is viewed from above.

The distance z is a distance in the depth direction from a viewpoint to a depth plane perpendicular to the depth direction including an imaging object on each pixel. Further, the depth direction of each face of the first layer is a direction perpendicular to the face of the first layer. Accordingly, each face of the first layer and the depth plane are parallel to each other. Therefore, the shape of equal distance z faces that are depth planes whose distances z to the faces of the first layer are equal to each other is a cubic shape centered at the viewpoint O of the first layer. Accordingly, the shape of the equal distance z plane as viewed from above a predetermined face of the cube corresponding to the first layer is a square as indicated by a broken line in A of FIG. 4.

In contrast, the distance r is a linear distance from the viewpoint to an imaging object in each pixel. Further, the direction of a linear line from the viewpoint O of each face of the first layer to an imaging object is, irrespective of the face, a radial direction of a circle centered at the viewpoint O. Accordingly, the shape of the equal distance r face to which the distances r from the faces of the first layer are equal to each other is a spherical shape centered at the viewpoint O of the first layer. Therefore, the shape when the equal distance r face is viewed from above a predetermined face of the cube corresponding to the first layer is a circular shape as indicated by a broken line in B of FIG. 4.

(Description of Effect of Depth Image)

It is to be noted that, in the following description, from among normal vectors to six faces configuring a cube 80 corresponding to the first layer, which normal vectors pass the viewpoint O of the first layer and the center of the six faces, three normal vectors orthogonal to each other are defined as positive directions of an X axis, a Y axis and a Z axis of a 3D model coordinate system and three normal vectors in the opposite directions to the former three normal vectors are defined as negative directions of the X axis, Y axis and Z axis of the 3D model coordinate system.

Figure 5:
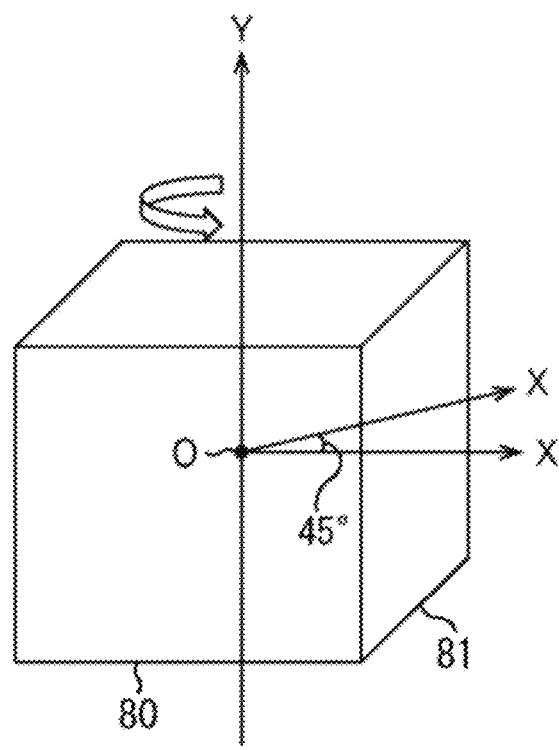
FIG. 5 is a view depicting a variation of an X axis of a 3D model coordinate system.
Figure 6:
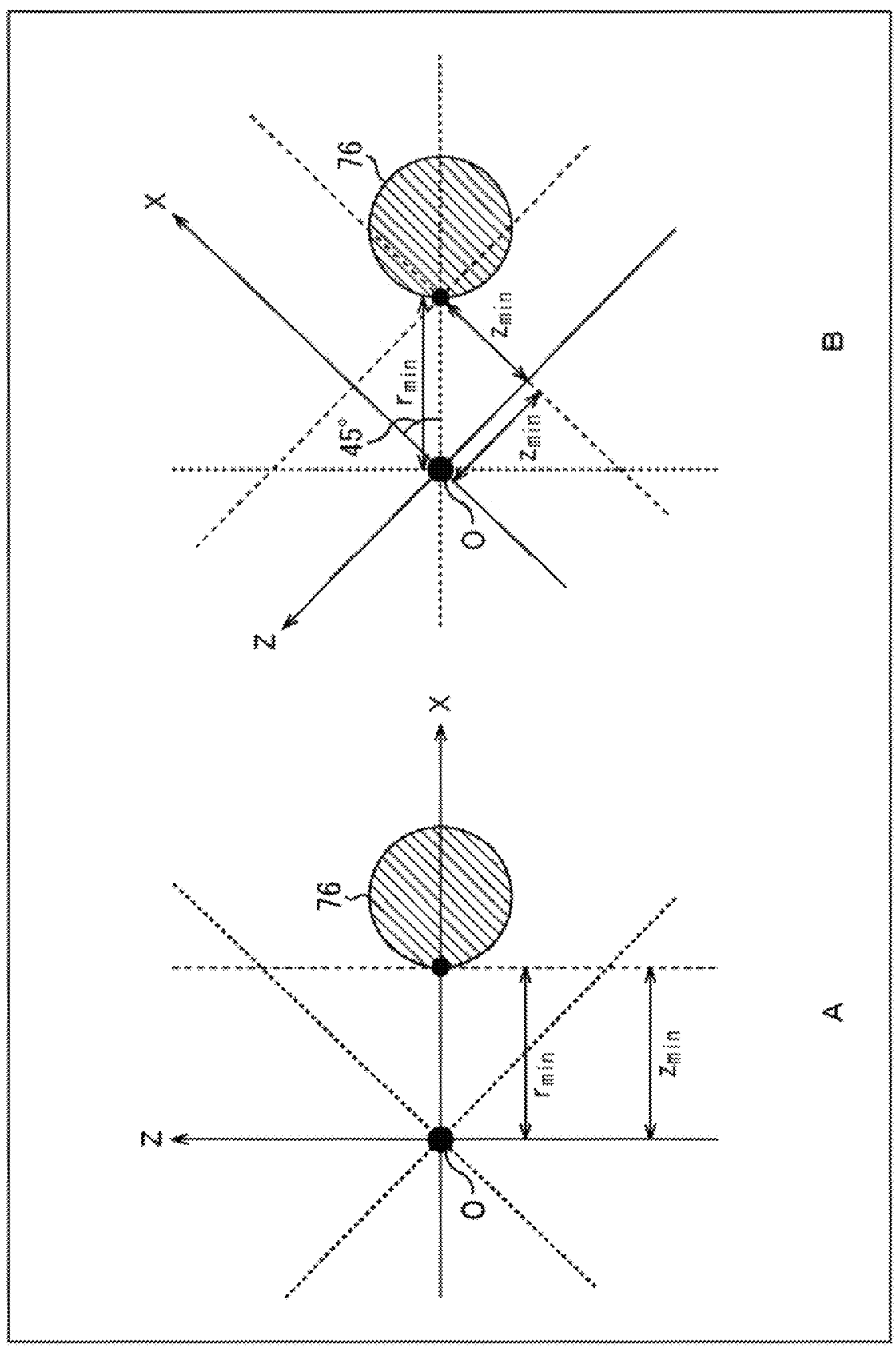
FIG. 6 is a view illustrating a variation of a minimum value $z_{min}$ and a minimum value $r_{min}$ responsive to the variation of the X axis of the 3D model coordinate system.

FIG. 5 is a view depicting a variation of the X axis of the 3D model coordinate system, and FIG. 6 is a view depicting a variation of a minimum value $z_{min}$ and a minimum value $r_{min}$ responsive to the variation of the X axis of the 3D model coordinate system.

Note that it is assumed that, in the examples of FIGS. 5 and 6, the angle of view of the faces of the first layer is 90 degrees.

In the case where the cube 80 corresponding to the first layer is rotated by 45 degrees on an XZ plane around the Y axis as described in FIG. 5 to change the position of the faces of the first layer, the X axis is rotated by 45 degrees on the XZ plane. Consequently, the depth direction of the face 81 of the first layer to which the normal vector is the positive direction of the X axis rotates by 45 degrees on the XZ plane.

Accordingly, when a sphere 76 centered at a position whose X coordinate is a positive value and whose Z coordinate is 0 exists as an imaging object within an angle of view of the face 81 as depicted in FIG. 6, the minimum value $z_{min}$ of the face 81 before rotation is a minimum value of the distance in the positive direction of the X axis in A of FIG.

6 between the viewpoint O and the sphere 76 as depicted in A of FIG. 6. However, the minimum value $z_{min}$ of the face 81 after rotation is a minimum value of the distance in the positive direction of the X axis in B of FIG. 6 between the viewpoint O and the sphere 76 in the angle of view (upper half of the sphere 76 in B of FIG. 6) as depicted in B of FIG. 6.

Further, in the case of the example of FIG. 6, since the maximum value $z_{max}$ of the face 81 before rotation is infinite, also the maximum value $z_{max}$ of the face 81 after rotation is infinite. However, in the case where the maximum value $z_{max}$ is not infinite, the maximum value $z_{max}$ of the face 81 changes before and after the rotation from a reason similar to that of the minimum value $z_{min}$. Also in regard to the other faces of the first layer, the minimum value $z_{min}$ and the maximum value $z_{max}$ change similarly.

Further, although description is omitted, also in the case where the angle of view of, the number of or the distance between the faces of the first layer is changed, the minimum value $z_{min}$ and the maximum value $z_{max}$ of all faces of the first layer vary.

Accordingly, if the reciprocal 1/z of the distance z is used as the y value (luminance value) of each pixel of depth images of the first layer, then upon reconstruction by the reconstruction section 59, it is necessary to re-calculate the minimum value $z_{min}$ and the maximum value $z_{max}$ of each face and re-determine the minimum value $z_{min}$ and the maximum value $z_{max}$ of all faces. As a result, it is necessary to redo the 8-bit quantization of the depth images.

In contrast, the direction of a straight line from the viewpoint O to an imaging object is the same irrespective of the position of the faces of the first layer. Accordingly, even in the case where the cube 80 is rotated by 45 degrees on the XZ plane around the Y axis as depicted in FIG. 5, the minimum value $r_{min}$ and the maximum value $r_{max}$ remain the same.

In particular, even if the X axis in A of FIG. 6 is rotated by 45 degrees on the XZ plane, the direction of the straight line from the viewpoint O to the imaging object is a direction extending radially from the viewpoint O as depicted in B of FIG. 6 similarly as before rotation. Accordingly, irrespective of rotation of the X axis, the minimum value $r_{min}$ with regard to all faces of the first layer is a minimum value of the distance of a straight line from the viewpoint O to the sphere 76. Also the maximum value $r_{max}$ with regard to all faces of the first layer does not vary before and after rotation from a reason similar to that in the case of the minimum value $r_{min}$.

Further, although description is omitted, even in the case where the angle of view, number or distance of the faces of the first layer is changed, since the direction of a linear line from the viewpoint O to an imaging object does not change, the minimum value $r_{min}$ and the maximum value $r_{max}$ do not vary.

Accordingly, by using not the reciprocal 1/z but a quantization value of the reciprocal 1/r as the y value of each pixel of the depth images of the first layer, it is possible to reduce the process for redoing 8-bit quantization of the depth images upon reconstruction by the reconstruction section 59.

It is to be noted that, while, in the foregoing description, the low resolution texture stream and the low resolution depth stream are not reconstructed, they may otherwise be reconstructed. Also in this case, since the y value of each pixel of the low resolution depth image is a quantization value of the reciprocal 1/r, the process for redoing 8-bit quantization of the low resolution depth image upon reconstruction can be reduced similarly as upon reconstruction of the depth image of the first layer.

Further, reconstruction of the low resolution texture streams and the low resolution depth streams may be performed by changing the mapping method of the low resolution texture streams and the low resolution depth streams. Also in this case, by setting the y values of the pixels of the depth images to quantization values of the reciprocals 1/r, the process for redoing 8-bit quantization of the low resolution depth images upon reconstruction can be reduced.

(Example of Position on Sphere of Each Pixel of Depth Image of Six Faces of First Layer)

Figure 7:
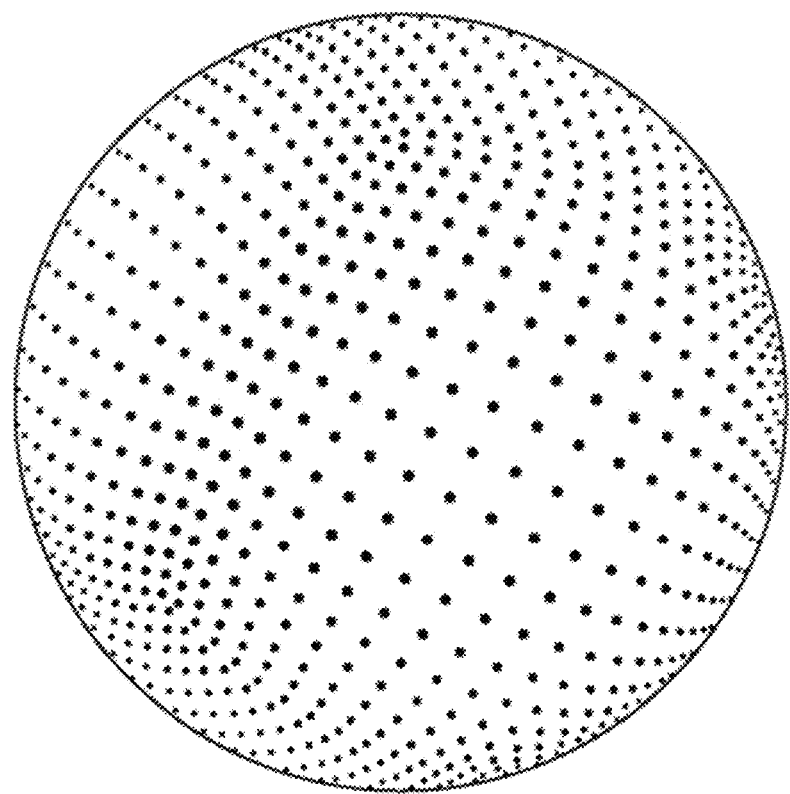
FIG. 7 is a view depicting an example of a position of each pixel on a sphere when depth images of six faces of a first layer are mapped on the sphere.

FIG. 7 is a view depicting an example of the position of each pixel on a sphere when depth images of the six faces of the first layer are mapped to the sphere.

It is to be noted that, in FIG. 7, the position of each pixel on a sphere when depth images of the six faces of the first layer are mapped to the sphere is represented by a point.

The distances between positions on the depth image of the pixels of the depth images of the faces of the first layer are equal to each other. However, as depicted in FIG. 7, the distances between the positions on the sphere of the pixels when the depth images of the six faces of the first layer are mapped to the sphere are not equal distances. In other words, the density of positions of the pixels on the sphere when the depth images of the six faces of the first layer are mapped to the sphere is not fixed.

(Example of Faces of First Layer)

Figure 8:
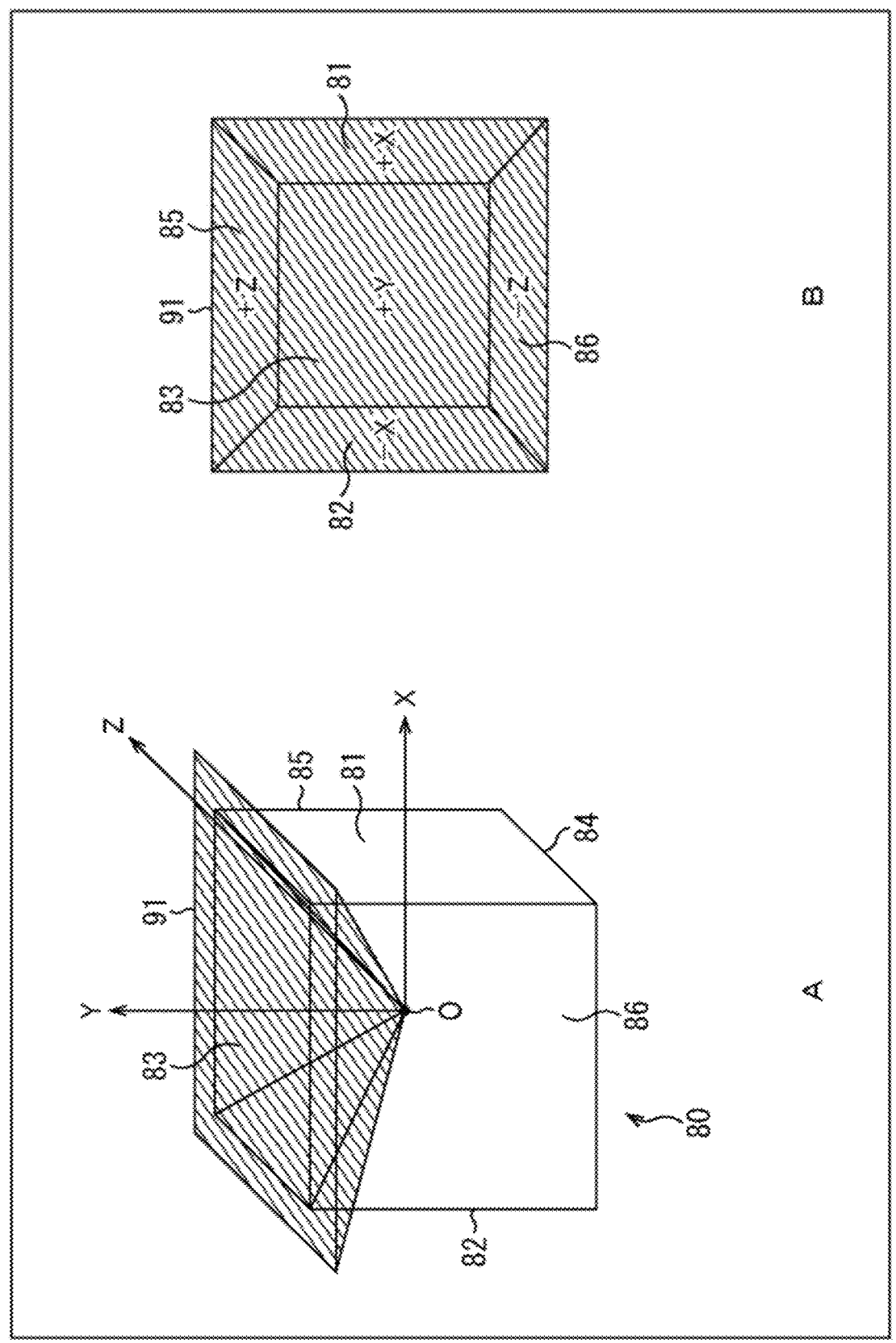
FIG. 8 is a view depicting an example of faces of the first layer.

FIG. 8 is a view depicting an example of faces of the first layer.

It is to be noted that, in the following description, the face that satisfies X=R when the distances between the viewpoint O and the six faces are represented by R is suitably referred to as +X face, and the face that satisfies X=−R is suitably referred to as −X face. Similarly, the face that satisfies Y=R, the face that satisfies Y=−r, the face that satisfies Z=R and the face that satisfies Z=−R are suitably referred to as +Y face, −Y face, +Z face and −Z face, respectively.

Further, A of FIG. 8 is a perspective view of the cube 80 of the first layer, and B of FIG. 8 is a view when the cube 80 of the first layer is viewed in the negative direction of the Y axis.

As depicted in A of FIG. 8, one face 91 of the first layer is a face including the +Y face 83 from among the six faces 81 to 86 configuring the cube 80 centered at the viewpoint O. More particularly, the face 91 is a face that is set to a position same as that of the +Y face 83 and has angles of view in the transverse direction and the vertical direction that are greater than 90 degrees that is an angle of view of the +Y face 83 but is smaller than 180 degrees.

Accordingly, as depicted in B of FIG. 8, the texture image of the face 91 includes not only a texture image mapped to the +Y face 83 but also part of texture images mapped to the +X face 81, −X face 82, +Z face 85 and −Z face 86 neighboring with the +Y face 83. The description just given in regard to the texture images similarly applies also to the depth images of the face 91.

While only one face 91 of the first layer is depicted in FIG. 8, also the other five faces are faces that are set to positions same as those of the +X face 81, −X face 82, −Y face 84, +Z face 85 and −Z face 86 and have angles of view in the transverse direction and the vertical direction that are greater than 90 degrees but smaller than 180 degrees similarly to the face 91.

As described above, since the six faces of the first layer are configured so as to individually include the six faces 81 to 86 configuring a cube, an omnidirectional image is mapped to one of the six faces of the first layer without fail. Accordingly, if the home server 13 uses three faces neighboring with each other from among the six faces of the first layer, then it can generate a display image in an arbitrary direction over 360 degrees around in the horizontal direction and 180 degrees around in the vertical direction with the viewpoint O set as a viewing position.

(Configuration Example of Table of Viewpoint Position Information and Face Information of First Layer)

FIG. 9 is a view depicting a configuration example of a table of viewpoint position information and face information of the first layer from among metadata generated by the metadata generation section 57 of FIG. 3.

In the example of FIG. 9, from within face information, information indicative of a three-dimensional position of a face in the 3D model coordinate system is an azimuth angle, an elevation angle, a rotation angle and a sight line vector, and information indicative of a size is a transverse angle of view and a vertical angle of view.

The azimuth angle is an angle in an XZ plane direction defined by a line interconnecting a viewpoint and the center of each face and the Z axis, and the elevation angle is an angle defined by the line interconnecting the viewpoint and the center of each face and the XZ plane. Here, in the azimuth angle, the clockwise direction is positive direction, and in the elevation angle, the counterclockwise direction is a positive direction. A line when a line extending in the Z-axis direction from the viewpoint is horizontally rotated by the azimuth angle on the XZ plane and then is rotated upwardly or downwardly by the elevation angle in the Y-axis direction is a normal that passes the center of the face.

The rotation angle is an angle in the rotation direction of each face when a line interconnecting the viewpoint and the center of the face is taken as an axis. Here, in the rotation angle, the clockwise direction is a positive direction. The sight line vector is a vector that is directed to the center of each face from a starting point given by the viewpoint and has a length of 1, namely, a normal vector that passes the center of each face. The transverse angle of view is an angle defined by two lines interconnecting two end portions in the transverse direction of each face and the viewpoint, and the vertical angle of view is an angle defined by two lines interconnecting two end portions in the vertical direction of each face and the viewpoint.

As depicted in FIG. 9, in the table of viewpoint position information and face information of the first layer, the first layer texture streams of each face and a common portion of file names of files in which the first layer depth streams are placed are registered in the storage 58 of FIG. 3.

In particular, in the example of FIG. 9, the file names of the first layer texture streams of the faces including the +Z face 85, −Z face 86, +X face 81, −X face 82, +Y face 83 and −Y face 84 are posZ_texture, negZ_texture, posX_texture, negX_texture, posY_texture and negY_texture, respectively. Further, the file names of the first depth streams of the faces including the +Z face 85, −Z face 86, +X face 81, −X face 82, +Y face 83 and −Y face 84 are posZ_depth, negZ_depth, posX_depth, negX_depth, posY_depth and negY_depth, respectively. Accordingly, in the table of FIG. 9, posZ, negZ, posX, negX, posY and negY are registered as the common portions of the file names of the faces of the first layer are registered.

Further, in the table of viewpoint position information and face information of the first layer, in an associated relationship with a common portion of a file name, face information, viewpoint position information, and a transverse pixel number and a vertical pixel number of a texture image and a depth image of the face corresponding to the common portion of the file name are registered.

In particular, the angles in the XZ plane direction defined by lines individually interconnecting the center of the faces of the first layer including the +Z face 85, −Z face 86, +X face 81, −X face 82, +Y face 83 and −Y face 84 and the viewpoint O and the Z axis are 0 degrees, −180 degrees, 90 degrees, −90 degrees, 0 degrees and 0 degrees, respectively, and the angles with respect to the XZ plane are 0 degrees, 0 degrees, 0 degrees, 0 degrees, 90 degrees and −90 degrees, respectively. Accordingly, the azimuth angles "0 degrees," "−180 degrees," "90 degrees," "−90 degrees," "0 degrees" and "0 degrees" are registered and the elevation angles "0 degrees," "0 degrees," "0 degrees," "0 degrees," "90 degrees" and "−90 degrees" are registered in an associated relationship with the common portions "posZ," "negZ," "posX," "negX," "posY" and "negY" of the file names, respectively.

Further, in the example of FIG. 9, the rotation angles of all faces of the first layer are 0 degrees. Accordingly, the rotation angle "0 degrees" is registered in an associated relationship with the common portions "posZ," "negZ," "posX," "negX," "posY" and "negY" of the file names. Further, the coordinates (0, 0, 0) of the origin as viewpoint position information is registered in an associated relationship with the common portions "posZ," "negZ," "posX," "negX," "posY" and "negY" of the file names.

Further, the sight line vectors of the faces of the first layer individually including the +Z face 85, −Z face 86, +X face 81, −X face 82, +Y face 83 and −Y face 84 from the viewpoint O are (0, 0, 1), (0, 0, −1), (1, 0, 0), (−1, 0, 0), (0, 1, 0) and (0, −1, 0). Accordingly, the sight line vectors (0, 0, 1), (0, 0, −1), (1, 0, 0), (−1, 0, 0), (0, 1, 0) and (0, −1, 0) are registered in an associated relationship with the common portions "posZ," "negZ," "posX," "negX," "posY" and "negY" of the file names, respectively.

Furthermore, in the example of FIG. 9, the transverse angles of view and the vertical angles of view of all faces of the first layer are 100 degrees greater than 90 degrees, and the transverse pixel number that is the number of pixels in the transverse direction and the vertical pixel number that is the number of pixels in the vertical direction of the texture images and the depth images are 1024. Accordingly, the transverse angle of view "100 degrees," vertical angle of view "100 degrees," transverse pixel number "1024" and vertical pixel number "1024" are registered in an associated relationship with the common portions "posZ," "negZ," "posX," "negX," "posY" and "negY" of the file names, respectively.

(Description of Hierarchization)

Figure 10:
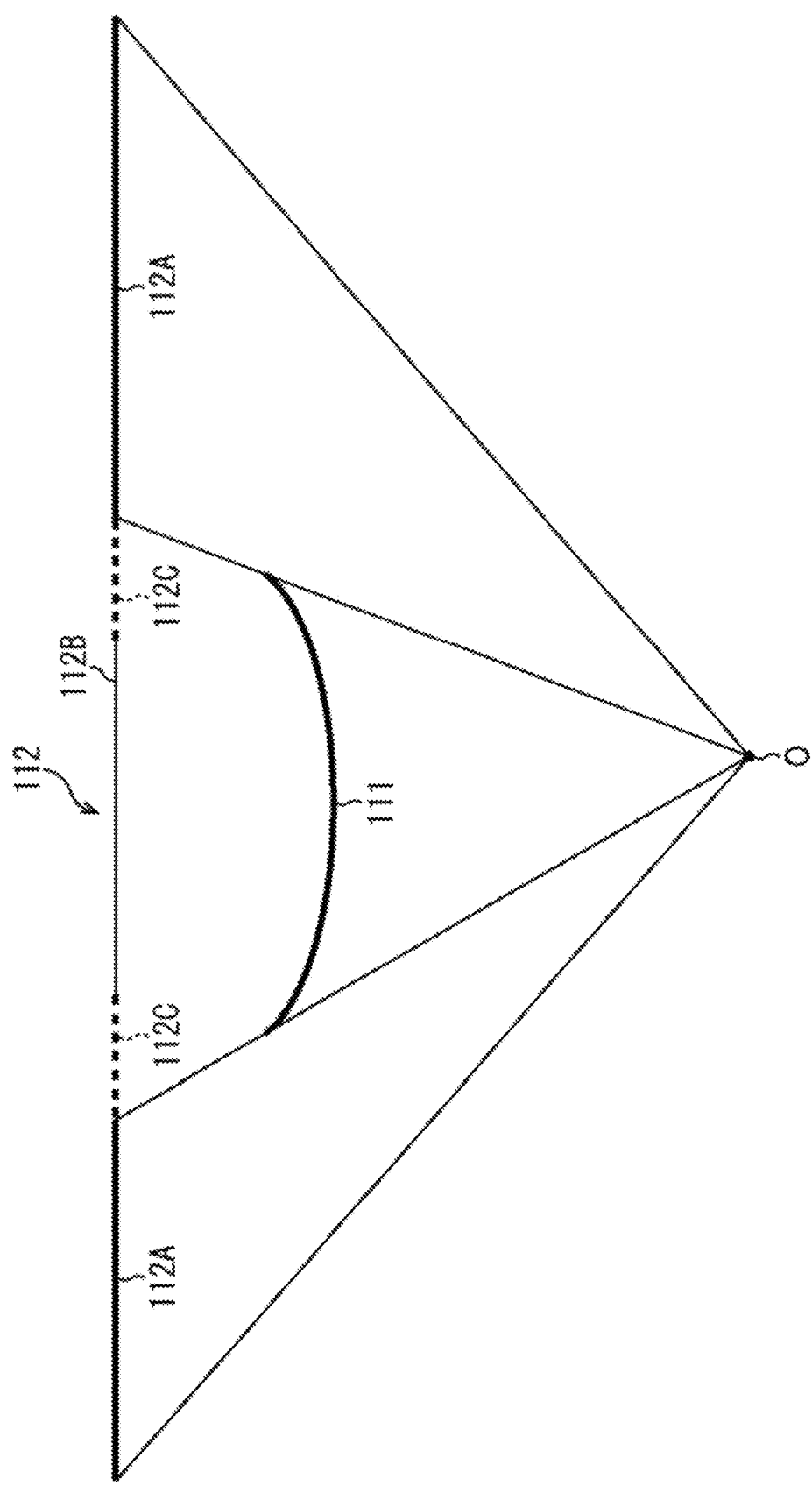
FIG. 10 is a view depicting a position in a depth direction of an imaging object corresponding to a predetermined face of the first layer.
Figure 11:
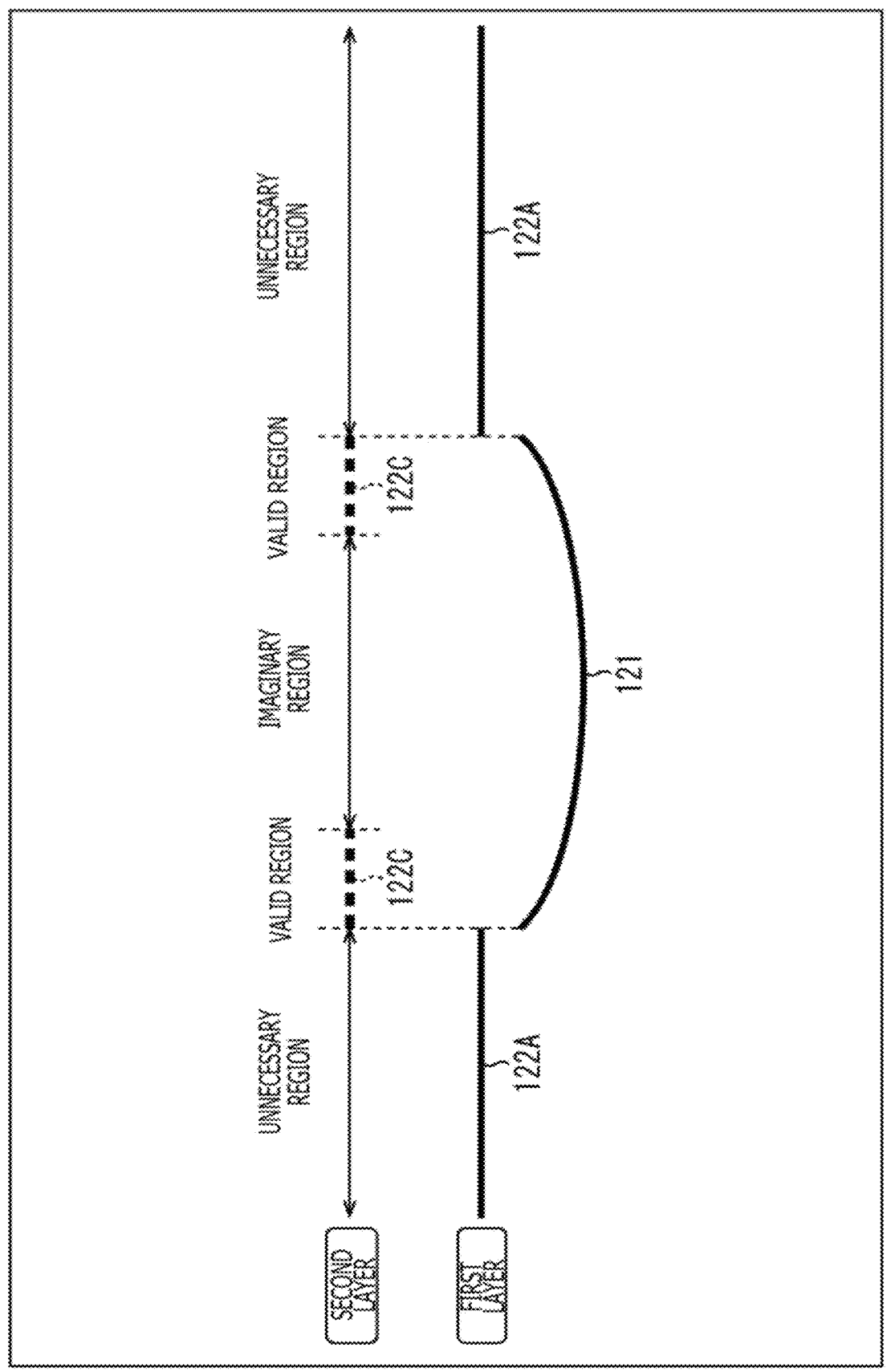
FIG. 11 is a view depicting a configuration example of texture images of the first layer and a second layer.

FIG. 10 is a view depicting a position in the depth direction of an imaging object corresponding to a predetermined face of the first layer, and FIG. 11 is a view depicting a configuration example of the texture images of the first layer and the second layer of the imaging object of FIG. 10 in the case where the viewpoints of the first layer and the second layer are same.

It is to be noted that FIG. 10 is a view of the viewpoint O of the first layer and an imaging object as viewed from above, and the upward and downward direction of FIG. 10 is a depth direction of a predetermined plane of the first layer including the imaging object in the angle of view. Further, in FIG. 11, the leftward and rightward direction and the upward and downward direction represent the transverse direction and the depth direction of the texture image, respectively.

The upward direction in FIGS. 10 and 11 is this side, and the downward direction is the deep side.

In the example of FIGS. 10 and 11, a middle foreground 111 and a background 112 behind the foreground are imaging objects included in a predetermined angle of view of the first layer. In this instance, as depicted in FIG. 11, the texture image of a predetermined face of the first layer includes a picked up image 121 of the foreground 111 and a picked up image 122A in a region 112A of the background 112 that is not hidden by the foreground 111.

On the other hand, the texture image of a face of the second layer corresponding to the predetermined face of the first layer includes, as a valid region, a picked up image 122C in an imaged occlusion region 112C imaged by the multi camera 11 from within an occlusion region 112B of the background 112 shielded by the foreground 111 as depicted in FIG. 11.

Although anything may be placed in a region other than the valid region from within the texture image of the face of the second layer, if a special value such as an invalid value or the like is placed, then the value of the special value varies through compression encoding, resulting in difficulty in reproduction of the special value by decoding by the home server 13.

Accordingly, the region other than the valid region of the texture image of the face of the second layer is divided into an unnecessary region (background region) corresponding to the region 112A, and an imaginary region corresponding to a region other than the imaged occlusion region 112C from within the occlusion region 112B.

Then, in the unnecessary region corresponding to the region 112A in which an occlusion region does not exist, either a picked up image 122A is disposed similarly as in the first layer or a flat image whose edge portion is not steep is disposed. In the case where the picked up image 122A is disposed in the unnecessary region, since the texture images in the first layer and the second layer in the unnecessary region become same, in the case where the texture image of the first layer is compression encoded by an MVC method, a 3D-HEVC method or the like by referring to the texture image of the second layer, the compression ratio can be improved. Further, in the case where a flat image is displayed in the unnecessary region, the compression ratio of the second layer image can be improved in comparison with that in an alternative case in which an image having a steep edge portion is disposed. It is to be noted that the picked up image 122A may be disposed in part of the unnecessary region while a flat image is disposed in the other part.

Further, the imaginary region is a region in which, although an occlusion region exists, imaging is not performed by the multi camera 11 and that corresponds to a region other than the imaged occlusion region 112C from within the occlusion region 112B. Accordingly, in the imaginary region, an inpainted image inferred (inpainted) using the picked up image 122C of the imaged occlusion region 112C is disposed or the picked up image 121 is disposed similarly as in the first layer.

It is to be noted that, for the inpainting, an image picked up in the past may be used. Where the content server 12 performs inpainting, the home server 13 can treat the imaginary region equivalently to the valid region. Further, where the content server 12 performs inpainting before reproduction, also inpainting that is high in processing load and requires much time can be performed.

Further, in the case the picked up image 121 is disposed in the imaginary region, also when imaginary regions are scattered or inpainting is difficult, an imaginary region can be generated readily. An inpainting image may be disposed at part of an imaginary region while the picked up image 121 is disposed at the other part.

It is to be noted that, since the configuration of the depth images of the first layer and the second layer are similar to the configuration of the texture images of the first layer and the second layer except that the picked up image is replaced to the depth image, description of the same is omitted. Further, in the following, a case is described in which a picked up image or a depth image similar to that of the first layer is placed in an unnecessary region and an imaginary region of the second layer.

(Description of Viewpoint of First Layer and Second Layer)

Figure 12:
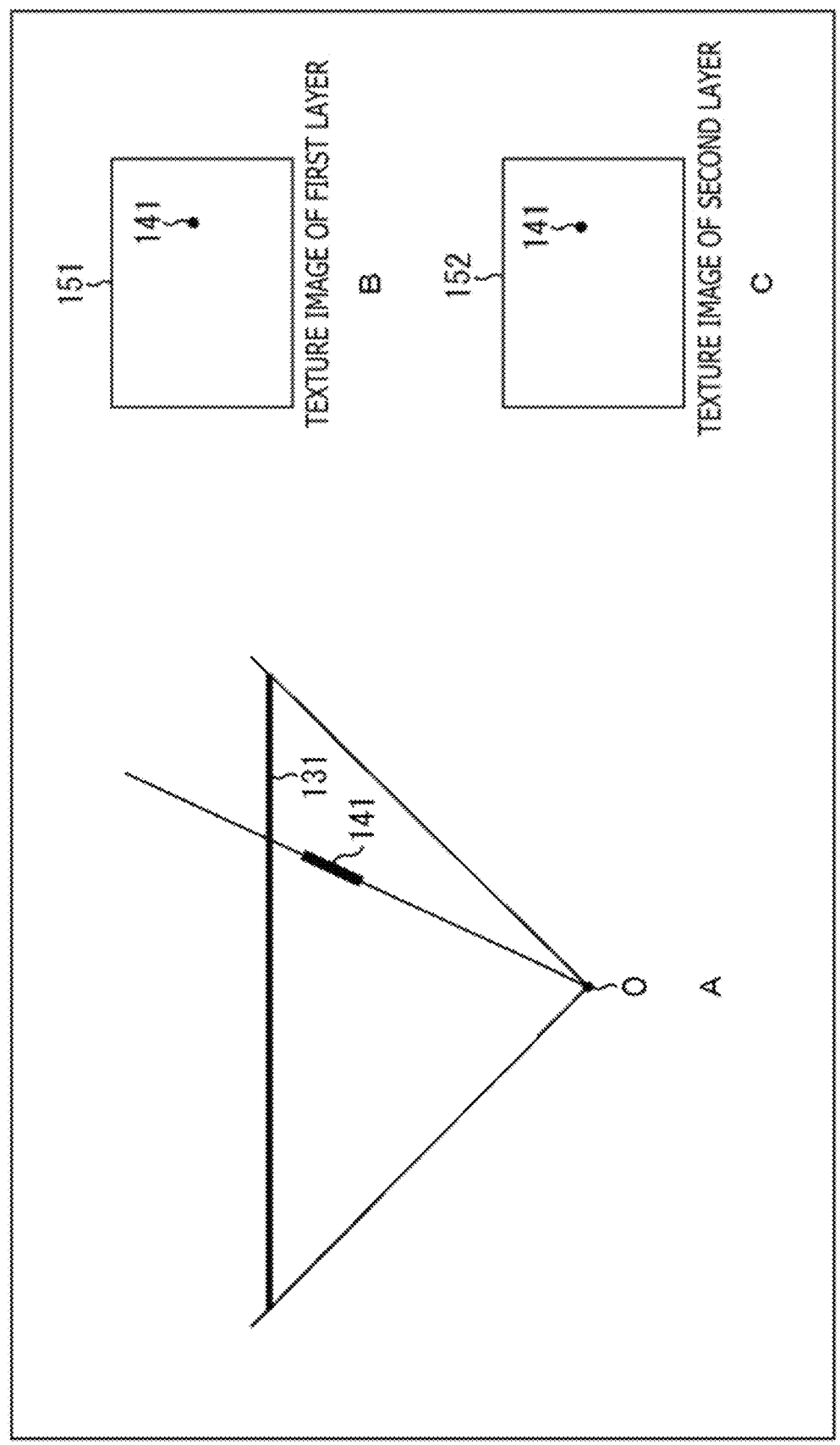
FIG. 12 is a view illustrating an example of texture images of the first layer and the second layer.
Figure 13:
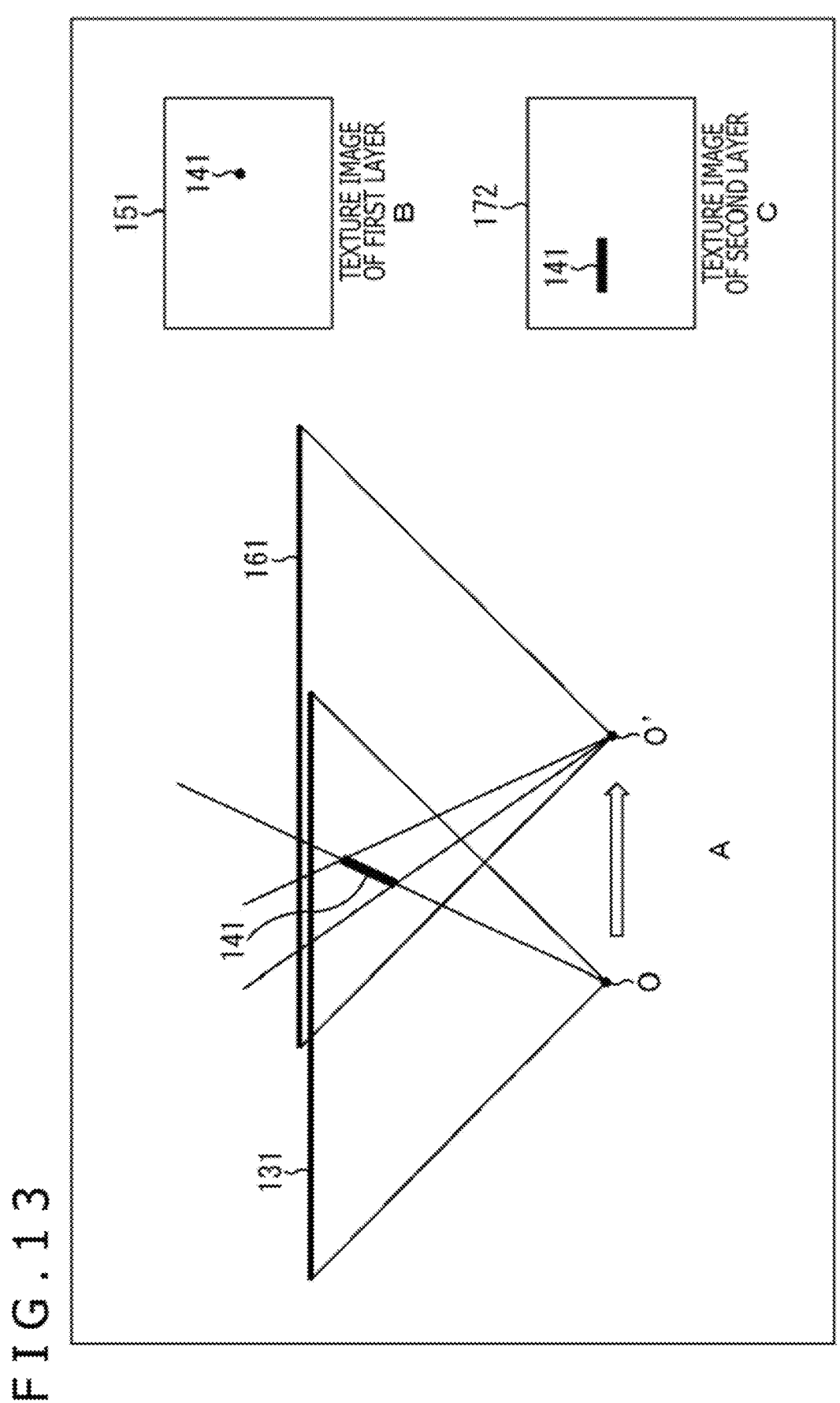
FIG. 13 is a view illustrating another example of texture images of the first layer and the second layer.

FIG. 12 is a view illustrating texture images of the first layer and the second layer corresponding to a predetermined face of the first layer in the case where the viewpoints of the first layer and the second layer are same. FIG. 13 is a view illustrating texture images of the first layer and the second layer corresponding to a predetermined face of the first layer in the case where viewpoints of the first layer and the second layer are different from each other.

A of FIG. 12 and A of FIG. 13 are views of the viewpoint O of the first layer and an imaging object as viewed from above, and the upward and downward direction in A of FIG. 12 and A of FIG. 13 is the depth direction of the predetermine face of the first layer including the imaging object in the angle of view.

As depicted in A of FIG. 12, in the case where the viewpoint of the second layer is the viewpoint O of the first layer, a bar-like imaging object 141 extends to the viewpoint O in the angle of view of a predetermined face 131 of the first layer forms a point in both a texture image 151 of the first layer and a texture image 152 of the second layer.

In particular, since the directions from the viewpoints O of the first layer and the second layer toward the face 131 are same, the imaging object 141 is degenerated to one point in both the texture image 151 of the first layer and the texture image 152 of the second layer. Accordingly, in the texture image 151 and the texture image 152, the length of the imaging object 141 extending in a direction toward the viewpoint O cannot be represented.

In contrast, in the case where the viewpoint of the second layer is the viewpoint O that is different from the viewpoint O of the first layer, the imaging object 141 included in the angle of view of the face 131 of the first layer and a face 161 of the second layer becomes a straight line in a texture image 172 of the second layer.

In particular, the direction from the viewpoint O of the first layer toward the face 131 and the direction from a viewpoint O' of the second layer toward the face 161 are different from each other. Accordingly, even if the imaging object 141 is degenerated to one point in the texture image 151 of the first layer, the imaging object 141 is not degenerated into one point in the texture image 172 of the second layer. Therefore, in the texture image 172, the length of the imaging object 141 extending in a direction toward the viewpoint O can be represented.

From the foregoing, in the content server 12, the viewpoints of the first layer and the second layer are set so as to be different from each other.

(First Example of Viewpoint of Second Layer)

Figure 14:
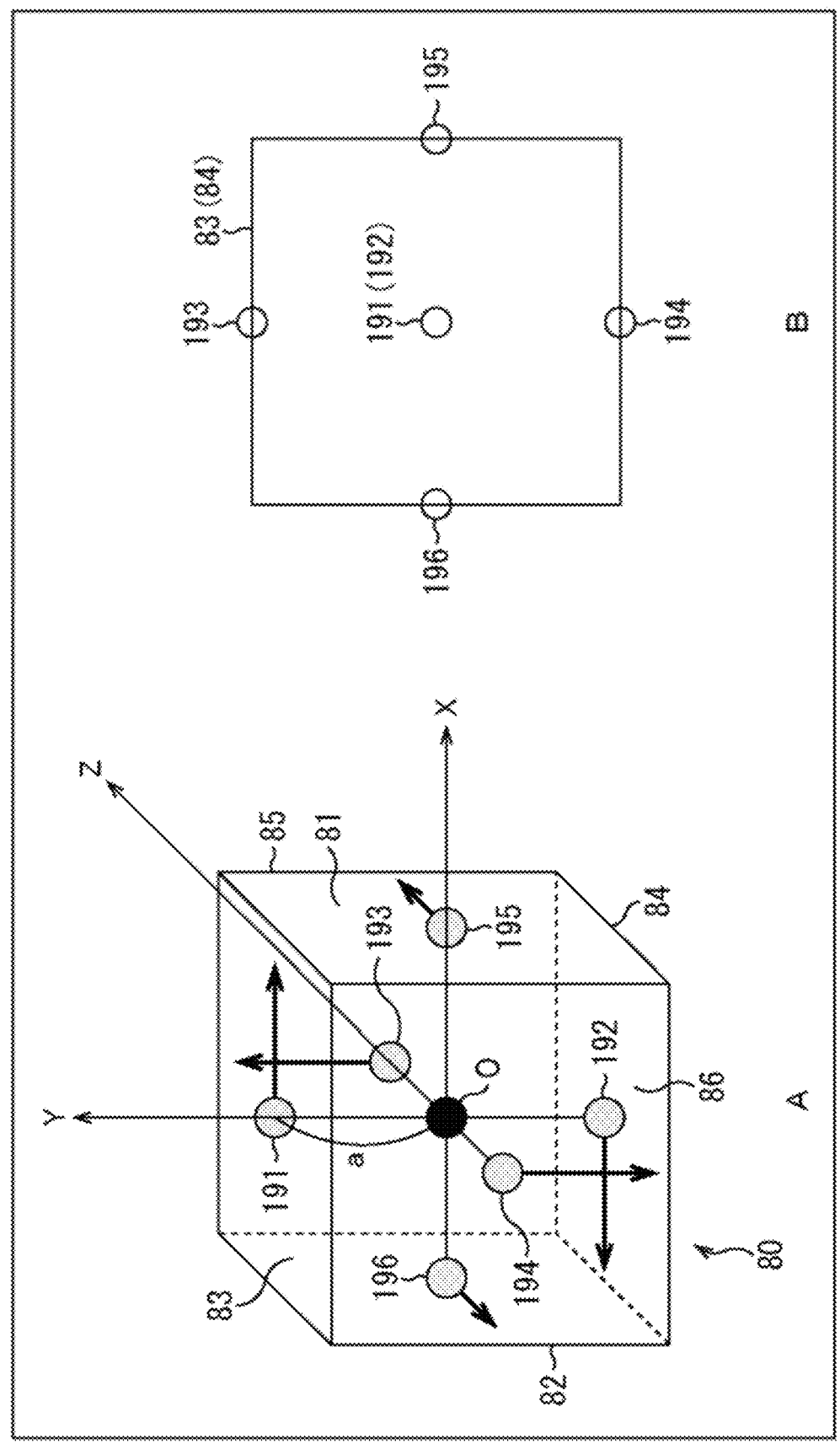
FIG. 14 is a view depicting a first example of viewpoints of the second layer.

FIG. 14 is a view depicting a first example of the viewpoint of the second layer.

A of FIG. 14 is a perspective view of a cube 80 of the first layer, and B of FIG. 14 is a view of the cube 80 as viewed in the negative direction of the Y axis. This similarly applies also to FIG. 16.

In the example of FIG. 14, a viewpoint 191 of a face of the second layer corresponding to a face that includes the +X face 81 of the first layer is set to a position moved by a length a equal to one half the length of each side of the cube 80 in the positive direction of the Y axis from the viewpoint O of the first layer. As indicated by an arrow mark applied to the viewpoint 191 in FIG. 14, the sight line vector of the face of the second layer corresponding to the face including the +X face 81 of the first layer is (1, 0, 0) similarly as in the first layer.

A viewpoint 192 of the face of the second layer corresponding to the face including the −X face 82 of the first layer is set to a position moved by the length a in the negative direction of the Y axis from the viewpoint O. As indicated by an arrow mark applied to the viewpoint 192 in FIG. 14, the sight line vector of the face of the second layer corresponding to the face including the −X face 82 of the first layer is (−1, 0, 0) similarly to the first layer.

Further, a viewpoint 193 of a face of the second layer corresponding to the face 91 including the +Y face 83 of the first layer and a viewpoint 194 of a face of the second layer corresponding to a face including the −Y face 84 are set to positions moved by the length a in the positive direction and the negative direction of the Z axis from the viewpoint O, respectively. As indicated by arrow marks applied to the viewpoint 193 and the viewpoint 194 in FIG. 14, a sight line vector of the face of the second layer corresponding to the face 91 of the first layer and a sight line vector of the second layer corresponding to the face including the −Y face 84 are (0, 1, 0) and (0, −1, 0) similarly as in the first layer, respectively.

Further, a viewpoint 195 of a face of the second layer corresponding to the face including the +Z face 85 of the first layer and a viewpoint 196 of a face of the second layer corresponding to the face including the −Z face 86 are set to positions moved by the length a in the positive direction and the negative direction of the X axis from the viewpoint O of the first layer, respectively. As indicated by arrow marks applied to the viewpoint 195 and the viewpoint 196 in FIG. 14, a sight line vector of the face of the second layer corresponding to the +Z face 85 of the first layer and a sight line vector of the face of the second layer corresponding to the face including the −Z face 86 are (0, 0, 1) and (0, 0, −1) similarly as in the first layer, respectively.

In this manner, in the example of FIG. 14, the viewpoints 191 to 196 of the faces of the second layer are set to positions moved by the length a in one direction perpendicular to the sight line vectors from the viewpoints O of the first layer. Further, the sight line vectors of the faces of the second layer are same as the sight line vectors of the corresponding faces of the first layer. Furthermore, the displacement direction of the viewpoints 191 to 196 of the faces of the second layer with respect to the viewpoint O differs for each face.

It is to be noted that the distance between the viewpoints 191 to 196 of the faces of the second layer and the viewpoint O in the X-axis direction, Y-axis direction or Z-axis direction is not limited to the length a equal to one half the length of each side of the cube 80.

(First Configuration Example of Table of Viewpoint Position Information and Face Information of Second Layer)

FIG. 15 is a view depicting a configuration example of a table of viewpoint position information and face information of the second layer from within metadata generated by the metadata generation section 57 of FIG. 3 in the case where the viewpoints 191 to 196 of FIG. 14 are set as viewpoints of the faces of the second layer.

The table of FIG. 15 is same as the table of FIG. 9 except a common portion of file names and viewpoint position information.

In particular, in the example of FIG. 15, the file names of the texture images of the faces of the second layer corresponding to the faces of the first layer including the +Z face 85, −Z face 86, +X face 81, −X face 82, +Y face 83 and −Y face 84 are posZ2_texture, negZ2_texture, posX2_texture, negX2_texture, posY2_texture and negY2_texture, respectively. Further, the file names of the depth images of the faces of the second layer corresponding to the faces of the first layer including the +Z face 85, −Z face 86, +X face 81, −X face 82, +Y face 83 and −Y face 84 are posZ2_depth, negZ2_depth, posX2_depth, negX2_depth, posY2_depth and negZ2_depth, respectively. Accordingly, in the table of FIG. 15, "posZ2," "negZ2," "posX2," "negX2," "posY2" and "negY2" are registered as the common portions of the file names of the faces of the second layer.

Further, coordinates (a, 0, 0), (−a, 0, 0), (0, a, 0), (0, −a, 0), (0, 0, a) and (0, 0, −a) of the viewpoints 191 to 196 when the viewpoint O is determined as the origin are registered in an associated relationship with the common portions "posZ2," "negZ2," "posX2," "negX2," "posY2" and "negY2" of the file names, respectively.

(Second Example of Viewpoints of Second Layer)

Figure 16:
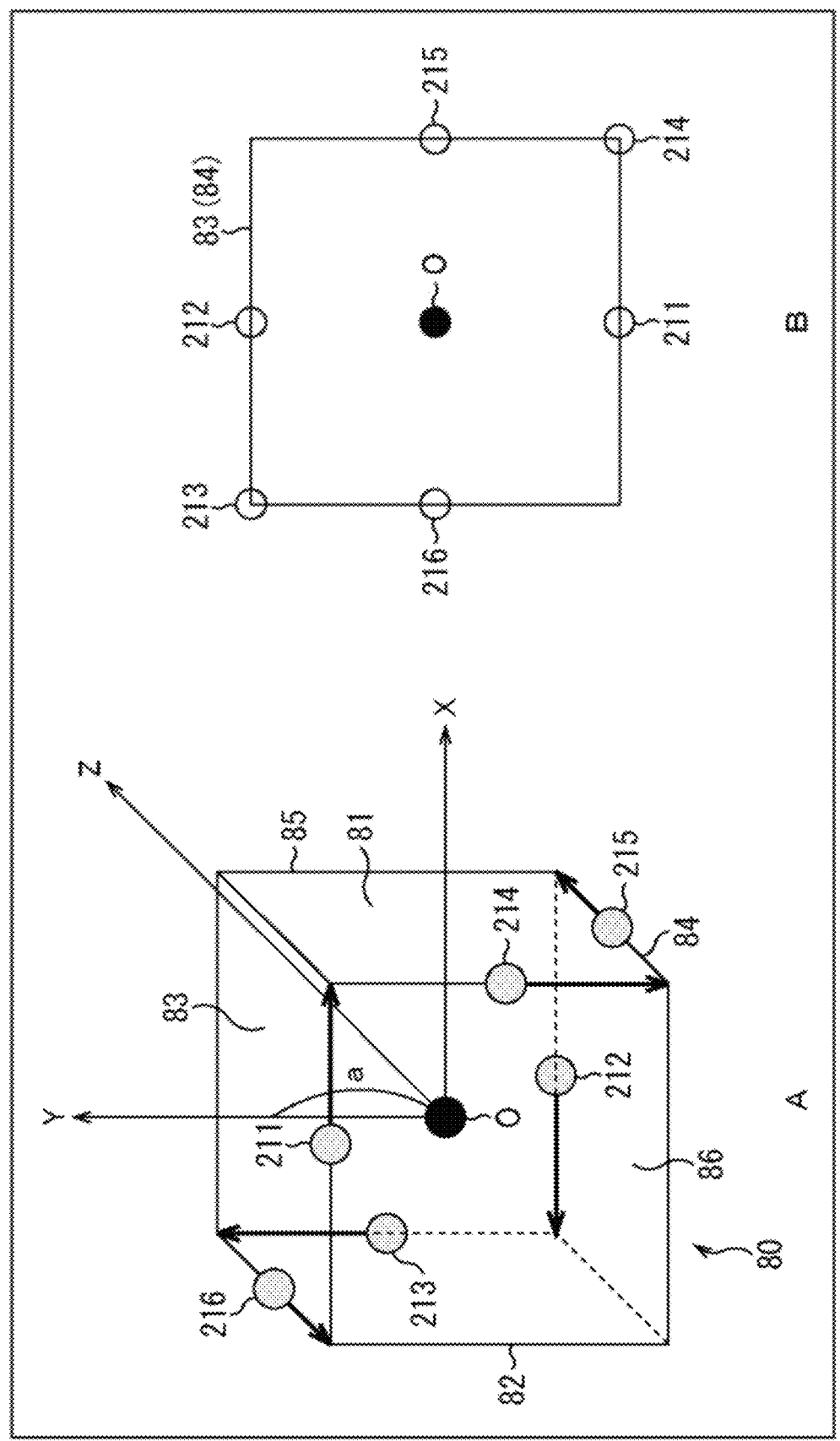
FIG. 16 is a view depicting a second example of viewpoints of the second layer.

FIG. 16 is a view depicting a second example of viewpoints of the second layer.

In the example of FIG. 16, a viewpoint 211 of a face of the second layer corresponding to a face that includes the +X face 81 of the first layer and a viewpoint 212 of a face of the second layer corresponding to a face that includes the −X face 82 of the first layer are respectively set to a position moved by the length a in the positive direction of the Y axis and the negative direction of the Z axis from the viewpoint O of the first layer and a position moved by the length a in the negative direction of the Y axis and the positive direction of the Z axis from the viewpoint O of the first layer. As indicated by an arrow mark applied to the viewpoint 211 and the viewpoint 212 in FIG. 16, the sight line vector of the face of the second layer corresponding to the face including the +X face 81 of the first layer and the sight line vector of a face of the second layer corresponding to the face including the −X face 82 of the first layer are (1, 0, 0) and (−1, 0, 0) similarly as in the first layer.

A viewpoint 213 of a face of the second layer corresponding to the face 91 including the +Y face 83 of the first layer and a viewpoint 214 of the face of the second layer corresponding to the face including the −Y face 84 are set to positions moved by the length a in the negative direction of the X axis and the positive direction of the Z axis and in the positive direction of X axis and the negative direction of the Z axis from the viewpoint O, respectively. As indicated by arrow marks applied to the viewpoint 213 and the viewpoint 214 in FIG. 16, the sight line vector of the face of the second layer corresponding to the face 91 of the first layer and the sight line vector of the face of the second layer corresponding to the face including the −Y face 84 are (0, 1, 0) and (0, −1, 0) similarly to the first layer, similarly.

Further, a viewpoint 215 of a face of the second layer corresponding to a face including the +Z face 85 and a viewpoint 216 of a face of the second layer corresponding to a face including the −Z face 86 of the first layer are set to a position moved by the length a in the positive direction of the X axis and the negative direction of the Y axis and a position moved by the length a in the negative direction of the X axis and the positive direction of the Y axis from the viewpoint O, respectively. As indicated by arrow marks applied to the viewpoint 215 and the viewpoint 216 in FIG. 16, a sight line vector of the face of the second layer corresponding to a face including the +Z face 85 of the first layer and a sight line vector of the second layer corresponding to the face including the −Z face 86 are (0, 0, 1) and (0, 0, −1) similarly as in the first layer, respectively.

In this manner, in the example of FIG. 16, the viewpoints 211 to 216 of the faces of the second layer are set to positions moved by the length a in two directions perpendicular to the sight line vectors from the viewpoints O of the first layer. Further, the sight line vectors of the faces of the second layer are same as the sight line vectors of the corresponding faces of the first layer. Furthermore, the displacement directions of the viewpoints 211 to 216 of the faces of the second layer with respect to the viewpoint O differ among different faces. Further, the viewpoints 211 to 216 are in a symmetrical relationship with respect to the viewpoint O.

It is to be noted that the distance between the viewpoints 191 to 196 of the faces of the second layer and the viewpoint O in two directions of the X-axis direction, Y-axis direction and Z-axis direction is not limited to the length a that is equal to one half the length of each side of the cube 80.

(Second Configuration Example of Table of Viewpoint Position Information and Face Information of Second Layer)

FIG. 17 is a view depicting a configuration example of a table of viewpoint position information and face information of the second layer from within metadata generated by the metadata generation section 57 of FIG. 3 in the case where the viewpoints 211 to 216 of FIG. 16 are set as viewpoints of the faces of the second layer.

The table of FIG. 17 is same as the table of FIG. 15 except viewpoint position information.

In particular, in the table of FIG. 17, coordinates (a, −a, 0), (−a, a, 0), (0, a, −a), (0, −a, a), (−a, 0, a) and (a, 0, −a) of the viewpoints 211 to 216 when the viewpoint O is determined as the origin are registered in an associated relationship with the common portions "posZ2," "negZ2," "posX2," "negX2," "posY2" and "negY2" of the file names, respectively.

(Description of Processing of Content Server)

Figure 18:
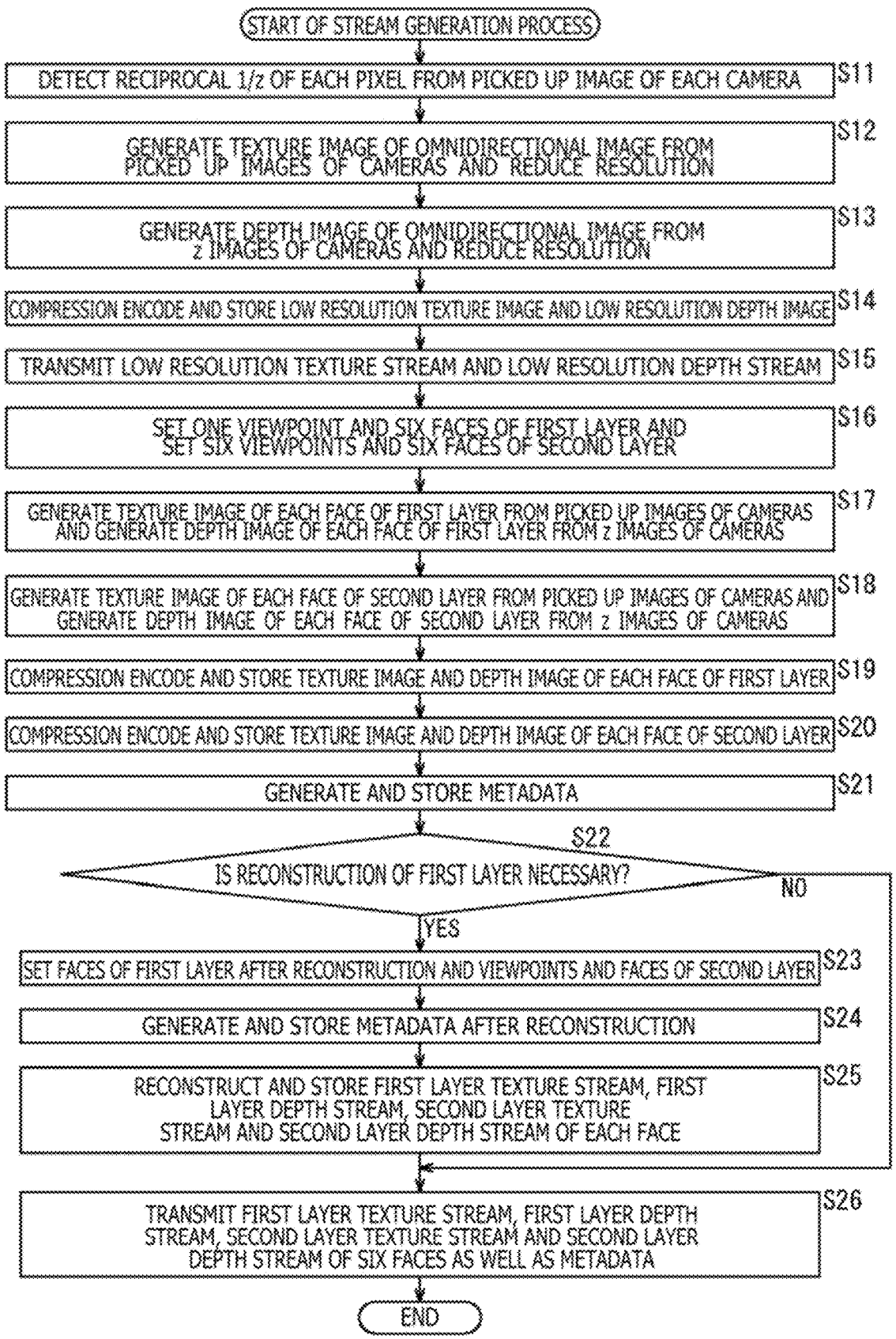
FIG. 18 is a flow chart illustrating a stream generation process.

FIG. 18 is a flow chart illustrating a stream generation process of the content server 12 of FIG. 2. This stream generation process is started when picked up images of the cameras are supplied from the multi camera 11 of FIG. 1.

At step S11 of FIG. 18, the depth detection section 31 of the content server 12 detects a reciprocal 1/z of each pixel of a picked up image of each camera from a picked up image of each camera supplied from the multi camera 11 and supplies such reciprocals 1/z to the low resolution image processing section 33 and the high resolution image processing section 34.

At step S12, the low resolution image processing section 33 uses a predetermined three-dimensional position in the camera coordinate system as a viewpoint to generate a texture image of an omnidirectional image from the picked up images of the cameras supplied from the multi camera 11 to reduce the resolution.

At step S13, the low resolution image processing section 33 generates a depth image of an omnidirectional image from the z images of the cameras supplied from the depth detection section 31 to reduce the resolution.

At step S14, the low resolution image processing section 33 compression encodes and stores the low resolution texture image generated by the process at step S12 and the low resolution depth image generated by the process at step S13.

At step S15, the low resolution image processing section 33 transmits the low resolution texture stream and the low resolution depth stream stored therein to the home server 13 of FIG. 1.

At step S16, the setting section 56 (FIG. 3) of the high resolution image processing section 34 sets the origin of the 3D model coordinate system as one viewpoint common in the first layer and sets six faces including the six faces configuring a cube centered at the viewpoint of the first layer as faces of the first layer. Further, the setting section 56 sets six viewpoints and six faces of the second layer corresponding to the faces of the first layer. The setting section 56 supplies the viewpoint position information of the one viewpoint of the first layer and the face information of the six faces to the first layer generation section 50 and the metadata generation section 57. Further, the setting section 56 supplies the viewpoint position information of the six viewpoints and the face information of the six faces of the second layer to the second layer generation section 53 and the metadata generation section 57.

At step S17, the first layer generation section 50 generates, setting the viewpoint of the omnidirectional image in the camera coordinate system to the origin and setting the origin indicated by the viewpoint position information of the first layer as a viewpoint, texture images of the faces corresponding to the face information of the first layer from the picked up images of the cameras. Further, the first layer generation section 50 generates z images of the faces corresponding to the face information of the first layer from the z images of the cameras to supply the z images to the quantization section 51, and the quantization section 51 generates depth images of the faces from the z images of the faces.

At step S18, the second layer generation section 53 generates, for each of the faces corresponding to the face information of the second layer, texture images from the picked up images of the cameras setting the viewpoint of the omnidirectional image in the camera coordinate system as an origin and setting a three-dimensional position indicated by the viewpoint position information of the second layer as a viewpoint. Further, the second layer generation section 53 generates, for each of the faces corresponding to the face information of the second layer, z images of the faces from the z images of the cameras to supply the z images to the quantization section 54, and the quantization section 54 generates depth images of the faces from the z images of the faces.

At step S19, the encoder 52 compression encodes the texture images and the depth images of the faces of the first layer for each face and for each kind of image and stores resulting images to the storage 58 so as to be stored.

At step S20, the encoder 55 compression encodes the texture images and the depth images of the faces of the second layer for each face and for each kind of image and stores resulting images to the storage 58 so as to be stored.

At step S21, the metadata generation section 57 generates a table including the viewpoint position information and the face information of the first layer and the viewpoint position information and the face information of the second layer supplied from the setting section 56 as metadata and supplies and stores the metadata to and into the storage 58.

At step S22, the reconstruction section 59 decides whether or not it is necessary to reconstruct texture images and depth images of the first layer. For example, in the case where an instruction to change the number of, angle of view, distance between, position of or inclination of the faces of the first layer is issued from the user, the reconstruction section 59 decides that it is necessary to reconstruct the texture images and the depth images of the first layer.

In the case where it is decided at step S22 that it is necessary to reconstruct texture images and depth images of the first layer, the processing advances to step S23. At step S23, the reconstruction section 59 sets faces of the first layer after reconstruction and viewpoints and faces of the second layer corresponding to the faces of the first layer after reconstruction.

At step S24, the reconstruction section 59 generates a table including the viewpoint position information and the face information of the first layer and the viewpoint position information and the face information of the second layer after the reconstruction as metadata and supplies the metadata to the storage 58.

At step S25, the reconstruction section 59 reconstructs the first layer texture streams of the faces stored in the storage 58 into texture streams of the faces of the first layer after reconstruction set at step S23 and supplies the resulting texture streams to the storage 58 so as to be stored. Further, the reconstruction section 59 reconstructs the first layer depth streams stored in the storage 58 into first layer depth streams of the faces of the first layer after reconstruction set at step S23 and supplies the resulting depth streams to the storage 58 so as to be stored.

Further, the reconstruction section 59 reconstructs the second layer texture streams of the faces stored in the storage 58 into second layer texture streams of the viewpoints and the faces of the second layer after reconstruction set at step S23 and supplies the resulting texture streams to the storage 58 so as to be stored. The reconstruction section 59 reconstructs the second layer depth streams stored in the storage 58 into second layer depth streams of the viewpoints and the faces of the second layer after reconstruction set at step S23 and supplies the resulting depth streams to the storage 58 so as to be stored. Then, the processing advances to step S26.

On the other hand, in the case where it is decided at step S22 that it is not necessary to reconstruct the texture images and the depth images of the first layer, the processing advances to step S26.

At step S26, the transmission section 60 reads out the first layer texture streams, first layer depth streams, second layer texture streams and second layer depth streams of the six faces before reconstruction and the metadata from the storage 58 and transmits the read out streams and metadata to the home server 13.

The content server 12 generates texture images and depth images in an occlusion region at the viewpoint of the first layer as texture images and depth images of the second layer, respectively, in such a manner as described above. Accordingly, in the case where the viewing position is different from the viewpoint O, the home server 13 can generate an occlusion region of the viewpoint O included in the display image by using the texture images and the depth images of the second layer. Therefore, the home server 13 can generate a display image of high picture quality.

Further, the content server 12 sets the viewpoint of the second layer to a three-dimensional position different from the viewpoint O of the first layer. Accordingly, in the second layer, it is possible to represent the length of an imaging object, which extends to the viewpoint O, in the direction in which it extends to the viewpoint O.

Furthermore, the content server 12 sets the y value of each pixel of the depth images as a value obtained by 8-bit quantization of the reciprocal $1/r$. Accordingly, it is not necessary for the content server 12 to redo 8-bit quantization of a depth image upon reconstruction.

(Configuration Example of Home Server)

Figure 19:
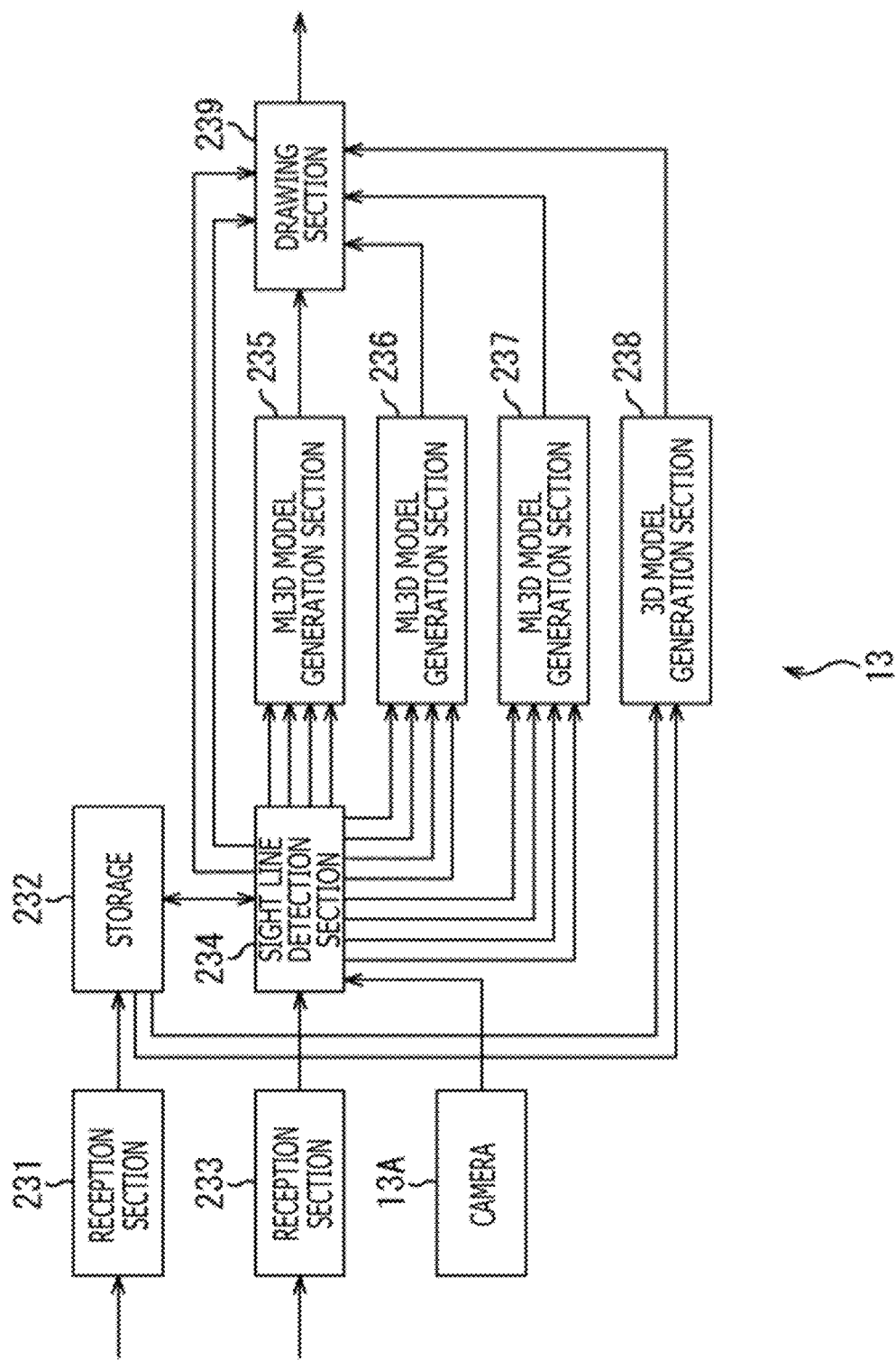
FIG. 19 is a block diagram depicting a configuration example of a home server.

FIG. 19 is a block diagram depicting a configuration example of the home server 13 of FIG. 1.

The home server 13 of FIG. 19 includes a camera 13A, a reception section 231, a storage 232, another reception section 233, a sight line detection section 234, an ML3D model generation section 235, another ML3D model generation section 236, a further ML3D model generation section 237, a 3D model generation section 238 and a drawing section 239.

The reception section 231 of the home server 13 receives low resolution texture stream and low resolution depth stream, first layer texture streams, first layer depth streams, second layer texture streams and second layer depth streams of the six faces and metadata transmitted thereto from the content server 12 and supplies them to the storage 232.

The storage 232 stores the low resolution texture stream and low resolution depth stream, the first layer texture streams, first layer depth streams, second layer texture streams and second layer depth streams of the six faces and the metadata supplied from the reception section 231.

The reception section 233 receives a detection result of the gyro sensor 15B of FIG. 1 from the head mounted display 15 and supplies the detection result to the sight line detection section 234.

The sight line detection section 234 determines a sight line direction of the viewer in the 3D model coordinate system on the basis of a detection result of the gyro sensor 15B supplied from the reception section 233. Further, the sight line detection section 234 acquires a picked up image of the marker 15A from the camera 13A and detects a viewing position in the 3D model coordinate system on the basis of the picked up image.

The sight line detection section 234 reads out the table of the first layer from within the metadata from the storage 232. The sight line detection section 234 determines, on the basis of the viewing position and the sight line direction in the 3D model coordinate system and the table of the first layer, three faces corresponding to the sight line vector closest to the sight line extending in the sight line direction from the viewing position from among the six faces as selection faces. In particular, the sight line detection section 234 selects a face including one of the +X face 81 and the −X face 82, a face including one of the +Y face 83 and the −Y face 84 and a face including one of the +Z face 85 and the −Z face 86 as the selection faces.

Since the selection faces are determined in such a manner as described above, the ratio of the high resolution region in the display image generated using the texture images and the depth images of the first layer and the second layer corresponding to the selection faces by the drawing section 239 hereinafter described is highest. Further, since the three selection faces are determined, the ratio of the high resolution region in the display image in the case where the sight line is directed to the proximity of a vertex of the cube 80 can be increased in comparison with that in an alternative case in which one selection face is selected.

The sight line detection section 234 reads out the first layer texture streams, first layer depth streams, second layer texture streams and second layer depth streams corresponding to the three selection faces from the storage 232. The sight line detection section 234 supplies the read out first layer texture streams, first layer depth streams, second layer texture streams and second layer depth streams for each face to the ML3D model generation sections 235 to 237. Further, the sight line detection section 234 reads out the low resolution texture stream and the low resolution depth stream from the storage 232 and supplies them to the 3D model generation section 238.

Further, the sight line detection section 234 determines the viewing range of the viewer in the 3D model coordinate system on the basis of the viewing position and the sight line direction in the 3D model coordinate system. The sight line detection section 234 supplies the viewing range and the viewing position of the viewer to the drawing section 239. The sight line detection section 234 supplies the three selection faces and the viewpoint position information and the face information of the three faces of the second layer corresponding to the three selection faces to the drawing section 239.

The ML3D model generation sections 235 to 237 individually use the first layer texture streams and the first layer depth streams to generate three-dimensional data including three-dimensional positions (u, v, z) and connection information in the texture image coordinate system of sampling points corresponding to the pixels of the texture image of the first layer and RGB values as color information. It is to be noted that the connection information of each sampling point is information representative of connection between the sampling point (vertex) and a different sampling point. The texture image coordinate system is a coordinate system having a u axis given by the transverse direction, a v axis given by the vertical direction and a z axis in the depth direction of the texture image.

Further, the ML3D model generation sections 235 to 237 use the second layer texture streams and the second layer depth streams supplied from the sight line detection section 234 to generate three-dimensional data of a sampling point corresponding to each pixel of the texture image of the second layer. The ML3D model generation sections 235 to 237 supply the three-dimensional data of the first layer and the second layer to the drawing section 239.

The 3D model generation section 238 decodes the low resolution texture stream and the low resolution depth stream supplied from the sight line detection section 234 to generate a low resolution texture image and a low resolution depth image. The 3D model generation section 238 converts YCbCr values as a pixel value of each pixel of the low resolution texture image into RGB values to make RGB values of the sampling point corresponding to each pixel. Further, the 3D model generation section 238 performs 8-bit dequantization for the pixel value of each pixel of the low resolution depth image and obtains a reciprocal 1/r. Then, the 3D model generation section 238 calculates, on the basis of such reciprocals 1/r of the pixels of the low resolution depth image, a three-dimensional position (u, v, z) of each pixel as a three-dimensional position (u, v, z) of a sampling point corresponding to the pixel.

Further, the 3D model generation section 238 generates, on the basis of the three-dimensional positions (u, v, z) of the sampling points, connection information of the sampling points such that every three neighboring sampling points are connected to each other. The 3D model generation section 238 supplies the three-dimensional positions (u, v, z) of the sampling points, connection information and RGB values as three-dimensional data of the low resolution texture images to the drawing section 239.

The drawing section 239 performs triangle patch drawing (point cloud drawing) of the low resolution texture image in the 3D model coordinate system on the basis of the three-dimensional data of the low resolution texture image supplied from the 3D model generation section 238. Thereafter, the drawing section 239 performs, on the basis of the three-dimensional data of the first layer and the second layer supplied from the ML3D model generation sections 235 to 237 and the viewpoint position information and the face information supplied from the sight line detection section 234, triangle patch drawing of the texture images of the first layer and the second layer in the 3D model coordinate system.

In particular, the viewpoint of the low resolution texture image is the origin of the 3D model coordinate system, and the position and the size of each of the faces of a regular octahedron as a 3D model are determined in advance. Accordingly, the drawing section 239 can calculate internal parameters and external parameters of the cameras corresponding to the faces of the regular octahedron. Therefore, the drawing section 239 can use the internal parameters and the external parameters to recognize, from the three-dimensional positions (u, v, z) of the sampling points of the low resolution texture image, the position (u, v) on the screen image and the three-dimensional position (X, Y, Z) in the 3D model coordinate system of each sampling point. As a result, the positions (u, v) on the screen image and three-dimensional positions (X, Y, Z), connection information and RGB values of the sampling points of the low resolution texture image can be used to perform triangle patch drawing.

Further, the drawing section 239 can calculate internal parameters and external parameters of the cameras corresponding to the faces of the first layer and the second layer on the basis of the viewpoint position information and the face information of the first layer and the second layer. Accordingly, the drawing section 239 can use the internal parameters and the external parameters to recognize the position (u, v) on the screen image and the three-dimensional position (X, Y, Z) of the sampling points from the three-dimensional positions (u, v, z) of the sampling points of the first layer and the second layer. As a result, the drawing section 239 can use the positions (u, v) on the screen image and three-dimensional positions (X, Y, Z), connection information and RGB values of the sampling points of the first layer and the second layer to perform triangle patch drawing.

The drawing section 239 (image generation section) generates a display image by perspectively projecting (mapping) triangle patches drawn in the 3D model coordinate system within the viewing range from the viewpoint given as the viewing position supplied from the sight line detection section 234. The drawing section 239 transmits the display image to the conversion apparatus 14 of FIG. 1.

(Configuration Example of ML3D Model Generation Section)

Figure 20:
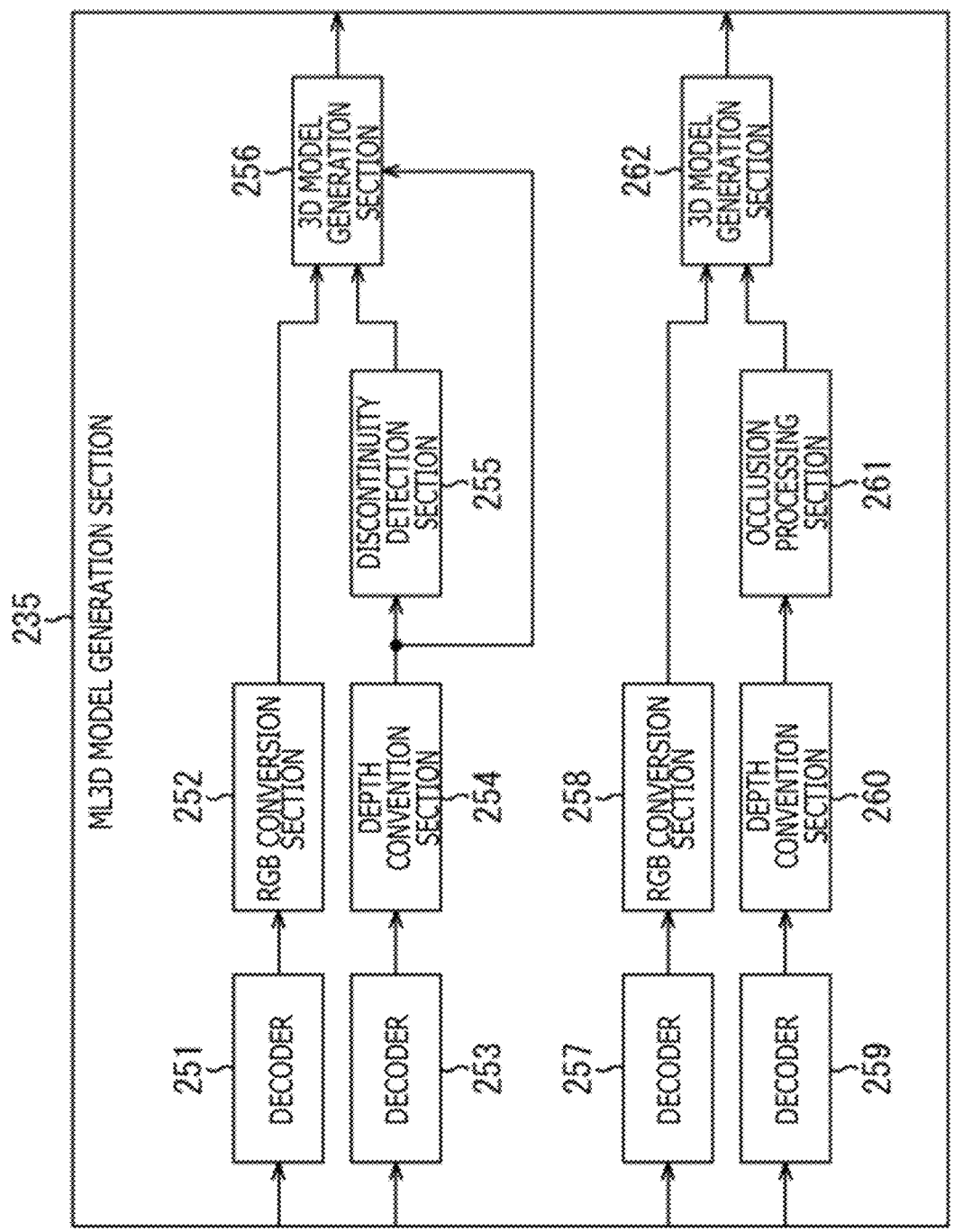
FIG. 20 is a block diagram depicting a configuration example of an ML3D model generation section.

FIG. 20 is a block diagram depicting a configuration example of the ML3D model generation section 235 of FIG. 19.

The ML3D model generation section 235 of FIG. 20 includes a decoder 251, an RGB conversion section 252, another decoder 253, a depth conversion section 254, a discontinuity detection section 255, a 3D model generation section 256, a further decoder 257, another RGB conversion section 258, a still further decoder 259, another depth conversion section 260, an occlusion processing section 261 and a 3D model generation section 262.

The decoder 251 of the ML3D model generation section 235 decodes first layer texture streams supplied from the sight line detection section 234 of FIG. 19 to generate a texture image of the first layer. The decoder 251 supplies the texture image of the first layer to the RGB conversion section 252.

The RGB conversion section 252 converts YCbCr values as pixel values of the pixels of the texture images of the first layer into RGB values to obtain RGB values of sampling points corresponding to the pixels. Then, the RGB conversion section 252 supplies the RGB values of the sampling points to the 3D model generation section 256.

The decoder 253 decodes the first layer depth streams supplied from the sight line detection section 234 to generate a depth image of the first layer. The decoder 253 supplies the depth image of the first layer to the depth conversion section 254.

The depth conversion section 254 performs 8-bit dequantization for pixel values of the pixels of the depth images of the first layer supplied from the decoder 253 to obtain reciprocals 1/r. Then, the depth conversion section 254 calculates, on the basis of the reciprocals 1/r of the pixels of the depth images of the first layer, three-dimensional positions (u, v, z) of the pixels as three-dimensional positions (u, v, z) of sampling points corresponding to the pixels. The depth conversion section 254 supplies the three-dimensional positions (u, v, z) of the sampling points to the discontinuity detection section 255 and the 3D model generation section 256.

The discontinuity detection section 255 detects, on the basis of the three-dimensional positions (u, v, z) of the sampling points supplied from the depth conversion section 254, discontinuity pixels that are pixels corresponding to sampling points at each of which the difference of the z coordinate from a neighboring sampling point is equal to or greater than a threshold value from among pixels of the depth image of the first layer. The discontinuity detection section 255 supplies the three-dimensional positions (u, v, z) of the sampling points corresponding to the discontinuity pixels to the 3D model generation section 256.

The 3D model generation section 256 (connection information generation section) generates connection information of the sampling points on the basis of the three-dimensional positions (u, v, z) of the sampling points supplied from the depth conversion section 254 such that every three neighboring sampling points from among the sampling points are connected to each other. In particular, the 3D model generation section 256 generates, for each sampling point, connection information representative of connection between three vertices of a triangle patch that includes the sampling point as a vertex. Then, the 3D model generation section 256 deletes, on the basis of the three-dimensional positions (u, v, z) of the sampling points corresponding to the discontinuity pixels supplied from the discontinuity detection section 255, the connection information representative of connection of the sampling points corresponding to the discontinuity pixels from within the generated connection information of the sampling points.

The 3D model generation section 256 generates three-dimensional positions (u, v, z), RGB values and connection information after the deletion of the sampling points of the first layer as three-dimensional data of the first layer and supplies the three-dimensional data to the drawing section 239 of FIG. 19.

Processing of the decoder 257, RGB conversion section 258, decoder 259 and depth conversion section 260 is similar to that of the decoder 251, RGB conversion section 252, decoder 253 and depth conversion section 254 except that the layer of the processing target changes from the first layer to the second layer, and therefore, description of the same is omitted.

The occlusion processing section 261 detects discontinuity pixels from among pixels of the depth image of the second layer on the basis of the three-dimensional positions (u, v, z) of the sampling points supplied from the depth conversion section 260. The occlusion processing section 261 performs an occlusion process for correcting the three-dimensional positions (u, v, z) of the sampling points corresponding to the discontinuity pixels on the basis of the three-dimensional positions (u, v, z) of the sampling points of the second layer.

In particular, the occlusion processing section 261 corrects the two-dimensional position (u, v) of each sampling point corresponding to a discontinuity pixel to a two-dimensional position (u, v) of a sampling point neighboring on the near side with the sampling point. The occlusion processing section 261 supplies the three-dimensional positions (u, v, z) after the occlusion process of the sampling points of the second layer to the 3D model generation section 262.

The 3D model generation section 262 generates, for each sampling point, connection information representative of connection to two sampling points neighboring with the sampling point on the basis of the three-dimensional positions (u, v, z) of the sampling points supplied from the occlusion processing section 261. The 3D model generation section 262 generates three-dimensional positions (u, v, z) and connection information of the sampling points and RGB values supplied from the RGB conversion section 258 as three-dimensional data of the second layer. The 3D model generation section 256 supplies the three-dimensional data of the second layer to the drawing section 239 of FIG. 19.

It is to be noted that, though not depicted, the ML3D model generation section 236 and the ML3D model generation section 237 are configured similarly to the ML3D model generation section 235 of FIG. 20.

(Description of Effect of Deletion of Connection Information and Occlusion Process)

Figure 21:
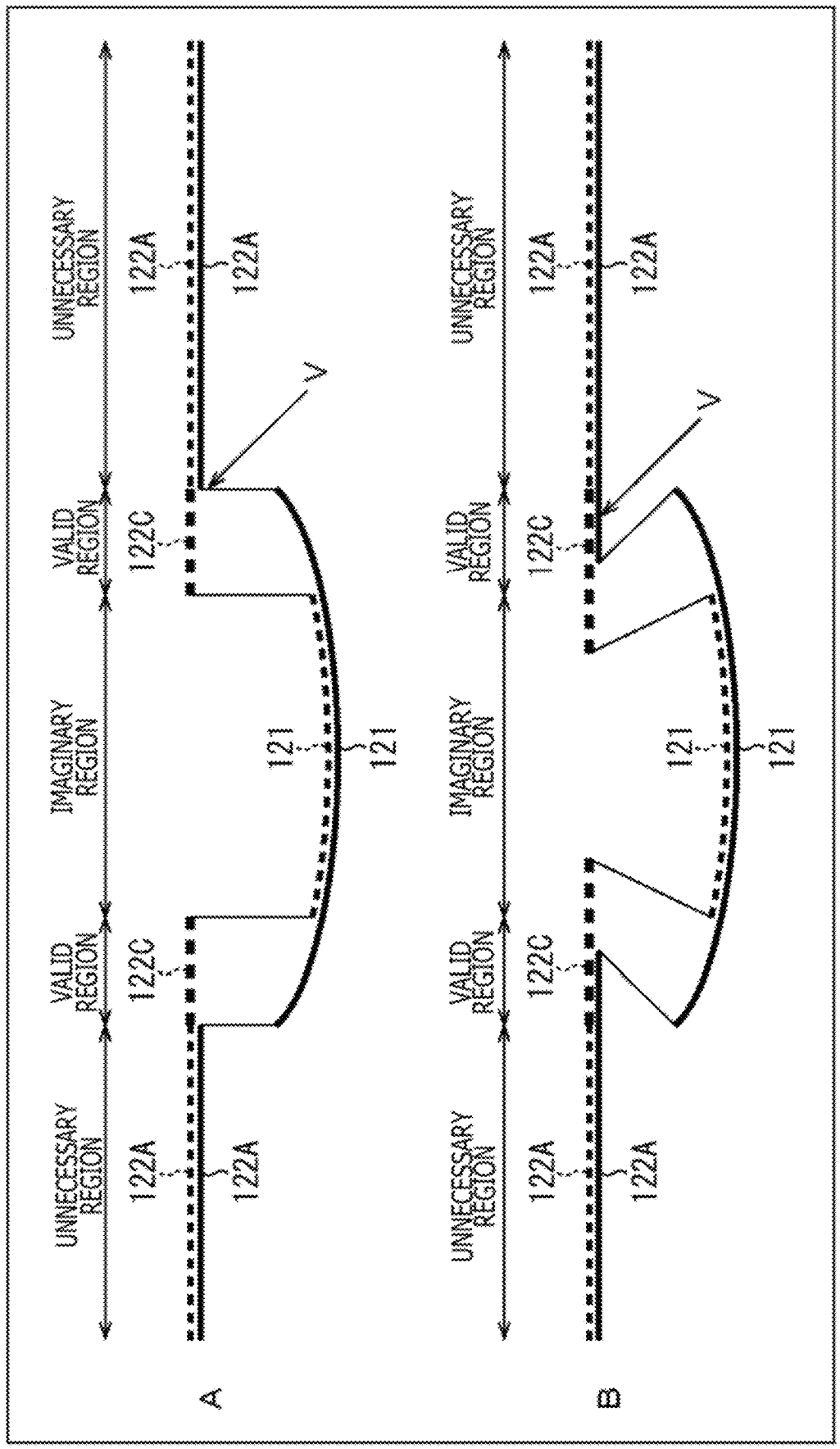
FIG. 21 is a view illustrating an example of connection information.
Figure 22:
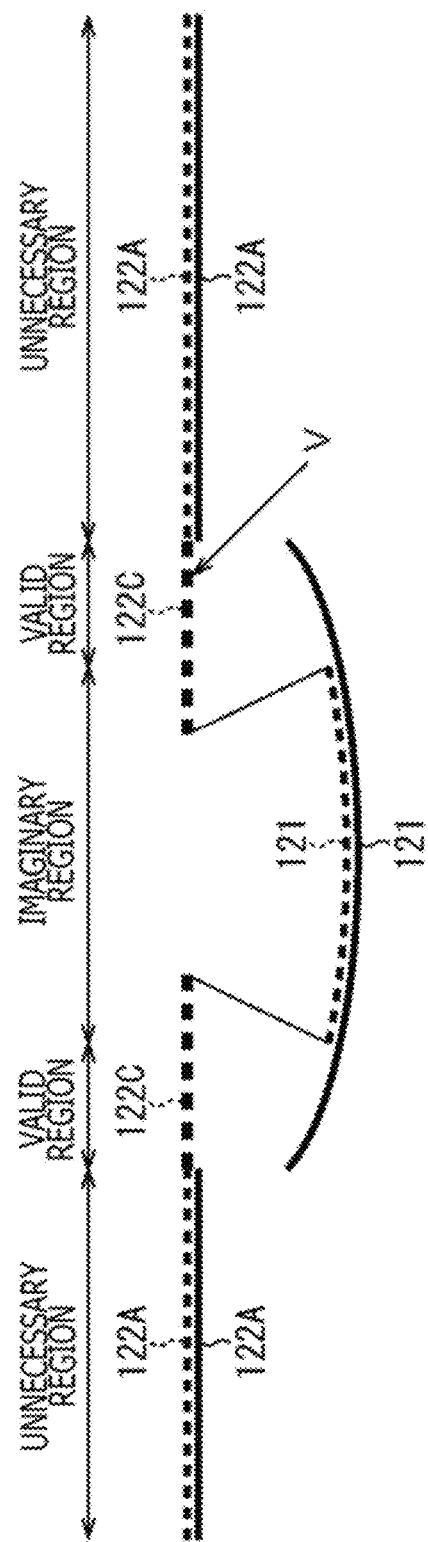
FIG. 22 is a view illustrating another example of connection information.

FIG. 21 is a view illustrating connection information in the case where connection information representative of connection to a sampling point corresponding to a discontinuity pixel in connection information of the first layer is not deleted, and FIG. 22 is a view illustrating connection information in the case where such connection information is deleted.

Referring to FIGS. 21 and 22, the leftward and rightward direction represents the transverse direction of a texture image and the upward and downward direction represents a depth direction of the texture image. The upward direction in FIGS. 21 and 22 is the near side, and the downward direction is the deep side. Further, in FIGS. 21 and 22, a solid line represents three-dimensional positions (u, v, z) of sampling points of the first layer, and a broken line represents three-dimensional positions (u, v, z) of sampling points of the second layer. Further, in the examples of FIGS. 21 and 22, the foreground 111 and the background 112 of FIG. 10 are imaging objects.

In the case where an occlusion process is not performed in none of the first layer and the second layer, three-dimensional positions of sampling points corresponding to discontinuity pixels on the boundaries of a picked up image 121 of a foreground 111 and a picked up image 122A of a region 112A of a background 112 of the first layer as depicted in A of FIG. 21.

Further, in the case where connection information representative of connection to sampling points corresponding to discontinuity pixels in both the first layer and the second layer, the sampling points corresponding to the discontinuity pixels of the first layer and the second layer are connected to two neighboring sampling points as depicted in A of FIG. 21.

Accordingly, a triangle patch having vertices at a sampling point corresponding to a discontinuity pixel of the first layer and two neighboring sampling points is generated, and the picked up image 122C in the valid region is filled by the triangle patch. Therefore, in the case where a display image including the imaged occlusion region 112C corresponding to a sight line V directed from a right lower portion to a left upper portion in the figure is to be generated, the valid region of the second layer in which the picked up image 122C of the imaged occlusion region 112C is disposed cannot be used.

On the other hand, in the case where connection information representative of connection to a sampling point corresponding to a discontinuity pixel is not deleted but an occlusion process is performed in both the first layer and the second layer, as depicted in B of FIG. 21, the two-dimensional position of a sampling point corresponding to a discontinuity pixel in the first layer and the second layer is corrected to a two-dimensional position of a sampling point neighboring on the near side with the sampling point.

Accordingly, in the case where a display image corresponding to the sight line V is to be generated, the picked up image 122A of the region 112A of the first layer can be used as the display image of the imaged occlusion region 112C. As a result, the picture quality of the display image is improved.

However, a sampling point corresponding to a discontinuity pixel of the first layer after the occlusion process is connected to two neighboring sampling points and a triangle patch is generated. Accordingly, similarly as in the case of A of FIG. 21, in the case where a display image corresponding to the sight line V is to be generated, the valid region of the second layer in which the picked up image 122C of the imaged occlusion region 112C is disposed cannot be used.

In contrast, the 3D model generation section 256 deletes connection information representative of connection to discontinuity pixels of the first layer as depicted in FIG. 22. Accordingly, a triangle patch having a vertex at the sampling point corresponding to the discontinuity pixel of the first layer is not generated. Therefore, in the case where a display image corresponding to the sight line V is to be generated, a valid region of the second layer in which a picked up image 122C of an imaged occlusion region 112C is disposed can be used. Since, in the second layer, deletion of connection information is not performed, a triangle patch of the second layer exists without fail in a region in which a triangle patch of the first layer does not exist.

Further, the occlusion processing section 261 performs an occlusion process for the second layer. Accordingly, as depicted in FIG. 22, the two-dimensional position of a sampling point on the depth side from between sampling points corresponding to a discontinuity pixel on the boundary between an valid region and a imaginary region of the second layer is connected to the two-dimensional position of the sampling point neighboring on the near side with the sampling point on the depth side. Accordingly, in the second layer, an occlusion region is reduced. Therefore, the picture quality of the second layer that is used when a display image corresponding to the sight line V is to be generated is improved, and as a result, the picture quality of the display image is improved.

(Description of Effect of Angle of View of Face of First Layer)

Figure 23:
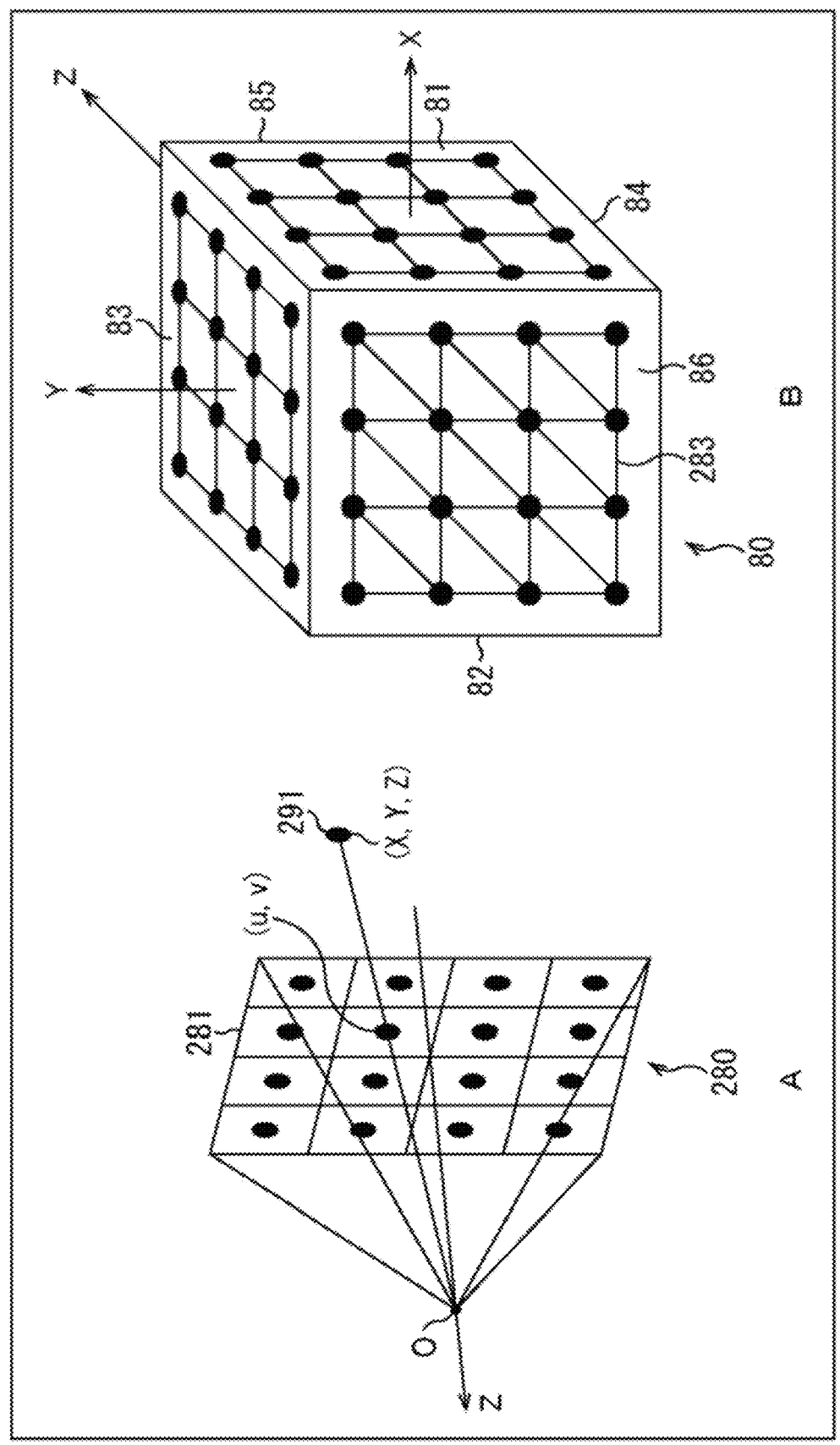
FIG. 23 is a view illustrating an example of sampling points.
Figure 24:
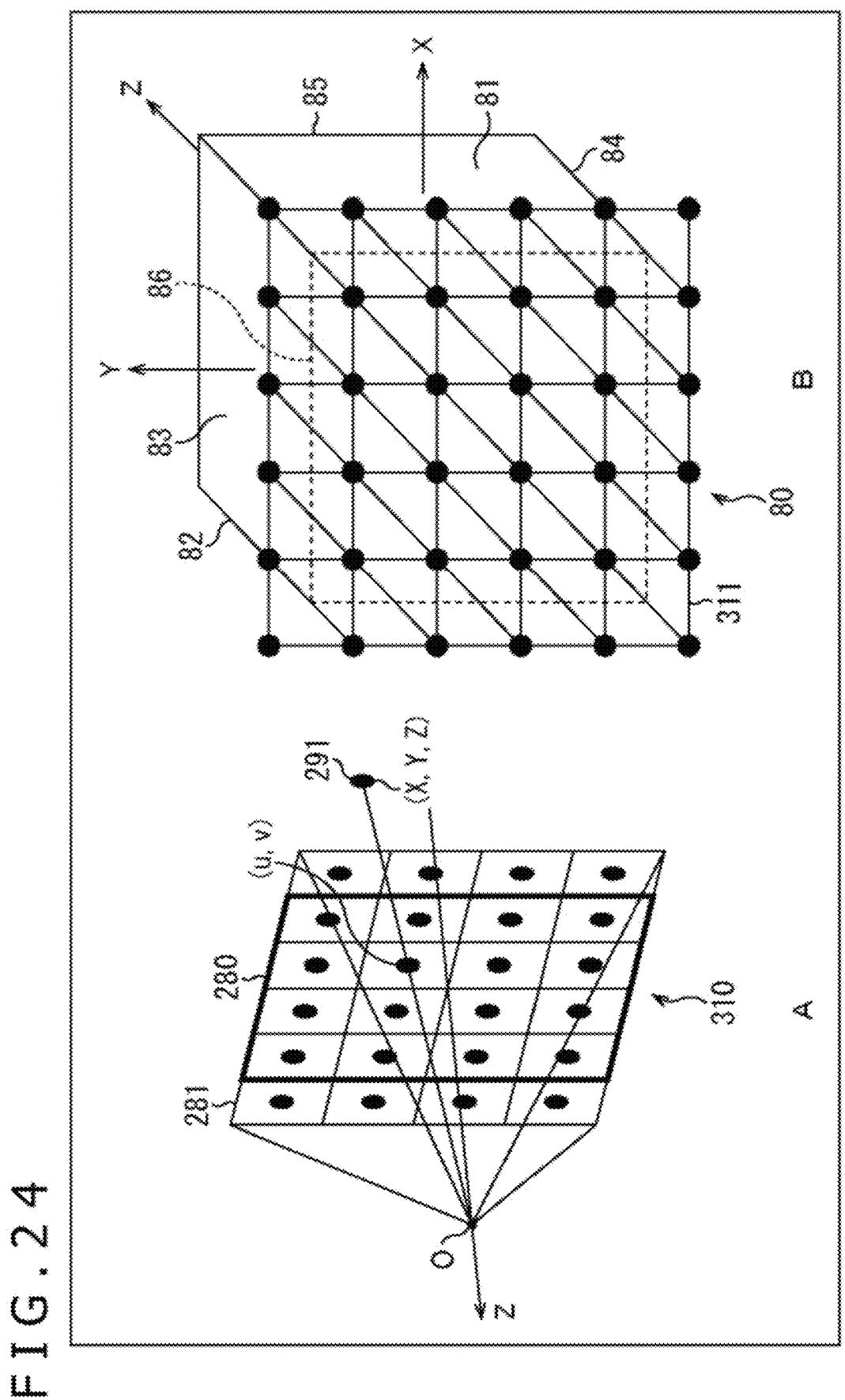
FIG. 24 is a view illustrating another example of sampling points.

FIGS. 23 and 24 are views illustrating sampling points in the case where the angle of view of each face of the first layer is 90 degrees and 100 degrees, respectively.

In the examples of FIGS. 23 and 24, it is assumed that, for the convenience of description, the resolutions of a texture image and a depth image of the first layer in the case where the angle of view of each face of the first layer is 90 degrees and 100 degrees are 4×4 pixels and 6×6 pixels, respectively.

As depicted in B of FIG. 23, in the case where the angle of view of each face of the first layer is 90 degrees, the six faces of the first layer are six faces 81 to 86 configuring a cube 80.

However, as depicted in A of FIG. 23, the position (u, v) of a sampling point 291 on a texture image 280 of the −Z face 86 of the first layer, namely, the position at which a line directed from the viewpoint O in the 3D model coordinate system toward the sampling point 291 crosses with the −Z face 86 is the center of each pixel 281. Also the positions (u, v) of sampling points of the other faces 81 to 85 are centers of pixels similarly as in the −Z face 86.

Accordingly, the sizes in the u direction and the v direction of a region 283 on the faces 81 to 86 of all triangle patches configured by connection of every three sampling points neighboring with each other from among the sampling points each indicated by a dark round mark in B of FIG. 23 are smaller by sizes of one half of a pixel in comparison with the faces 81 to 86. Therefore, triangle patches corresponding to the boundaries of the faces 81 to 86 are not generated, and as a result, it becomes difficult to generate a display image of a sight line passing the boundary between the faces 81 to 86 in high picture quality.

In contrast, in the case where the angle of view of each face of the first layer is 100 degrees, the size of a texture image 310 of the faces of the first layer including the −Z face 86 becomes 6×6 pixels greater than the size of the texture image 280 of FIG. 23 as depicted in A of FIG. 24. Also the size of the texture image of each face of the first layer including the other faces 81 to 85 becomes 6×6 pixels similarly.

Accordingly, as depicted in B of FIG. 24, the sizes in the u direction and the v direction of a region 311 on the −Z face 86 of all triangle patches configured by connection of every three neighboring sampling points from among the sampling points each indicated by a dark round mark in the figure are greater by a size of one half of a pixel in comparison with that of the −Z face 86. Though not depicted, also the sizes in the u direction and the v direction of a region of a triangle patch of each face of the first layer including the other faces 81 to 85 are greater by a size of one half of a pixel in comparison with those of the faces 81 to 85 similarly to the region 311. Accordingly, a triangle patch corresponding to the boundary of each of the faces 81 to 86 is generated, and as a result, a display image of an arbitrary sight line including a sight line passing the boundary of each of the faces 81 to 86 can be generated with high picture quality.

Although an effect in the case where the angle of view of each face of the first layer is 100 degrees is described with reference to FIGS. 23 and 24, if the angle of view of each face of the first layer is greater than 90 degrees, then a similar effect is produced even in the case where the angle of view is not 100 degrees.

(Description of Effect of Angle of View of Face of Second Layer)

Figure 25:
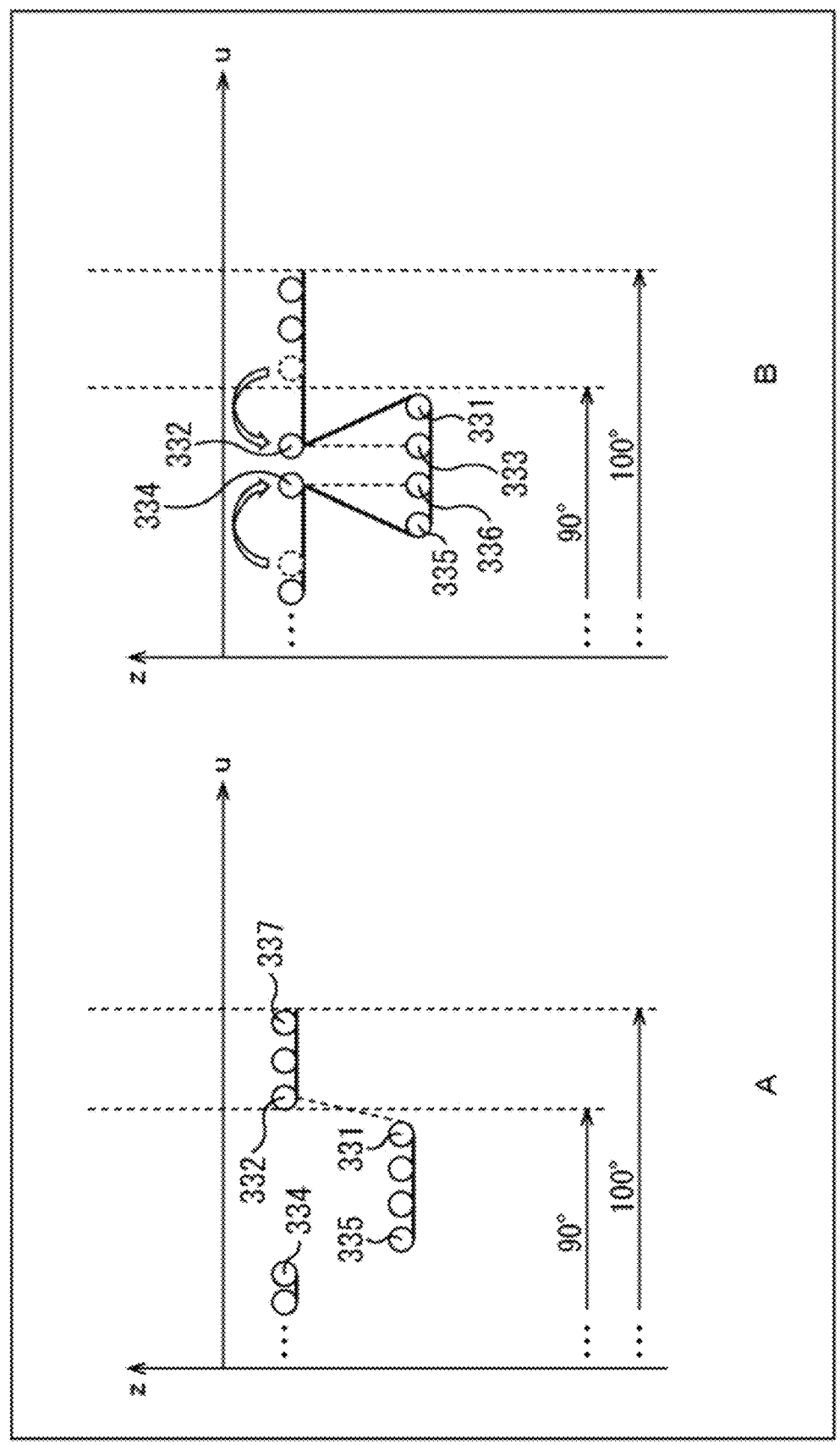
FIG. 25 is a view illustrating an occlusion process.

FIG. 25 is a view illustrating an occlusion process in the case where the angle of view of each face of the second layer is 90 degrees and 100 degrees.

Referring to FIG. 25, the axis of abscissa represents a u axis and the axis of ordinate represents a z axis. Further, a round mark represents a sampling point. Furthermore, in the example of FIG. 25, the z coordinates of the position in the depth direction increases toward the deep side.

In the case where the angle of view of each face of the second layer is 90 degrees, sampling points are mapped only to one of the faces of the second layer. Accordingly, as depicted in A of FIG. 25, a sampling point 332 neighboring with a sampling point 331 that is mapped to an end portion in the u direction of the face of a processing target is not mapped to the face of the processing target, and upon occlusion process of the face of the processing target, the position of the sampling point 332 on the z axis is unknown.

Therefore, even in the case where the difference between the z coordinates of the sampling point 331 and the sampling point 332 is equal to or greater than the threshold value, a pixel corresponding to the sampling point 331 is not detected as a discontinuity pixel. Similarly, also in the case where a face to which the sampling point 332 is mapped is the face of the processing target, a pixel corresponding to the sampling point 332 is not detected as a discontinuity pixel. Accordingly, an occlusion process cannot be performed for the sampling point 331 and the sampling point 332. In other words, in order to perform an occlusion process for the sampling point 331 and the sampling point 332, it is necessary to use, in addition to a depth image of the face of the processing target, also a depth image of a face neighboring with the face of the processing target.

In contrast, in the case where the angle of view of each face of the second layer is 100 degrees, at an end portion of each face, a sampling point that is mapped to a region other than an end portion of a face neighboring with the face is mapped in an overlapping relationship as a margin. For example, at an end portion of the face of the processing target to which the sampling point 331 is mapped, the sampling point 332 that is mapped in a region other than an end portion of a face neighboring with the face of the processing target is mapped.

Accordingly, in the case where the difference between the z coordinates of the sampling point 331 and the sampling point 332 is equal to or greater than the threshold value, pixels corresponding to the sampling point 331 and the sampling point 332 are detected as discontinuity pixels. Therefore, an occlusion process can be performed for the sampling point 331 and the sampling point 332 as depicted in B of FIG. 25. As a result, the u coordinate of the sampling point 332 corresponding to a discontinuity pixel is corrected to the u coordinate of a sampling point 333 in the proximity of and on the nearer side than the sampling point 332 (which has a smaller z coordinate).

It is to be noted that, since, in the example of FIG. 25, the difference of the z coordinate between a sampling point 334 and a sampling point 335 mapped to a region other than an end portion of the face of the processing target is equal to or greater than the threshold value, also pixels corresponding to the sampling point 334 and the sampling point 335 are detected as discontinuity pixels. As a result, as depicted in B of FIG. 25, the u coordinate of the sampling point 334 is connected to the u coordinate of a sampling point 336 in the proximity of and on the nearer side than the sampling point 334.

Further, a sampling point 337 at an end portion of the face of the processing target, which has the greatest u coordinate, is mapped to a region other than an end portion of a face neighboring with the face of the processing target. Accordingly, in the case where this face is set as a face of a processing target, it is decided whether or not a pixel corresponding to the sampling point 337 is a discontinuity pixel, and in the case where it is decided that the pixel is a discontinuity pixel, an occlusion process for the sampling point 337 can be performed.

As described above, in the case where the angle of view of each face of the second layer is 100 degrees, it is possible to use only a sampling point of each face to perform an occlusion process also for the sampling point 331 mapped to an end portion of a region other than an end portion of each face. As a result, an occlusion region of the second layer is reduced, and the picture quality of the display image can be improved.

While an effect in the case where the angle of view of each face of the second layer is 100 degrees is described with reference to FIG. 25, if the angle of view of each face of the second layer is greater than 90 degrees, then even in the case where the angle of view is not 100 degrees, a similar effect is generated.

It is to be noted that the ML3D model generation sections 235 to 237 may perform image processing such as a filter process using peripheral pixels or the like for a texture image or a depth image obtained as a result of decoding. In this case, since the angle of view of each face of the first layer and the second layer is greater than 90 degrees, an effect that, also at an end portion of a region other than an end portion of each face, image processing can be performed similarly to an occlusion process.

(Description of Processing of Home Server)

Figure 26:
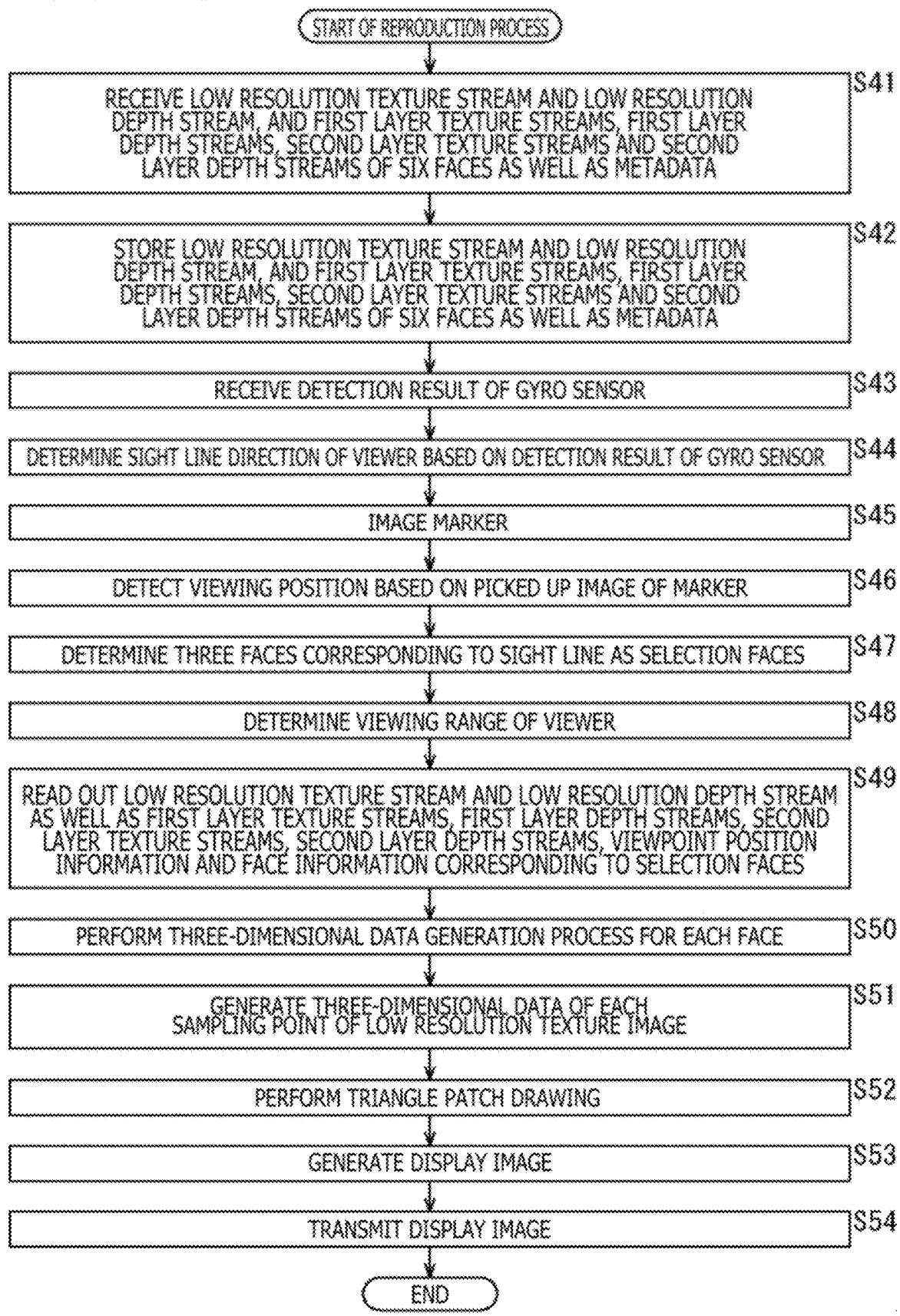
FIG. 26 is a flow chart illustrating a reproduction process.

FIG. 26 is a flow chart illustrating a reproduction process of the home server 13 of FIG. 19. This reproduction process is started when a low resolution texture stream and a low resolution depth stream, first layer texture streams, first layer depth streams, second layer texture streams and second layer depth streams of six faces and metadata are transmitted, for example, from the content server 12 to the home server 13.

At step S41 of FIG. 26, the reception section 231 of the home server 13 receives a low resolution texture stream and a low resolution depth stream, and first layer texture streams, first layer depth streams, second layer texture streams and second layer depth streams of six faces and metadata transmitted from the content server 12 and supplies them to the storage 232.

At step S42, the storage 232 stores the low resolution texture stream and low resolution depth stream, and the first layer texture streams, first layer depth streams, second layer texture streams and second layer depth streams of the six faces and the metadata.

At step S43, the reception section 233 receives a result of the detection of the gyro sensor 15B of FIG. 1 from the head mounted display 15 and supplies the same to the sight line detection section 234.

At step S44, the sight line detection section 234 determines a sight line direction of the viewer in the 3D model coordinate system on the basis of the detection result of the gyro sensor 15B supplied from the reception section 233. At step S45, the camera 13A images the marker 15A applied to the head mounted display 15 and supplies a picked up image obtained as a result of the imaging to the sight line detection section 234.

At step S46, the sight line detection section 234 detects a viewing position in the 3D model coordinate system on the basis of the picked up image of the marker 15A supplied from the camera 13A and supplies the viewing position to the drawing section 239.

At step S47, the sight line detection section 234 determines three faces corresponding to sight line vectors closest to the sight line from among the six faces as selection faces on the basis of the table of the first layer from within the metadata stored in the storage 232 and the viewing position and the sight line direction in the 3D model coordinate system.

At step S48, the sight line detection section 234 determines a viewing range of the viewer in the 3D model coordinate system on the basis of the viewing position and the sight line direction in the 3D model coordinate system, and supplies the viewing range to the drawing section 239.

At step S49, the sight line detection section 234 reads out the low resolution texture stream and the low resolution depth stream from the storage 232 and supplies them to the 3D model generation section 238. Further, the sight line detection section 234 reads out first layer texture streams, first layer depth streams, second layer texture streams and second layer depth streams corresponding to the three selection faces from the storage 232. The sight line detection section 234 supplies the read out first layer texture streams, first layer depth streams, second layer texture streams and second layer depth streams for each face to the ML3D model generation sections 235 to 237. Further, the sight line detection section 234 reads out the viewpoint position information and the face information corresponding to the three selection faces from the storage 232 and supplies them to the drawing section 239.

At step S50, the ML3D model generation sections 235 to 237 perform, for each face, a three-dimensional data generation process for generating three-dimensional data of the sampling points of the first layer and the second layer. Details of the three-dimensional data generation process are hereinafter described with reference to FIG. 27.

At step S51, the 3D model generation section 238 generates three-dimensional data of the sampling points of the low resolution texture image from the low resolution texture stream and the low resolution depth stream supplied from the sight line detection section 234 and supplies the three-dimensional data to the drawing section 239.

At step S52, the drawing section 239 performs, on the basis of the three-dimensional data of the low resolution texture image supplied from the 3D model generation section 238, triangle patch drawing of the low resolution texture image in the 3D model coordinate system. Thereafter, the drawing section 239 performs, on the basis of the three-dimensional data of the first layer and the second layer supplied from the ML3D model generation sections 235 to 237 and the viewpoint position information and the face information supplied from the sight line detection section 234, triangle patch drawing of texture images of the first layer and the second layer in the 3D model coordinate system.

At step S53, the drawing section 239 generates a display image by perspectively projecting the triangle patch drawn in the 3D model coordinate system to the viewing range with respect to the viewpoint given as the viewing position supplied from the sight line detection section 234. At step S54, the drawing section 239 transmits the display image to the conversion apparatus 14 of FIG. 1.

Figure 27:
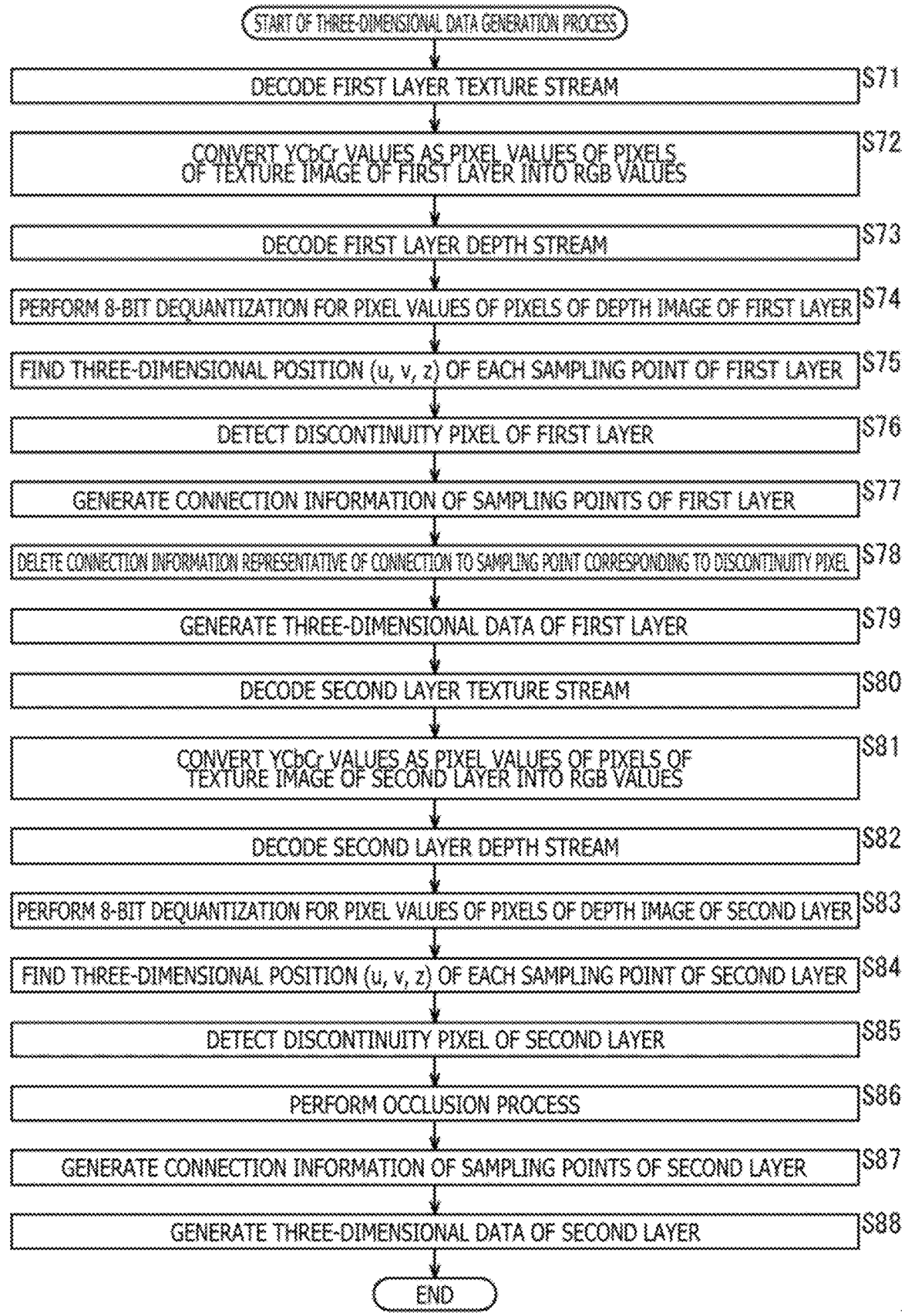
FIG. 27 is a flow chart illustrating details of a three-dimensional data generation process.

FIG. 27 is a flow chart illustrating details of the three-dimensional data generation process performed by the ML3D model generation section 235 at step S50 of FIG. 26.

At step S71 of FIG. 27, the decoder 251 (FIG. 20) of the ML3D model generation section 235 decodes first layer texture streams supplied from the sight line detection section 234 of FIG. 19 to generate a texture image of the first layer. The decoder 251 supplies the texture image of the first layer to the RGB conversion section 252.

At step S72, the RGB conversion section 252 converts YCbCr values as pixel values of the pixels of the texture image of the first layer into RGB values and determines them as RGB values of sampling points corresponding to the pixels. Then, the RGB conversion section 252 supplies the RGB values of the sampling points to the 3D model generation section 256.

At step S73, the decoder 253 decodes the first layer depth streams supplied from the sight line detection section 234 to generate a depth image of the first layer. The decoder 253 supplies the depth image of the first layer to the depth conversion section 254.

At step S74, the depth conversion section 254 performs 8-bit dequantization for the pixel value of each pixel of the depth image of the first layer supplied from the decoder 253 and obtains a reciprocal 1/r of each pixel of the depth image of the first layer.

At step S75, the depth conversion section 254 calculates the three-dimensional position (u, v, z) of each pixel of the depth image of the first layer on the basis of the reciprocal 1/r of each pixel of the depth image of the first layer as a three-dimensional position (u, v, z) of a sampling point corresponding to the pixel. The depth conversion section 254 supplies the three-dimensional positions (u, v, z) of the sampling points to the discontinuity detection section 255 and the 3D model generation section 256.

At step S76, the discontinuity detection section 255 detects discontinuity pixels from among the pixels of the depth images of the first layer on the basis of the three-dimensional positions (u, v, z) of the sampling points supplied from the depth conversion section 254. The discontinuity detection section 255 supplies the three-dimensional positions (u, v, z) of the sampling points corresponding to the discontinuity pixels to the 3D model generation section 256.

At step S77, the 3D model generation section 256 generates, on the basis of the three-dimensional positions (u, v, z) of the sampling points supplied from the depth conversion section 254, connection information of the sampling points of the first layer such that every three neighboring sampling points from among the sampling points are connected to each other.

At step S78, the 3D model generation section 256 deletes, on the basis of the three-dimensional positions (u, v, z) of the sampling points corresponding to the discontinuity pixels supplied from the discontinuity detection section 255, connection information representative of connection to the sampling points corresponding to the discontinuity pixels from within the connection information of the sampling points generated at step S77.

At step S79, the 3D model generation section 256 generates three-dimensional positions (u, v, z) of the sampling points of the first layer, RGB values and connection information after the deletion by the process at step S78 as three-dimensional data of the first layer. The 3D model generation section 256 supplies the three-dimensional data of the first layer to the drawing section 239 of FIG. 19.

At step S80, the decoder 257 decodes the second layer texture streams supplied from the sight line detection section 234 to generate a texture image of the second layer. The decoder 257 supplies the texture image of the second layer to the RGB conversion section 258.

At step S81, the RGB conversion section 258 converts the YCbCr values as pixel values of the pixels of the texture images of the second layer into RGB values and determines them as RGB values of the sampling points corresponding to the pixels. Then, the RGB conversion section 258 supplies the RGB values of the sampling points to the 3D model generation section 262.

At step S82, the decoder 259 decodes the second layer depth streams supplied from the sight line detection section 234 to generate a depth image of the second layer. The decoder 259 supplies the depth image of the second layer to the depth conversion section 260.

At step S83, the depth conversion section 260 performs 8-bit dequantization for the pixel values of the pixels of the depth images of the second layer supplied from the decoder 259 and obtains reciprocals 1/r of the pixels of the depth images of the second layer.

At step S84, the depth conversion section 260 calculates, on the basis of the reciprocals 1/r of the pixels of the depth images of the second layer, three-dimensional positions (u, v, z) of the pixels of the depth images of the second layer as three-dimensional positions (u, v, z) of sampling points corresponding to the pixels. The depth conversion section 260 supplies the three-dimensional positions (u, v, z) of the sampling points to the occlusion processing section 261 and the 3D model generation section 262.

At step S85, the occlusion processing section 261 detects, on the basis of the three-dimensional positions (u, v, z) of the sampling points supplied from the depth conversion section 260, discontinuity pixels among the pixels of the depth image of the second layer.

At step S86, the occlusion processing section 261 performs, on the basis of the three-dimensional positions (u, v, z) of the sampling points of the second layer, an occlusion process for correcting the three-dimensional positions (u, v, z) of the sampling points corresponding to the discontinuity pixels. The occlusion processing section 261 supplies the three-dimensional positions (u, v, z) after the occlusion process of the sampling points of the second layer to the 3D model generation section 262.

At step S87, the 3D model generation section 262 generates, on the basis of three-dimensional positions (u, v, z) of the sampling points supplied from the occlusion processing section 261, connection information of the sampling points of the second layer such that every three neighboring sampling points among the sampling points are connected to each other.

At step S88, the 3D model generation section 262 generates the three-dimensional positions (u, v, z) and the connection information of the sampling points and the RGB values supplied from the RGB conversion section 258 as three-dimensional data of the second layer. The 3D model generation section 262 supplies the three-dimensional data of the second layer to the drawing section 239 of FIG. 19.

It is to be noted that the three-dimensional data generation processes performed by the ML3D model generation section 236 and the ML3D model generation section 237 are performed similarly to the three-dimensional data process of FIG. 27.

The home server 13 generates a display image using the first layer and the second layer as described above. Accordingly, in the case where the viewing position is different from the viewpoint O, an occlusion region of the viewpoint O included in the display image can be generated using the second layer. Accordingly, a display image of high picture quality can be generated.

Further, the home server 13 generates a display image using not only a texture image but also a depth image. Accordingly, through the triangle patch drawing, it is possible to map a texture image to a triangle patch of a three-dimensional shape according to an imaging object and generate a display image using the triangle patch. Therefore, in comparison with an alternative case in which a display image is generated by mapping a texture image to a predetermined face using only a texture image, a display image of high picture quality can be generated.

Furthermore, a texture image and a depth image of the first layer are a texture image and a depth image obtained by mapping a texture image and a depth image of an omnidirectional image, respectively. Accordingly, a reproduction apparatus that reproduces only a texture image and a depth image obtained by mapping a texture image and a depth image of an omnidirectional image to a predetermined face can reproduce the texture image and the depth image of the first layer.

In particular, the format of texture images and depth images of the first layer and the second layer generated by the content server 12 has compatibility with the format of a texture image and a depth image obtained by mapping a texture image and a depth image of an omnidirectional image. Further, the reproduction method by the home server 13 has compatibility with the reproduction method of a reproduction apparatus that reproduces only a texture image and a depth image obtained by mapping a texture image and a depth image of an omnidirectional image to a predetermined face.

It is to be noted that the home server 13 may generate a display image using only a texture image and a depth image of the first layer. In this case, for the first layer, an occlusion process is performed in place of deletion of connection information.

Further, while, in the foregoing description, the 3D model generation section 256 deletes connection information representative of connection to a sampling point corresponding to a discontinuity pixel detected by the discontinuity detection section 255, connection information may otherwise be deleted on the basis of triangle patch validity information (details are hereinafter described) transmitted from the content server 12. In this case, the discontinuity detection section 255 is not provided.

(Description of Triangle Patch Validity Information)

Figure 28:
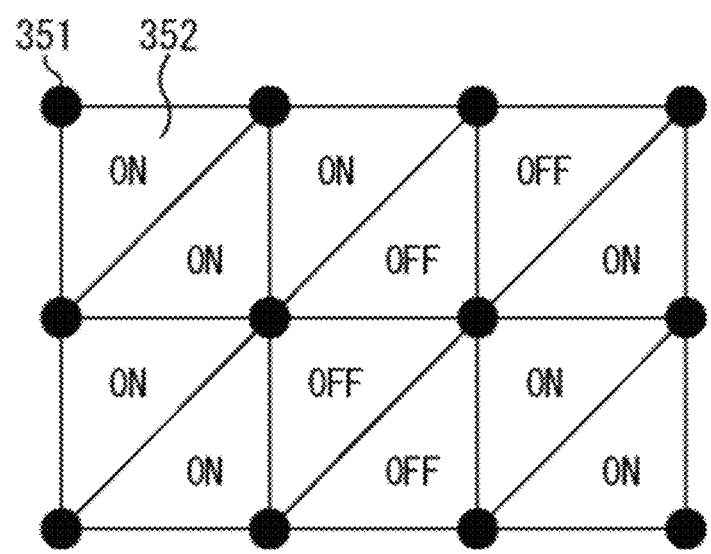
FIG. 28 is a view illustrating triangle patch validity information.

FIG. 28 is a view illustrating triangle patch validity information transmitted from the content server 12 in such a case as just described.

In the example of FIG. 28, the number of sampling points 351 of the first layer is 12. Accordingly, the number of triangle patches 352 each of which has vertices at three neighboring sampling points 351 is 12.

In this case, the content server 12 detects discontinuity pixels similarly to the discontinuity detection section 255. Then, the content server 12 sets a triangle patch 352 having a vertex at a sampling point corresponding to each discontinuity pixel as invalid (OFF) and sets each triangle patch 352 that does not include a sampling point corresponding to any discontinuity pixel as valid (ON).

The content server 12 (generation section) generates triangle patch validity information indicating that each triangle patch 352 is valid or invalid and places the triangle patch validity information into metadata.

The 3D model generation section 256 of the home server 13 deletes, on the basis of the triangle patch validity information, connection information representative of connection between sampling points that configure the vertices of each invalid triangle patch. As a result, any triangle patch whose triangle patch validity information indicates invalid is not drawn.

It is to be noted that triangle patches are generated by two for each sampling point except sampling points at the right end and the lower end. Further, the triangle patch validity information is information of 1 bit indicating that the triangle patch is valid or invalid. Accordingly, if the pixel number in the horizontal direction of a texture image of the first layer is represented by width and the pixel number in the vertical direction is represented by height, the bit number of triangle patch validity information of all triangle patches is (width−1)*(height−1)*2 bits.

The triangle patch validity information is transmitted in a lossless compression state or a non-compression state from the content server 12 to the home server 13. It is to be noted that the triangle patch validity information may be disposed as Cb and Cr values of a depth image.

Second Embodiment (Configuration Example of Second Embodiment of Image Displaying System)

Figure 29:
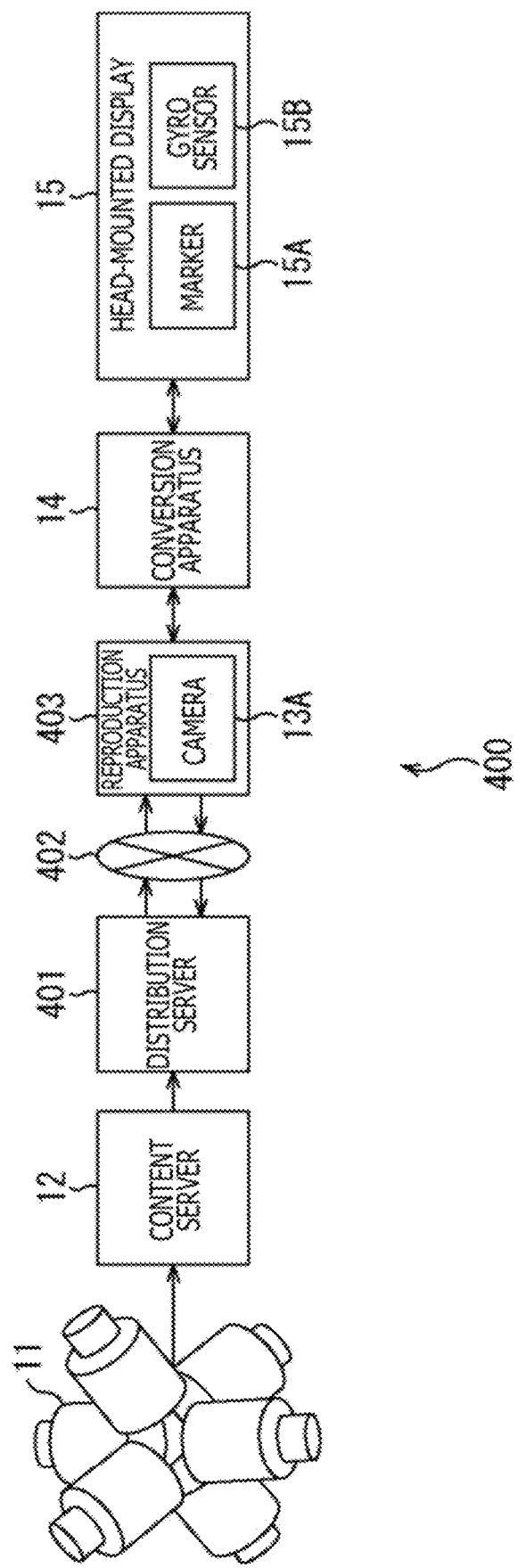
FIG. 29 is a block diagram depicting a configuration example of a second embodiment of an image displaying system to which the present disclosure is applied.

FIG. 29 is a block diagram depicting a configuration example of a second embodiment of the image displaying system to which the present disclosure is applied.

Like components depicted in FIG. 29 to those of FIG. 1 are denoted by like reference characters. Overlapping description is suitably omitted.

The image displaying system 400 of FIG. 29 includes a multi camera 11, a content server 12, a conversion apparatus 14, a head mounted display 15, a distribution server 401, a network 402, and a reproduction apparatus 403. In the image displaying system 400, only a first layer texture stream, a first layer depth stream, a second layer texture stream and a second layer depth stream of one face corresponding to a sight line from among six faces are distributed to and reproduced by the reproduction apparatus 403.

In particular, the distribution server 401 of the image displaying system 400 receives and stores a low resolution texture stream and a low resolution depth stream, first layer texture streams, first layer depth streams, second layer texture streams and second layer depth streams of six faces, and metadata transmitted thereto from the content server 12.

Further, the distribution server 401 is connected to the reproduction apparatus 403 through the network 402. The distribution server 401 transmits a low resolution texture stream and a low resolution depth stream, a first layer texture stream, a first layer depth stream, a second layer texture stream and a second layer depth stream of one face and metadata stored therein to the reproduction apparatus 403 through the network 402 in response to a request from the reproduction apparatus 403.

The reproduction apparatus 403 (image processing apparatus) requests the distribution server 401 for a low resolution texture stream, a low resolution depth stream and metadata through the network 402 and accepts a low resolution texture stream, a low resolution depth stream and metadata transmitted thereto in accordance with the request.

Further, the reproduction apparatus 403 has a camera 13A built therein. Similarly to the home server 13, the reproduction apparatus 403 detects a viewing position in a 3D model coordinate system and determines a sight line direction and a viewing range of the viewer in the 3D model coordinate system.

Then, the reproduction apparatus 403 determines, on the basis of the viewing position and the sight line direction in the 3D model coordinate system and a table of the first layer included in metadata, one face corresponding to a sight line vector closest the sight line from among the six faces of the first layer as a selection face. The reproduction apparatus 403 request for a first layer texture stream, a first layer depth stream, a second layer texture stream and a second layer depth stream corresponding to the one selection face through the network 402. The reproduction apparatus 403 receives a first layer texture stream, a first layer depth stream, a second layer texture stream and a second layer depth stream corresponding to the one selection face transmitted thereto in response to the request.

The reproduction apparatus 403 uses the low resolution texture stream and the low resolution depth stream as well as the first layer texture stream, first layer depth stream, second layer texture stream and second layer depth stream corresponding to the one selection face to generate a display image. The process for generating a display image of the reproduction apparatus 403 is similar to the process of the home server 13 except that the number of selection faces is one, and therefore, description of the same is omitted. The reproduction apparatus 403 transmits the display image to the conversion apparatus 14 through an HDMI cable not depicted.

<Different Example of Texture Image>

Figure 30:
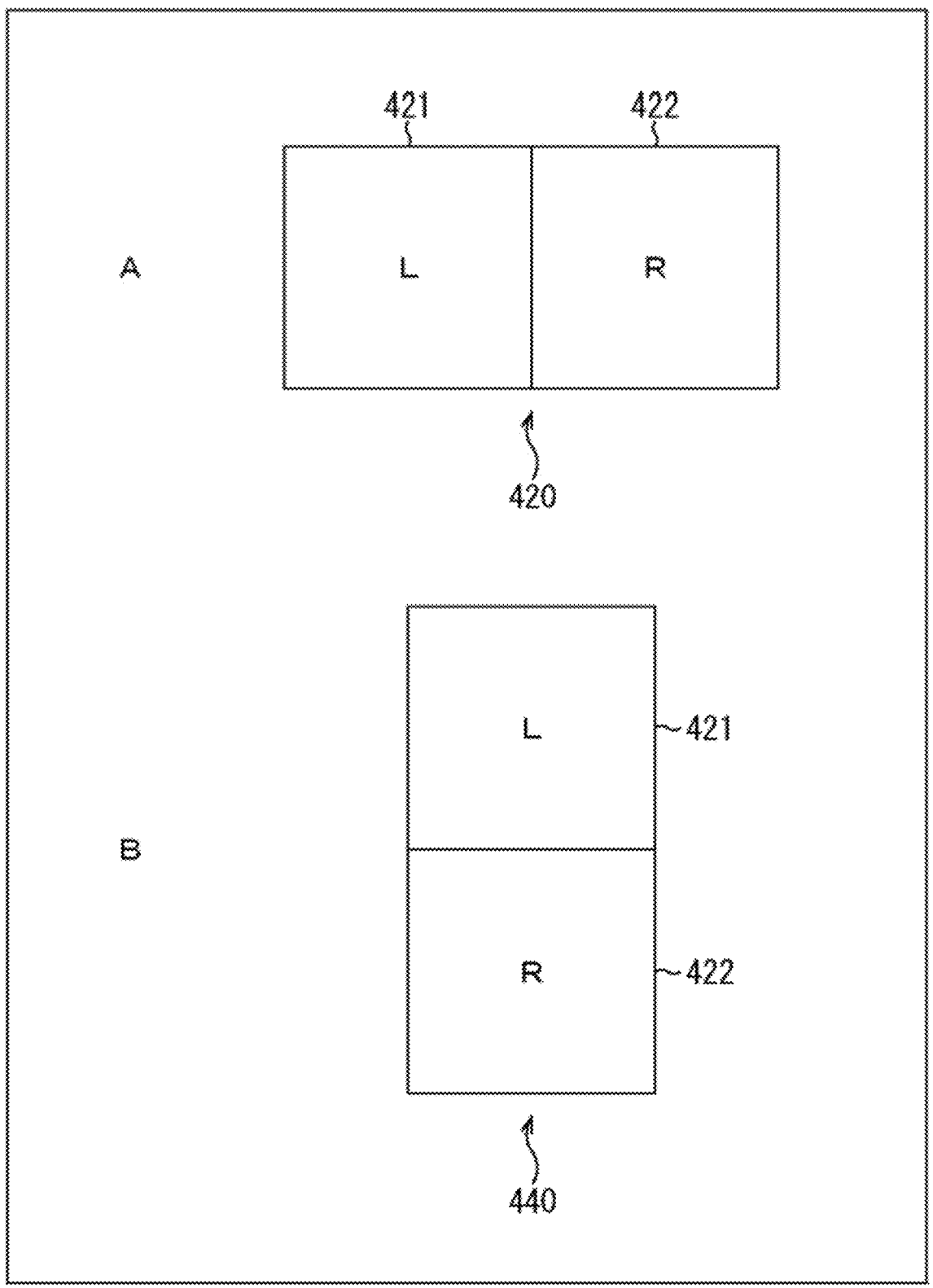
FIG. 30 is a view depicting a different example of a texture image of the first layer.

FIG. 30 is a view depicting a different example of a texture image of the first layer.

While, in the foregoing description, the texture image of each face of the first layer is a texture image of one viewpoint O, it may be a composite image of texture images of a viewpoint for the left eye and a viewpoint for the left eye corresponding to the viewpoint O.

In particular, the texture image of each face of the first layer may be, as depicted in A of FIG. 30, for example, a packing image 420 obtained by packing a texture image 421 of each face of the first layer of a viewpoint for the left eye corresponding to the viewpoint O and a texture image 422 of each face of the first layer of the viewpoint for the right eye in the transverse direction (horizontal direction).

Further, as depicted in B of FIG. 30, a texture image of each face of the first layer may be, for example, a packing image 440 obtained by packing a texture image 421 and a texture image 422 in a vertical direction (vertical direction).

Similarly, a texture image of each face of the second layer may be, for example, a packing image obtained by packing a texture image of the second layer of a viewpoint for the left eye corresponding to one viewpoint of the second layer on the face and a texture image of the second layer of a viewpoint for the right eye in a transverse direction or a vertical direction.

As described above, in the case where a texture image of each of the faces of the first layer and the second layer is a texture image obtained by packing images of a viewpoint for the left eye and a viewpoint for the right eye, a texture image obtained as a result of decoding is separated into a texture image of a viewpoint for the left eye and a texture image of a viewpoint for the right eye. Then, three-dimensional data for the left eye and three-dimensional data for the right eye are generated in regard to the first layer and the second layer.

Then, a display image for the left eye is generated from the three-dimensional data for the left eye on the basis of the viewing direction and the viewing position of the left eye corresponding to the viewing direction and the viewing position of the viewer. Further, a display image for the right eye is generated from the three-dimensional data for the right eye on the basis of the viewing direction and the viewing position of the right eye corresponding to the viewing direction and the viewing position of the viewer. Then, in the case where the head mounted display 15 can perform 3D display, the head mounted display 15 displays the display image for the left eye as an image for the left eye and displays the display image for the right eye as an image for the right eye to 3D display the display image.

It is to be noted that, while, in the first and second embodiments, picked up images are mapped to a regular octahedron to generate an omnidirectional image, the 3D model to which picked up images are to be mapped can be, in addition to a regular octahedron, a sphere, a cube or the like. In the case where picked up images are mapped to a sphere, the omnidirectional image is an image, for example, according to a positive pyramid projection of a sphere to which picked up images are mapped.

Further, a low resolution texture stream and a low resolution depth stream may not be generated. Depth images of the first layer and the second layer may not be generated. Further, a texture image and a depth image of the second layer may be generated only on one of faces to which a picked up image of a significant imaging object is mapped.

Furthermore, also low resolution texture images and low resolution depth images may be generated in a hierarchized state similarly to texture images and depth images of a high resolution.

Third Embodiment (Description of Computer to which Present Disclosure is Applied)

While the series of processes described above can be executed by hardware, it may otherwise be executed by software. In a case where the series of processes is executed by software, a program that constructs the software is installed into a computer. Here, the computer includes a computer incorporated in hardware for exclusive use, for example, a personal computer for universal use that can execute various functions by installing various programs, and so forth.

Figure 31:
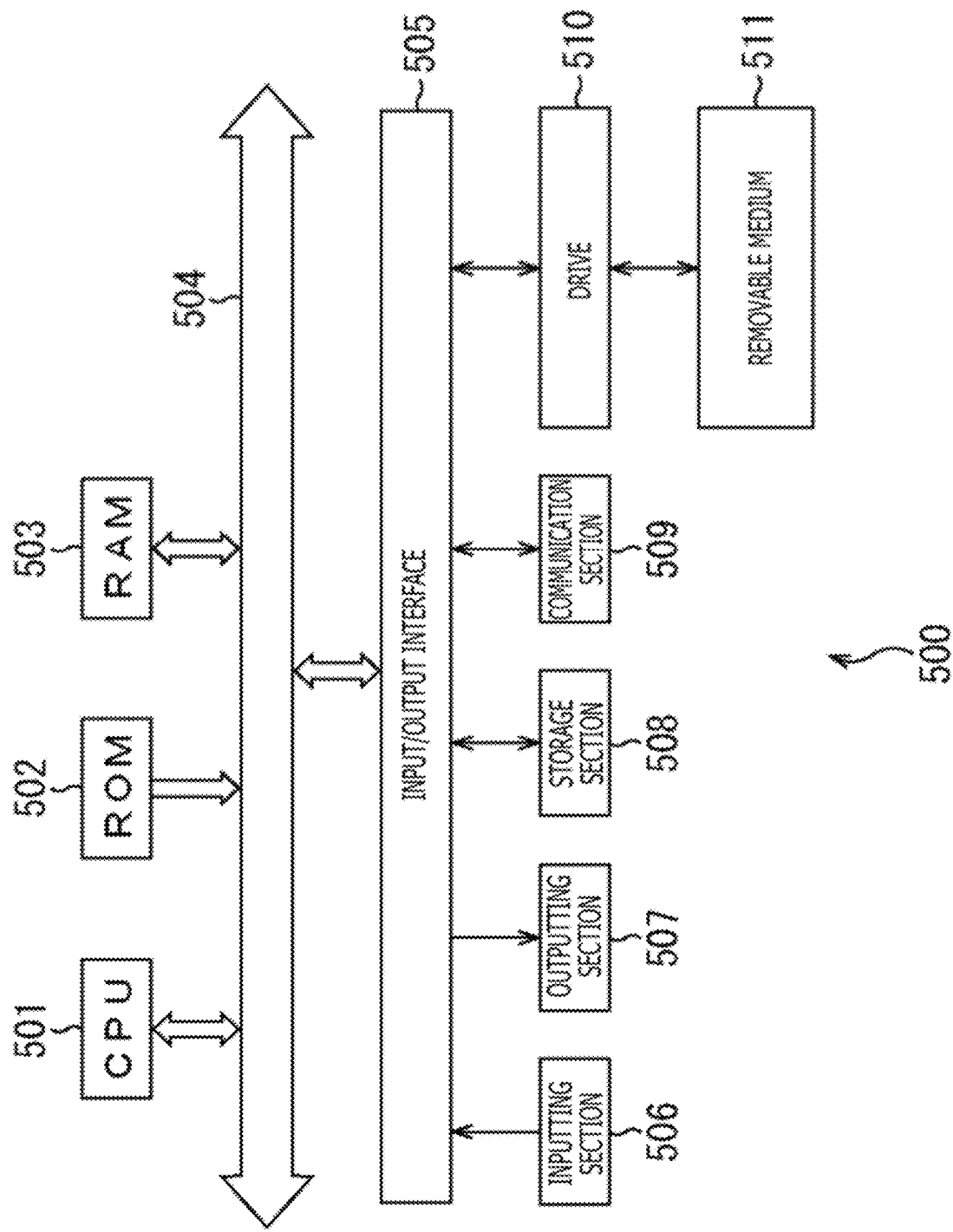
FIG. 31 is a block diagram depicting a configuration example of hardware of a computer.

FIG. 31 is a block diagram depicting a configuration example hardware of a computer that executes the series of processes described hereinabove in accordance with a program.

In the computer 500, a CPU (Central Processing Unit) 501, a ROM (Read Only Memory) 502 and a RAM (Random Access Memory) 503 are connected to each other by a bus 504.

To the bus 504, an input/output interface 505 is connected further. To the input/output interface 505, an inputting section 506, an outputting section 507, a storage section 508, a communication section 509 and a drive 510 are connected.

The inputting section 506 includes a keyboard, a mouse, a microphone and so forth. The outputting section 507 includes a display, a speaker and so forth. The storage section 508 includes a hard disk, a nonvolatile memory and so forth. The communication section 509 includes a network interface or the like. The drive 510 drives a removable medium 511 such as a magnetic disk, an optical disk, a magneto-optical disk, a semiconductor memory or the like.

In the computer 500 configured in such a manner as described above, the CPU 501 loads a program stored, for example, in the storage section 508 into the RAM 503 through the input/output interface 505 and the bus 504 to perform the series of processes described above.

The program that is executed by the computer 500 (CPU 501) can be recorded into and provided as the removable medium 511, for example, as a package medium or the like. Further, the program can be provided through a wired or wireless transmission medium such as a local area network, the Internet, a digital satellite broadcast or the like.

In the computer 500, a program can be installed into the storage section 508 through the input/output interface 505 by mounting a removable medium 511 on the drive 510. Further, the program can be received by the communication section 509 through a wired or wireless transmission medium and installed into the storage section 508. Further, the program can be installed in advance into the ROM 502 or the storage section 508.

It is to be noted that the program executed by the computer 500 may be a program in which processes are performed in time series in accordance with the order described herein or may be a program in which processes are executed in parallel or at a necessary timing such as, for example, when the program is called or the like.

Application Example

The technology according to the present disclosure can be applied to various products. For example, the technology according to the present disclosure may be implemented as an apparatus that is incorporated in various types of mobile bodies such as automobiles, hybrid electric cars, motorcycles, bicycles, personal mobilities, airplanes, drones, ships, robots, construction machines, agricultural machines (tractors) and so forth.

FIG. 32 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 32, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 32 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 33 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 33 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 32, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE), LTE-advanced (LTE-A), or the like, or another wireless communication protocol such as wireless LAN (referred to also as wireless fidelity (Wi-Fi)), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 32, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 32 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It is to be noted that a computer program for implementing the functions of the image displaying system 10 (400) according to the present embodiments with reference to FIGS. 1 to 30 can be incorporated into some control unit or the like. Further, also it is possible to provide a computer-readable recording medium in which such a computer program as just described is stored. The recording medium may be, for example, a magnetic disk, an optical disk, a magneto-optical disk, a flash memory or the like. Further, the computer program described above may be distributed, for example, through a network without using a recording medium.

In the vehicle control system 7000 described above, the image displaying system 10 (400) according to the present embodiments described hereinabove with reference to FIGS. 1 to 30 can be applied to the vehicle control system 7000 of the application example depicted in FIG. 32. For example, the multi camera 11 of the image displaying system 10 (400) corresponds at least to part of the imaging section 7410. Further, the content server 12, home server 13 (distribution server 401, network 402 and reproduction apparatus 403) and conversion apparatus 14 are integrated and correspond to the microcomputer 7610 and the storage section 7690 of the integrated control unit 7600. The head mounted display 15 corresponds to the display section 7720. It is to be noted that, in the case where the image displaying system 10 (400) is applied to the vehicle control system 7000, the camera 13A, marker 15A and gyro sensor 15B are not provided, and a sight line direction and a viewing position of a viewer are inputted by an operation of the input section 7800 by a passenger who is a viewer. By applying the image displaying system 10 (400) to the vehicle control system 7000 of the application example depicted in FIG. 32 in such a manner as described hereinabove, a display image of high picture quality can be generated using an omnidirectional image.

Further, at least part of the components of the image displaying system 10 (400) described hereinabove with reference to FIGS. 1 to 30 may be implemented by a module for the integrated control unit 7600 depicted in FIG. 32 (for example, by an integrated circuit module configured by one die). As an alternative, the image displaying system 10 (400) described with reference to FIGS. 1 to 30 may be implemented by a plurality of control units of the vehicle control system 7000 depicted in FIG. 32.

In the present specification, the term system is used to signify an aggregation including a plurality of constituent elements (devices, modules (parts) and so forth) and it does not matter whether or not all of the constituent elements are accommodated in the same housing. Accordingly, a plurality of apparatus accommodated in separate housings and connected to each other through a network configure a system, and also one apparatus that includes a plurality of modules accommodated in a single housing configures a system.

It is to be noted that the advantageous effects described herein are illustrative to the last and are not restrictive, and other advantages may be available.

Further, the embodiment of the present disclosure is not limited to the embodiments described hereinabove, and various alterations are possible without departing from the subject matter of the present disclosure.

For example, the present disclosure can assume a configuration for crowd computing in which one function is shared by a plurality of devices through a network and processed in collaboration.

Further, the steps described hereinabove in connection with the flow charts can be executed by a single apparatus or can be executed by sharing by a plurality of apparatus.

Further, in a case where one step includes a plurality of processes, the plurality of processes included in the one step can be executed by a single device and also can be executed by sharing by a plurality of apparatus.

It is to be noted that the present disclosure can assume such a configuration as described below.

(1)
An image processing apparatus, including:
an image generation section configured to generate a texture image of a given viewpoint using a first layer image including a texture image and a depth image of an omnidirectional image at a first viewpoint and a second layer image including a texture image and a depth image at a second viewpoint different from the first viewpoint in an occlusion region at a viewpoint of the first layer image.

(2)
The image processing apparatus according to (1), in which
angles of view of the first layer image and the second layer image are equal to each other and are greater than 90 degrees but smaller than 180 degrees.

(3)
The image processing apparatus according to (1) or (2), in which
the image generation section generates a texture image of the given viewpoint based on metadata including information indicative of positions of the first viewpoint and the second viewpoint.

(4)
The image processing apparatus according to (3), in which
the metadata includes first sight line vectors that are sight line vectors corresponding to the first layer image and second sight line vectors that are sight line vectors corresponding to the second layer image.

(5)
The image processing apparatus according to (4), in which
the first sight line vectors and the second sight line vectors are same as each other.

(6)
The image processing apparatus according to (5), in which
the first layer image includes, for each of the first sight line vectors, a texture image and a depth image corresponding to the first sight line vector whose start point is the first viewpoint,
the second layer image includes, for each of the second sight line vectors, a texture image and a depth image corresponding to the second sight line vector whose start point is the second viewpoint spaced by a given distance in a given direction from the first viewpoint, and
the image generation section generates a texture image of the given viewpoint using the first layer image of a given first sight line vector and the second layer image of the second sight line vector same as the given first sight line vector.

(7)
The image processing apparatus according to (6), in which
the given direction differs for each of the second sight line vectors.

(8)
An image processing method by an image processing apparatus, including:
an image generation step of generating a texture image of a given viewpoint using a first layer image including a texture image and a depth image of an omnidirectional image at a first viewpoint and a second layer image including a texture image and a depth image at a second viewpoint different from the first viewpoint in an occlusion region at a viewpoint of the first layer image.

(9)
An image processing apparatus, including:
an image generation section configured to generate a first layer image including a texture image and a depth image of an omnidirectional image at a first viewpoint and a second layer image including a texture image and a depth image at a second viewpoint different from the first viewpoint in an occlusion region at a viewpoint of the first layer image.

(10)

The image processing apparatus according to (9), in which angles of view of the first layer image and the second layer image are equal to each other and are greater than 90 degrees but smaller than 180 degrees.

(11)

The image processing apparatus according to (9) or (10), further including:

a metadata generation section configured to generate metadata including information indicative of positions of the first viewpoint and the second viewpoint.

(12)

The image processing apparatus according to (11), in which the metadata includes first sight line vectors that are sight line vectors corresponding to the first layer image and second sight line vectors that are sight line vectors corresponding to the second layer image.

(13)

The image processing apparatus according to (12), in which the first sight line vectors and the second sight line vectors are same as each other.

(14)

The image processing apparatus according to (13), in which the first layer image includes, for each of the first sight line vectors, a texture image and a depth image corresponding to the first sight line vector whose start point is the first viewpoint, and the second layer image includes, for each of the second sight line vectors, a texture image and a depth image corresponding to the second sight line vector whose start point is the second viewpoint spaced by a given distance in a given direction from the first viewpoint.

(15)

The image processing apparatus according to (14), in which the given direction differs for each of the second sight line vectors.

(16)

An image processing method by an image processing apparatus, including:

an image generation step of generating a first layer image including a texture image and a depth image of an omnidirectional image at a first viewpoint and a second layer image including a texture image and a depth image at a second viewpoint different from the first viewpoint in an occlusion region at a viewpoint of the first layer image.

REFERENCE SIGNS LIST

12 Content server, 13 Home server, 50 First layer generation section, 53 Second layer generation section, 57 Metadata generation section, 239 Drawing section, 256 3D model generation section, 261 Occlusion processing section, 403 Reproduction apparatus

The invention claimed is:

1. An image processing apparatus, comprising:
an image generation section configured to generate a texture image of a given viewpoint using a first layer image including a texture image and a depth image corresponding to faces configuring a cube centered at a first viewpoint of an omnidirectional image and a second layer image including a texture image and a depth image corresponding to faces configuring a cube centered at a second viewpoint different from the first viewpoint in an occlusion region at a viewpoint of the first layer image, wherein each of the texture image and the depth image of the first layer and the texture image and the depth image of the second layer corresponding to one of the faces configuring the cube includes an image mapped to the one face and a part of images mapped to other faces adjacent to the one face, and wherein the image generation section is implemented via at least one processor.

2. The image processing apparatus according to claim 1, wherein the image generation section generates a texture image of the given viewpoint based on metadata including information indicative of positions of the first viewpoint and the second viewpoint.

3. The image processing apparatus according to claim 2, wherein the metadata includes first sight line vectors that are sight line vectors corresponding to the first layer image and directed to a center of each of the faces of the first layer image and second sight line vectors that are sight line vectors corresponding to the second layer image and directed to a center of each of the faces of the second layer image.

4. The image processing apparatus according to claim 3, wherein the first sight line vectors and the second sight line vectors are same as each other.

5. The image processing apparatus according to claim 4, wherein the first layer image includes, for each of the first sight line vectors, a texture image and a depth image corresponding to the first sight line vector whose start point is the first viewpoint, the second layer image includes, for each of the second sight line vectors, a texture image and a depth image corresponding to the second sight line vector whose start point is the second viewpoint spaced by a given distance in a given direction from the first viewpoint, and the image generation section generates a texture image of the given viewpoint using the first layer image of a given first sight line vector and the second layer image of the second sight line vector same as the given first sight line vector.

6. The image processing apparatus according to claim 5, wherein the given direction differs for each of the second sight line vectors.

7. An image processing method by an image processing apparatus, the method comprising:

generating a texture image of a given viewpoint using a first layer image including a texture image and a depth image corresponding to faces configuring a cube centered at a first viewpoint of an omnidirectional image and a second layer image including a texture image and a depth image corresponding to faces configuring a cube centered at a second viewpoint different from the first viewpoint in an occlusion region at a viewpoint of the first layer image, wherein each of the texture image and the depth image of the first layer and the texture image and the depth image of the second layer corresponding to one of the faces configuring the cube includes an image mapped to the one face and a part of images mapped to other faces adjacent to the one face.

8. An image processing apparatus, comprising:
an image generation section configured to generate a first layer image including a texture image and a depth image corresponding to faces configuring a cube centered at a first viewpoint of an omnidirectional image and a second layer image including a texture image and a depth image corresponding to faces configuring a cube centered at a second viewpoint different from the first viewpoint in an occlusion region at a viewpoint of the first layer image,
wherein each of the texture image and the depth image of the first layer and the texture image and the depth image of the second layer corresponding to one of the faces configuring the cube includes an image mapped to the one face and a part of images mapped to other faces adjacent to the one face, and
wherein the image generation section is implemented via at least one processor.

9. The image processing apparatus according to claim 8, further comprising:
a metadata generation section configured to generate metadata including information indicative of positions of the first viewpoint and the second viewpoint.

10. The image processing apparatus according to claim 9, wherein
the metadata includes first sight line vectors that are sight line vectors corresponding to the first layer image and directed to a center of each of the faces of the first layer image and second sight line vectors that are sight line vectors corresponding to the second layer image and directed to a center of each of the faces of the second layer image.

11. The image processing apparatus according to claim 10, wherein
the first sight line vectors and the second sight line vectors are same as each other.

12. The image processing apparatus according to claim 11, wherein
the first layer image includes, for each of the first sight line vectors, a texture image and a depth image corresponding to the first sight line vector whose start point is the first viewpoint, and
the second layer image includes, for each of the second sight line vectors, a texture image and a depth image corresponding to the second sight line vector whose start point is the second viewpoint spaced by a given distance in a given direction from the first viewpoint.

13. The image processing apparatus according to claim 12, wherein
the given direction differs for each of the second sight line vectors.

14. An image processing method by an image processing apparatus, the method comprising:
generating a first layer image including a texture image and a depth image corresponding to faces configuring a cube centered at a first viewpoint of an omnidirectional image and a second layer image including a texture image and a depth image corresponding to faces configuring a cube centered at a second viewpoint different from the first viewpoint in an occlusion region at a viewpoint of the first layer image,
wherein each of the texture image and the depth image of the first layer and the texture image and the depth image of the second layer corresponding to one of the faces configuring the cube includes an image mapped to the one face and a part of images mapped to other faces adjacent to the one faces.

15. A non-transitory computer-readable medium having embodied thereon a program, which when executed by a computer, causes the computer to execute a method, the method comprising:
generating a texture image of a given viewpoint using a first layer image including a texture image and a depth image corresponding to faces configuring a cube centered at a first viewpoint of an omnidirectional image and a second layer image including a texture image and a depth image corresponding to faces configuring a cube centered at a second viewpoint different from the first viewpoint in an occlusion region at a viewpoint of the first layer image,
wherein each of the texture image and the depth image of the first layer and the texture image and the depth image of the second layer corresponding to one of the faces configuring the cube includes an image mapped to the one face and a part of images mapped to other faces adjacent to the one face.

16. A non-transitory computer-readable medium having embodied thereon a program, which when executed by a computer, causes the computer to execute a method, the method comprising:
generating a first layer image including a texture image and a depth image corresponding to faces configuring a cube centered at a first viewpoint of an omnidirectional image and a second layer image including a texture image and a depth image corresponding to faces configuring a cube centered at a second viewpoint different from the first viewpoint in an occlusion region at a viewpoint of the first layer image,
wherein each of the texture image and the depth image of the first layer and the texture image and the depth image of the second layer corresponding to one of the faces configuring the cube includes an image mapped to the one face and a part of images mapped to other faces adjacent to the one face.

* * * * *